United States Patent
Jongen et al.

(10) Patent No.: US 9,049,948 B2
(45) Date of Patent: Jun. 9, 2015

(54) UTENSIL DISPENSER

(71) Applicant: US FOODS, INC., Rosemont, IL (US)

(72) Inventors: Todd Jongen, Rosemont, IL (US); Jeffrey Bobroff, Chicago, IL (US); Michael Prince, Chicago, IL (US); Jeff Mathison, Chicago, IL (US); Christian Kulujian, Chicago, IL (US); Mark Eyman, Chicago, IL (US)

(73) Assignee: US FOODS, INC., Rosemont, IL (US)

( * ) Notice: Subject to any disclaimer, the term of this patent is extended or adjusted under 35 U.S.C. 154(b) by 125 days.

(21) Appl. No.: 13/739,820

(22) Filed: Jan. 11, 2013

(65) Prior Publication Data

US 2013/0193157 A1 Aug. 1, 2013

Related U.S. Application Data

(60) Provisional application No. 61/591,611, filed on Jan. 27, 2012.

(51) Int. Cl.
*A47F 1/08* (2006.01)
*A47G 21/00* (2006.01)
*A47F 1/10* (2006.01)

(52) U.S. Cl.
CPC . *A47F 1/08* (2013.01); *A47G 21/00* (2013.01); *A47F 1/10* (2013.01); *A47F 2001/103* (2013.01)

(58) Field of Classification Search
USPC ................ 221/22, 23, 27, 197, 195, 250, 172
See application file for complete search history.

(56) References Cited

U.S. PATENT DOCUMENTS

| 2,141,684 | A | * | 12/1938 | Diemer ........................ 221/239 |
| 2,149,099 | A | | 2/1939 | Phinney et al. |
| 2,188,573 | A | | 1/1940 | Longo |
| 2,268,873 | A | | 1/1942 | Hopkins et al. |
| 2,340,561 | A | | 2/1944 | Renfro |
| 2,421,782 | A | | 6/1947 | Gibbs et al. |
| 2,911,127 | A | | 11/1959 | Driss et al. |
| 3,028,048 | A | | 4/1962 | Klammer |
| 3,132,765 | A | | 5/1964 | Florendo |
| 3,248,156 | A | | 4/1966 | Repko |
| 3,371,821 | A | | 3/1968 | Abood, Jr. et al. |
| 3,428,215 | A | | 2/1969 | Wells |

(Continued)

OTHER PUBLICATIONS

PCT International Search Report on International Application No. PCT/US2013/022455, dated May 30, 2013, (3 pgs.).

(Continued)

*Primary Examiner* — Timothy Waggoner
(74) *Attorney, Agent, or Firm* — Foley & Lardner LLP

(57) ABSTRACT

A utensil dispenser including a reservoir that stores utensils and front and rear pedestals in contact with a next utensil. The pedestals contain a plurality of utensils within the reservoir. A gravity feed ramp moves the next utensil to an access port of the utensil dispenser. The utensil dispenser includes an actuator operably connected to a drive pin or other drive mechanism. The actuator is configured to halt a dispensing utensil at a ready position based upon contact between the dispensing utensil and the actuator. In the ready position, a handle portion of the dispensing utensil is accessible via the access port. The drive mechanism is configured to contact the next utensil. The actuator is configured to move the drive mechanism to move the next utensil to clear the front pedestal to release the next utensil from the reservoir onto the gravity feed ramp when the dispensing utensil is dispensed.

19 Claims, 53 Drawing Sheets

(56) References Cited

U.S. PATENT DOCUMENTS

| | | | |
|---|---|---|---|
| 4,134,519 A | 1/1979 | Barnett et al. | |
| 4,271,978 A | 6/1981 | Cottrell | |
| 5,131,562 A | 7/1992 | Brown | |
| 5,246,138 A | 9/1993 | Blevins, Jr. | |
| 5,899,356 A | 5/1999 | Huisman | |
| 5,921,408 A | 7/1999 | Groenewold et al. | |
| 6,250,498 B1 | 6/2001 | Lovejoy | |
| 6,336,568 B1 | 1/2002 | Tucker et al. | |
| D461,663 S | 8/2002 | Tucker et al. | |
| D477,941 S | 8/2003 | Tucker et al. | |
| 6,832,694 B2* | 12/2004 | Goeking et al. | 221/195 |
| D584,084 S | 1/2009 | Tucker | |
| 7,513,089 B2 | 4/2009 | Rubin | |
| D607,245 S | 1/2010 | Tucker | |
| 7,669,732 B2 | 3/2010 | Njaastad | |
| 7,900,797 B1 | 3/2011 | Witcraft | |
| 8,070,013 B2* | 12/2011 | Reinsel et al. | 221/255 |
| 8,272,533 B1* | 9/2012 | D'Amelia et al. | 221/197 |
| 8,297,473 B2* | 10/2012 | Smith | 221/129 |
| 8,360,273 B2* | 1/2013 | Reinsel et al. | 221/131 |
| 2005/0035136 A1 | 2/2005 | Dathe et al. | |
| 2005/0082307 A1 | 4/2005 | Tucker | |
| 2007/0108141 A1 | 5/2007 | Smith et al. | |
| 2007/0193968 A1 | 8/2007 | Smith et al. | |
| 2008/0072432 A1 | 3/2008 | Teys et al. | |
| 2008/0121650 A1 | 5/2008 | Smith | |
| 2010/0170915 A1 | 7/2010 | Reinsel et al. | |
| 2011/0226797 A1 | 9/2011 | Reinsel et al. | |

OTHER PUBLICATIONS

PCT Written Opinion of the International Searching Authority on International Application No. PCT/US2013/022455, dated May 30, 2013, (5 pgs.).

TJ Rssell Supply, On-Line Catalog, http://www.tjrussellcompany.com/foodservice-disposables.html, Sep. 2, 2011, 3 pg.

Anthony DAmeliz Dispenser Video #2, http://www.youtube.com/watch?v=OyrZf7dZdcB, uploaded to YouTube Oct. 9, 2011.

Anthony DAmelia Hands Free Cutlery Dispenser Video, http://www.youtube.com/watch?v=MmSS_227gds, published on Oct. 30, 2012.

* cited by examiner

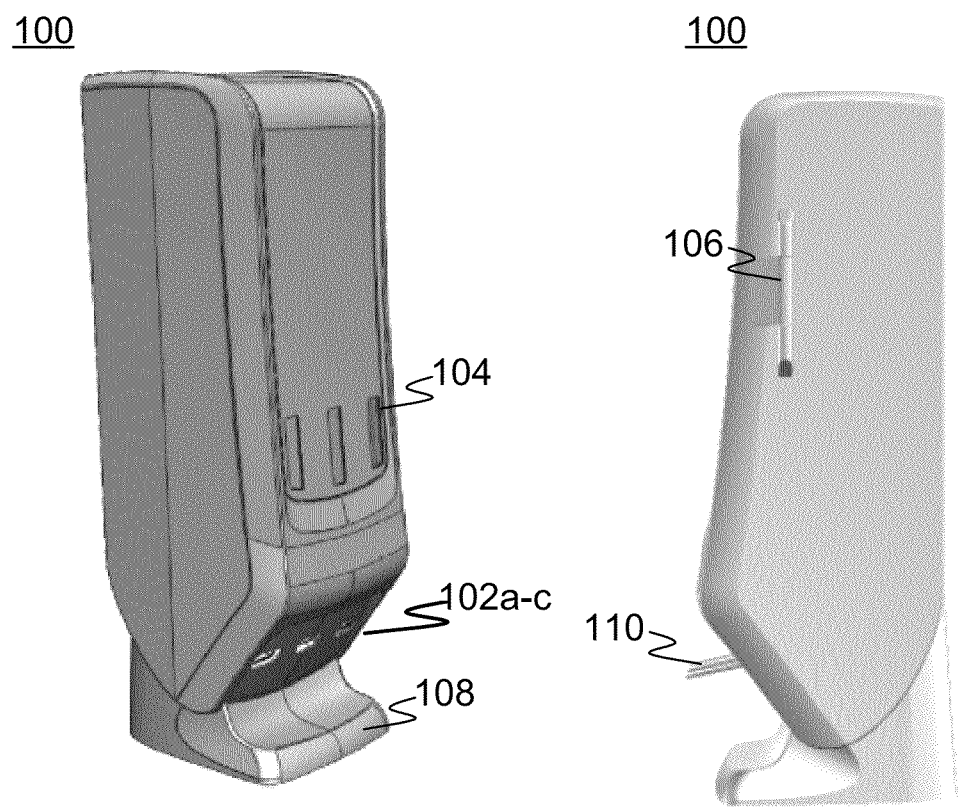

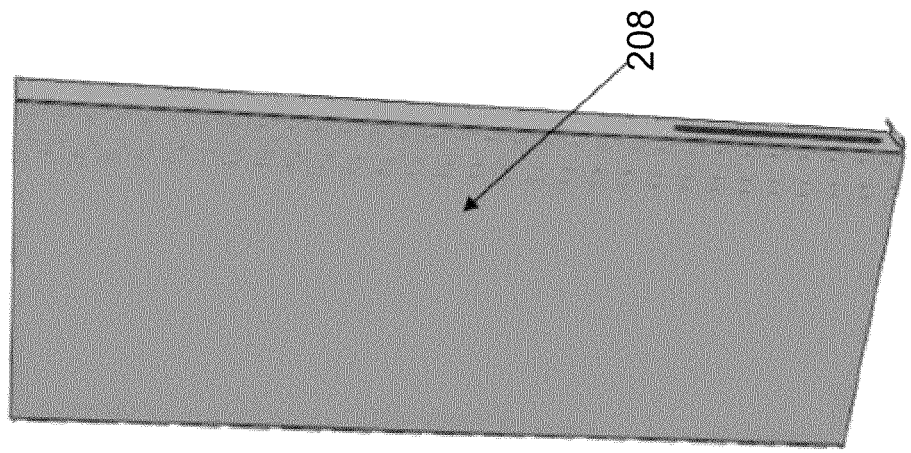
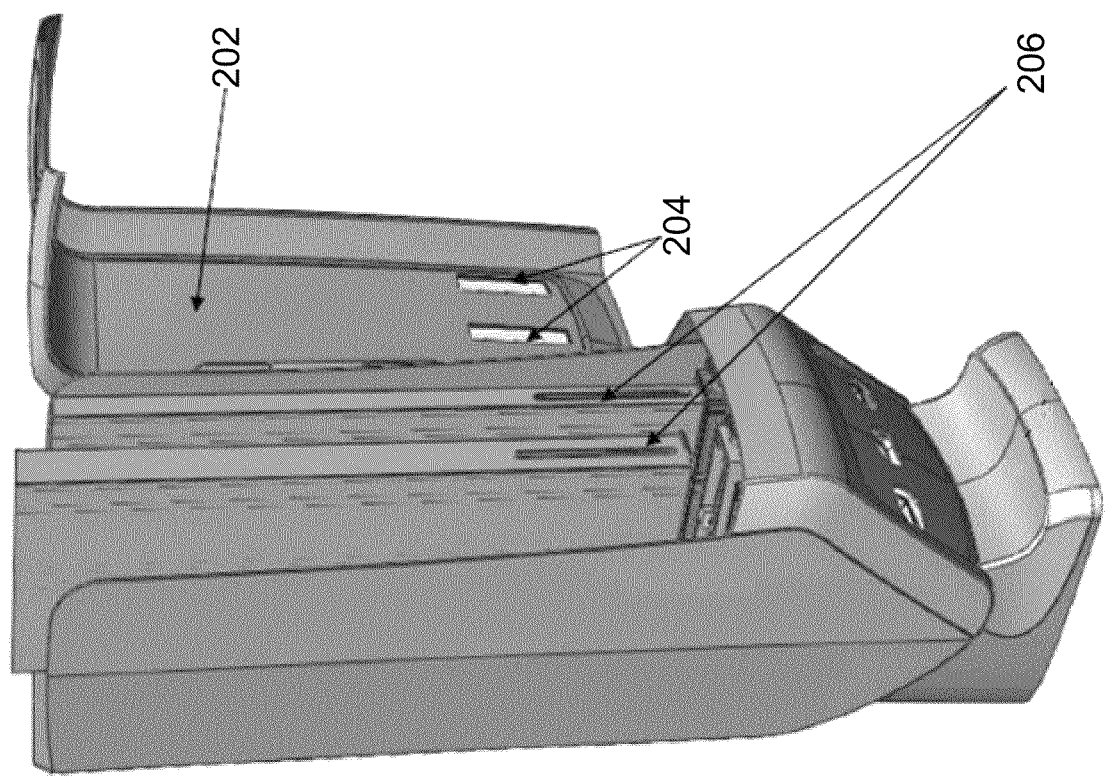
FIG. 2

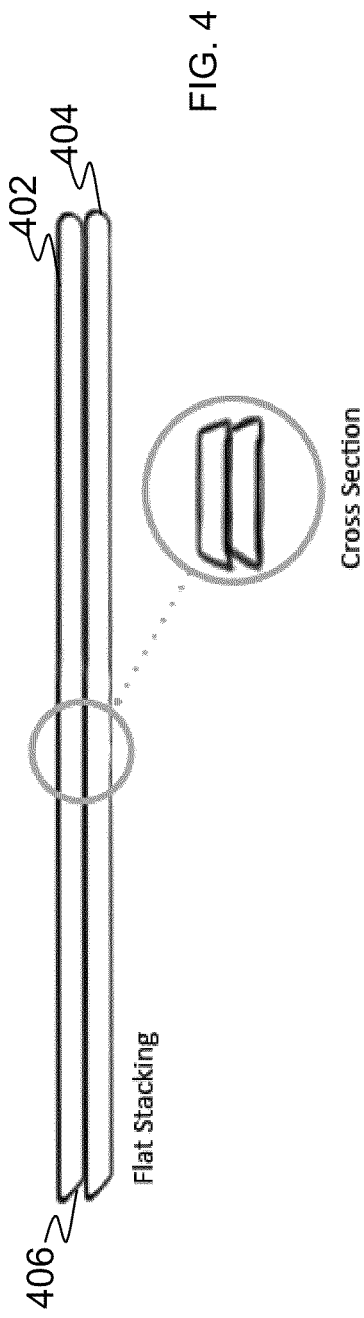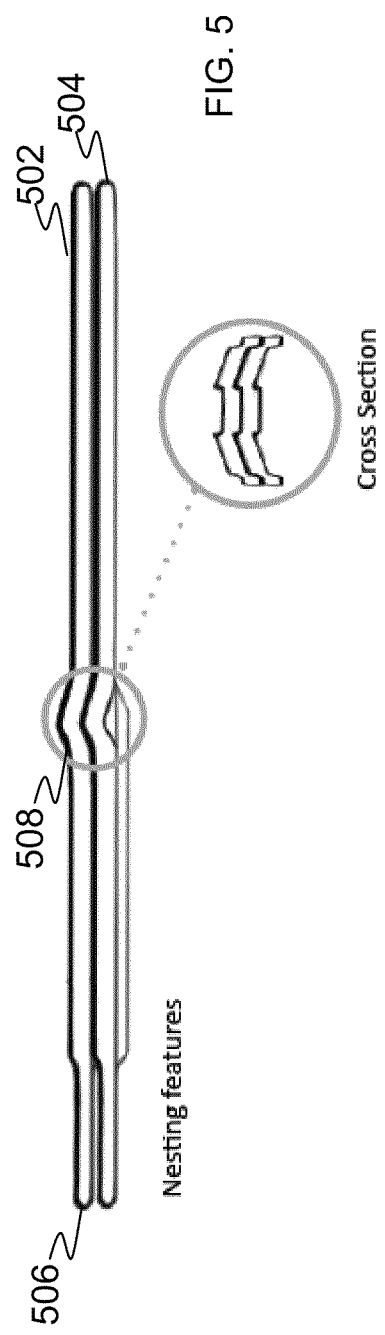

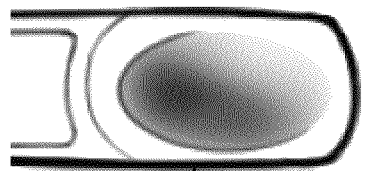
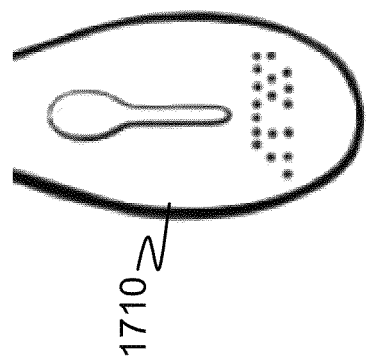
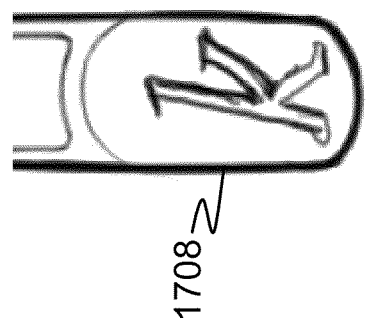
FIG. 17

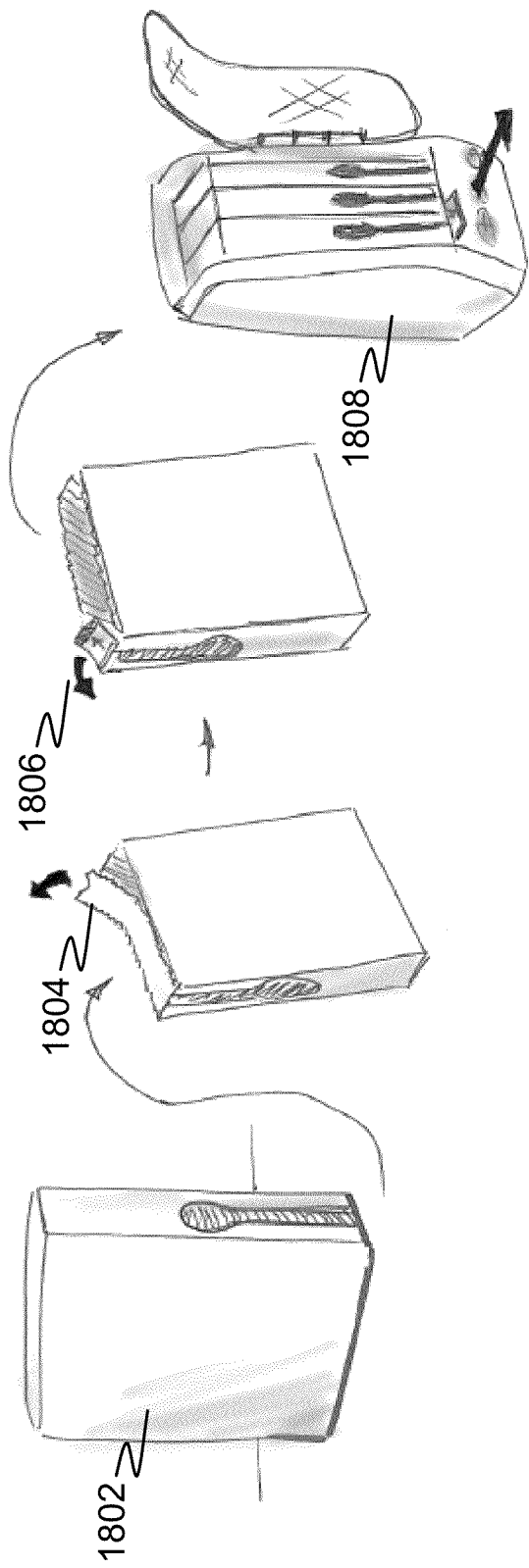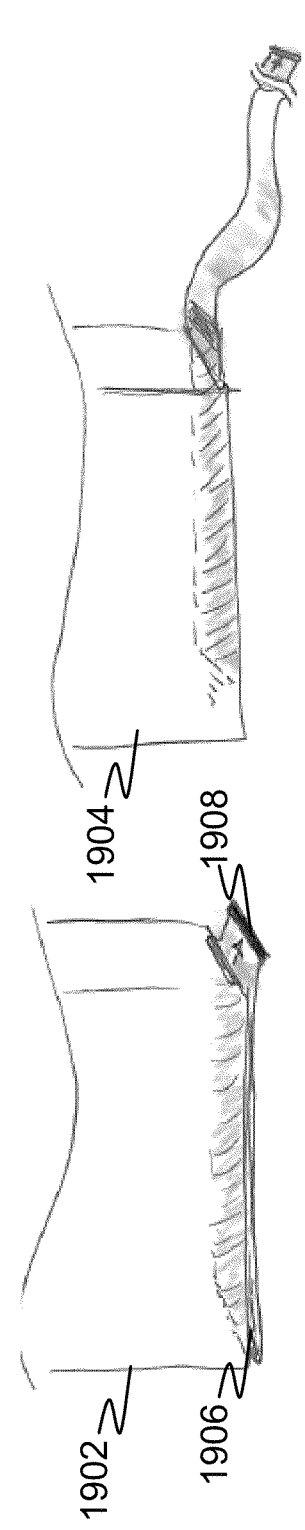

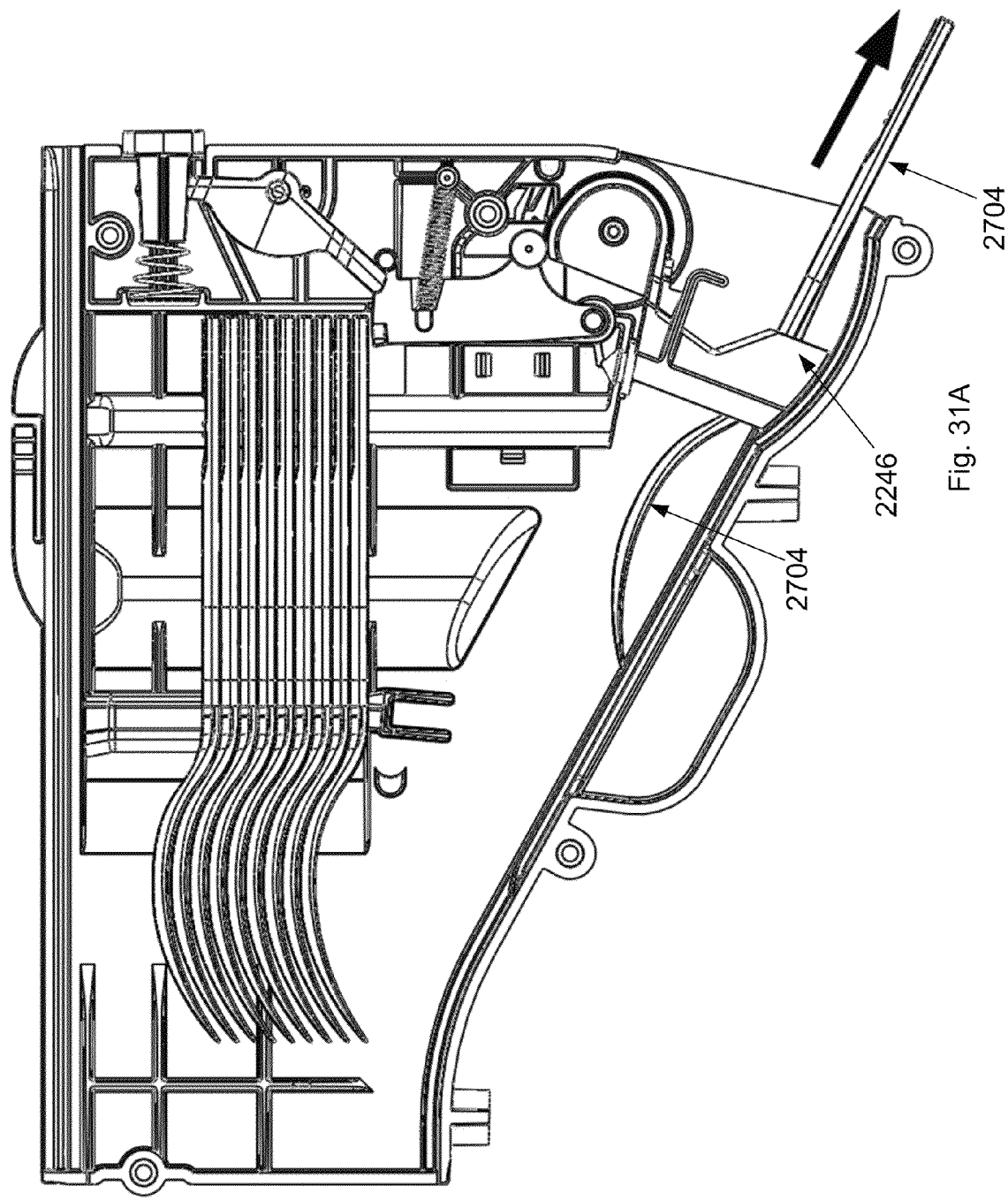

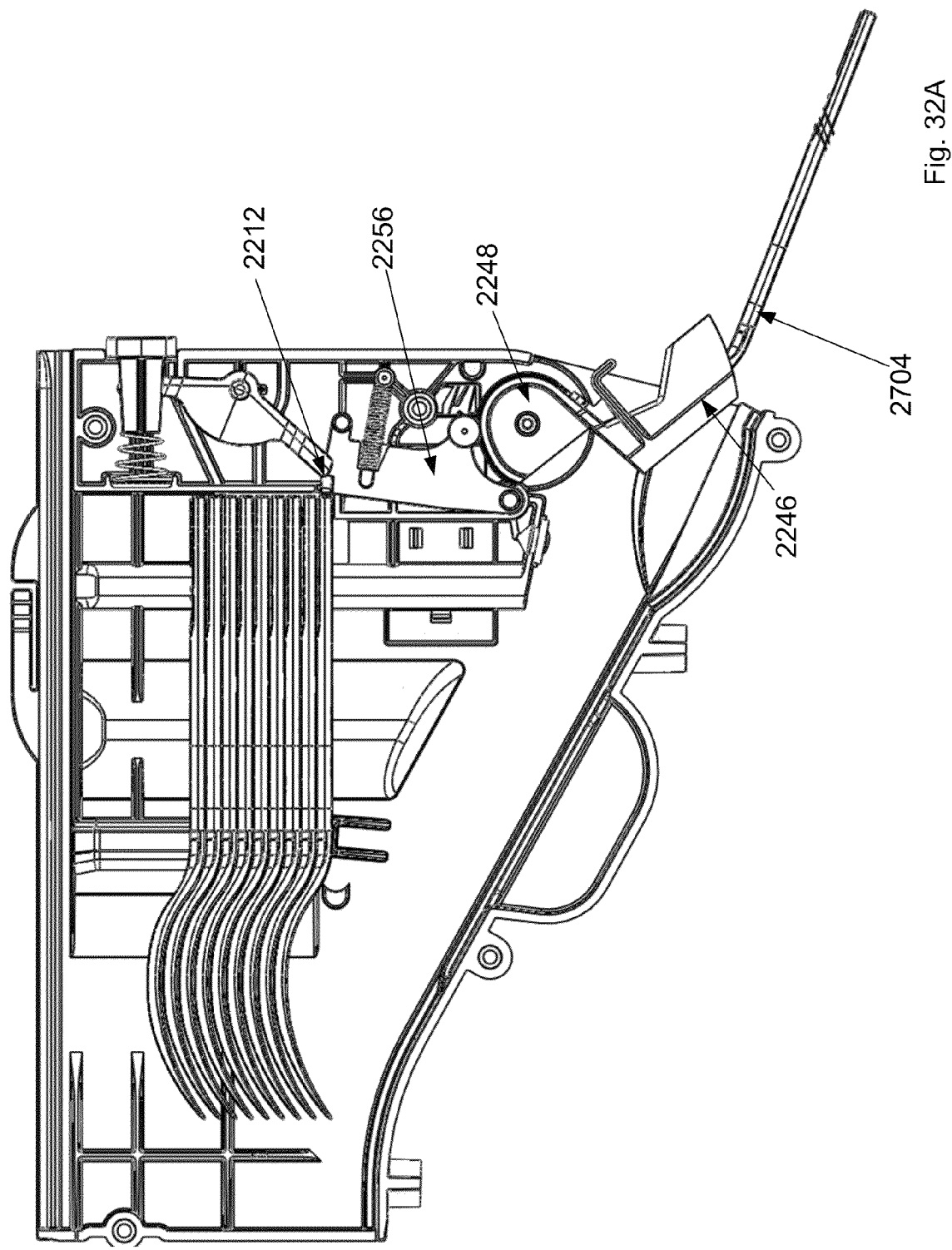

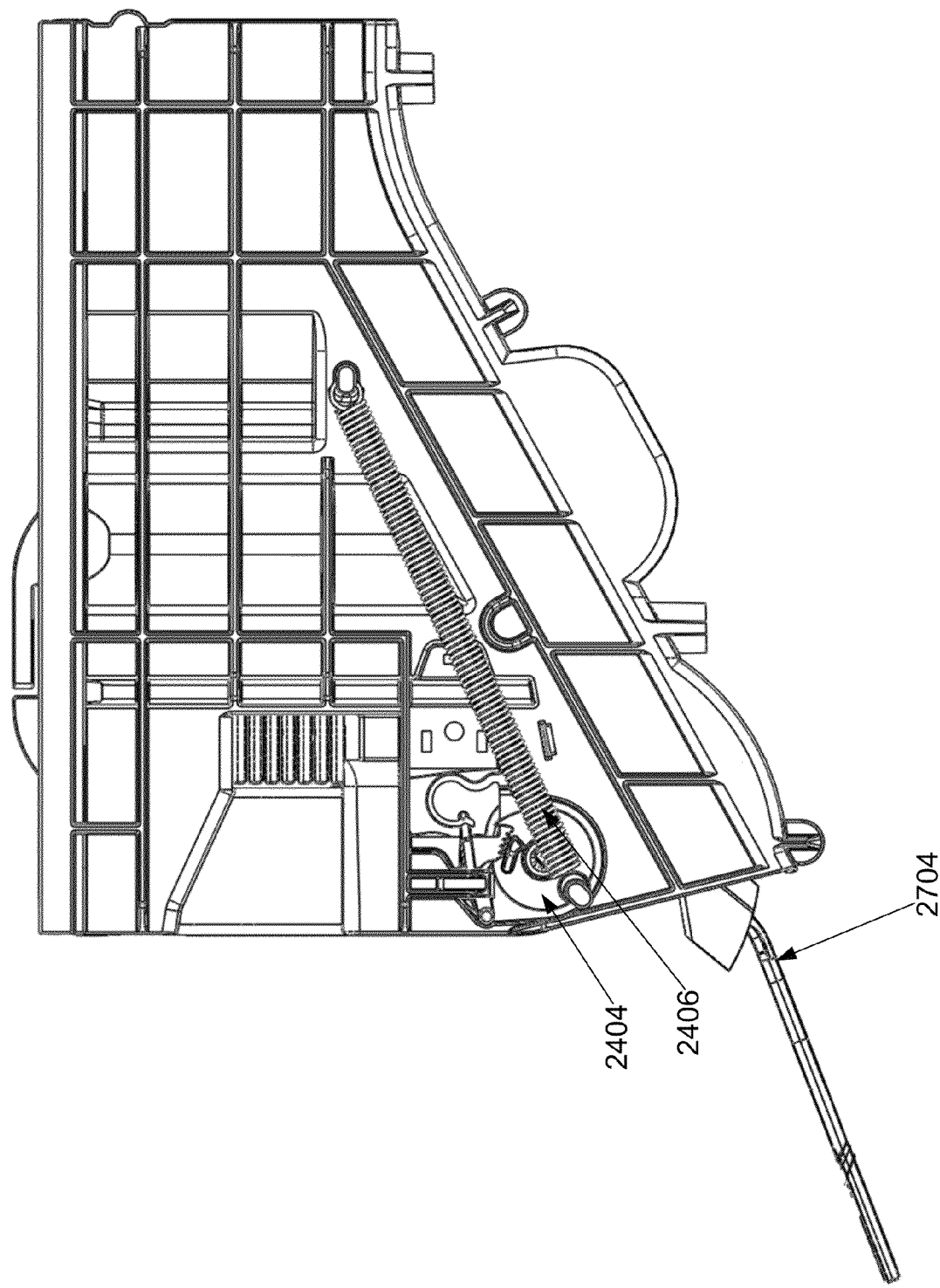

UTENSIL DISPENSER

CROSS-REFERENCE TO RELATED APPLICATIONS

This application claims the benefit of U.S. Provisional Application No. 61/591,611, filed Jan. 27, 2012, which is incorporated by reference herein in its entirety.

BACKGROUND

Many restaurants, food courts, eateries, etc. require the distribution of utensils. Placing a multitude of utensils in a canister is one common way in which utensils are distributed to customers. Utensils distributed in this manner, however, are subject to the environment and can be exposed to germs, dirt, etc. In addition, fitting a maximum number of utensils in each cup can be time consuming.

SUMMARY

In general, one aspect of the subject matter described in this specification can be embodied in a utensil dispenser that includes a reservoir configured to store a plurality of utensils. The utensil dispenser further includes a rear pedestal configured to contact a rear portion of a next utensil in the plurality of utensil and a front pedestal configured to contact one or more detents in the next utensil. The front pedestal and the rear pedestal are configured to contain the plurality of utensils within the reservoir. A gravity feed ramp is configured to move the next utensil to an access port of the utensil dispenser. The utensil dispenser further includes an actuator operably connected to a drive pin or other drive mechanism. The actuator is configured to halt a dispensing utensil at a ready position based upon contact between the dispensing utensil and the actuator. In the ready position, a handle portion of the dispensing utensil is accessible via the access port. The drive pin or other drive mechanism is configured to contact the next utensil. The actuator is further configured to move the drive mechanism into a release position that moves the next utensil to clear the front pedestal to release the next utensil from the reservoir onto the gravity feed ramp when the dispensing utensil is dispensed. Other implementations of a utensil dispenser are also described herein.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 1A is a front perspective view of a utensil dispenser in accordance with an illustrative implementation.

FIG. 1B is a right side plane view of the utensil dispenser of FIG. 1A in accordance with an illustrative implementation.

FIG. 2 is a front perspective view of an open utensil dispenser and cartridge in accordance with an additional implementation.

FIG. 4 is a right side plane view and expanded detailed view of stacked utensils in accordance with an additional illustrative implementation.

FIG. 5 is a right side plane view and expanded detailed view of stacked utensils in accordance with another illustrative implementation.

FIG. 17 is a view of handles of utensils for use in a utensil dispenser in accordance with an additional illustrative implementation.

FIG. 18 is a flow-illustration of loading a utensil dispenser in accordance with another illustrative implementation.

FIGS. 19A-19B illustrate opening a cartridge of utensils for use in a utensil dispenser in accordance with an additional illustrative implementation.

FIGS. 27A-33A illustrate a front perspective view of the utensil dispenser of FIG. 22.

FIGS. 27B-33B illustrate a rear perspective view of the utensil dispenser of FIG. 22.

Like reference numbers and designations in the various drawings indicate like elements.

DETAILED DESCRIPTION

FIGS. 1A-1D are various views of a utensil dispenser in accordance with an illustrative implementation. A utensil dispenser 100 can include three access ports 102a-c. Each access port allows for the removal of a single utensil at a time. In some implementations, the utensil dispenser dispenses plastic cutlery, e.g., polystyrene utensils. As one utensil is removed, another utensil is moved into position such that its handle 110 is outside the access port. Head portions of utensils that can come into contact with food, e.g., fork tines, spoon bowls, knife blades, etc., remain within the utensil dispenser 100. Accordingly, these portions of the utensils are protected from the environment. The utensil dispenser 100 can be used to dispense various utensils such as, but not limited to, spoons, forks, knives, sporks, chopsticks, etc.

Figure 1E:
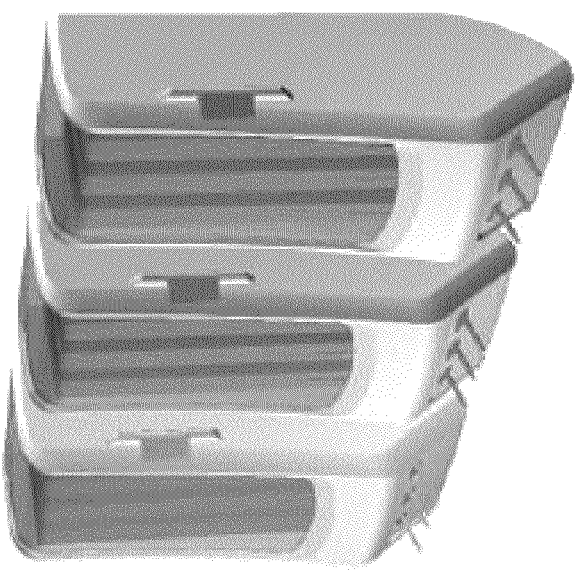
FIG. 1E is a front perspective view of three utensil dispensers in accordance with an illustrative implementation.
Figure 1D:
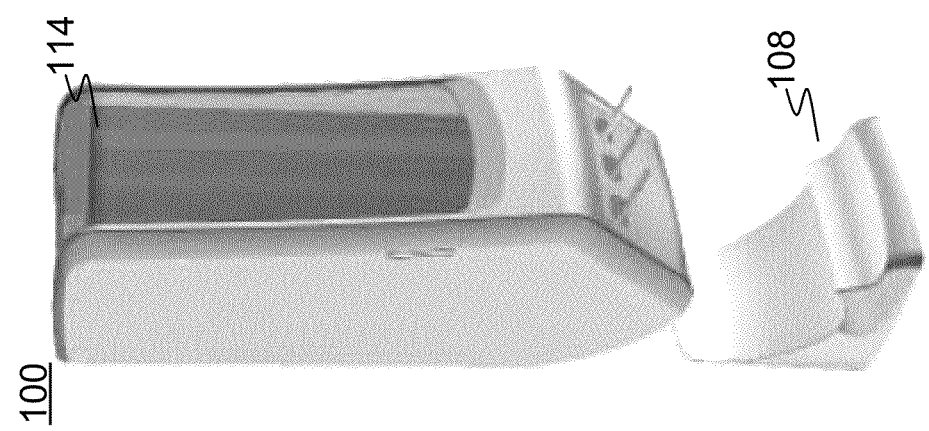
FIG. 1D is a front perspective view of the utensil dispenser of FIG. 1A in accordance with an illustrative implementation.
Figure 1C:
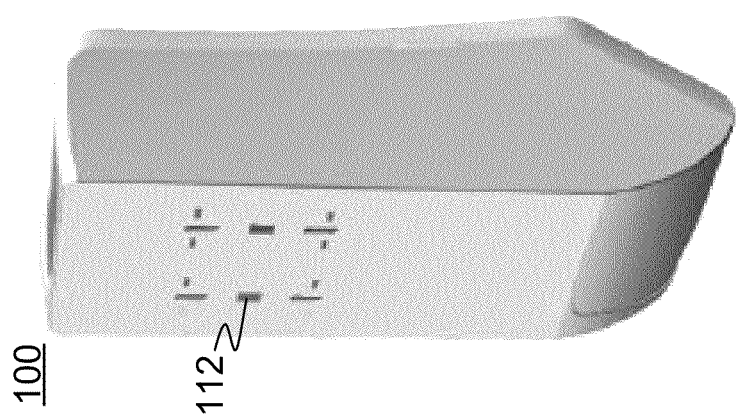
FIG. 1C is a rear perspective view of the utensil dispenser of FIG. 1A in accordance with an illustrative implementation.

In one embodiment, fill level windows 104 allow a visual indication of the fill level of utensils in a cartridge. In another embodiment, a fill level window 114 is transparent and allows a visual indication of the fill level of all of the cartridges in a dispenser. A utensil dispenser can be hung on a wall using wall mounting bracket attachment holes 112. In other implementations, the utensil dispenser 100 can be attached to a pedestal base 108. The pedestal base 108 provides support for the utensil dispenser and allows the utensil dispenser 100 to be free standing. The pedestal base 108 can be removable such that the utensil dispenser 100 can be wall mounted using wall mounting bracket attachment holes 112. Multiple utensil dispensers can be hung on a wall. FIG. 1E is a front perspective view of three utensil dispensers in accordance with an illustrative implementation. In some implementations, a utensil dispenser can incorporate an ultra-violet light to sanitize the exposed handle of the utensil.

Utensils stored in the utensil dispenser 100 can be stored in a cartridge. The utensil dispenser 100 can be opened allowing the replacement of cartridges to refill the utensil dispenser 100. In one implementation, the utensil dispenser 100 opens using a hinge 106. FIG. 2 is a front perspective view of an open utensil dispenser and cartridge in accordance with an illustrative implementation. A hinged access door 202 allows access to the internal compartment of the utensil dispenser 100. In other implementations, the hinge location can be located on the top of the utensil dispenser 100. In these implementations, the access door 202 opens vertically instead of horizontally. The access door 202 can have fill level windows 204. Cartridges have corresponding fill level windows 206 that allow a visual indication of the stock of utensils in each respective cartridge to be seen. A cartridge 208 can be attached to the utensil dispenser 100 and provides utensils that can be dispensed. The cartridge 208 can be pre-packaged with utensils. In some implementations, the cartridge 208 is replaced with a new cartridge and is not reused. In other implementations, the cartridge 208 can be refilled and reused in the utensil dispenser 100. The utensil dispenser 100 can accept one or more cartridges 208. For example, in one implementation the utensil dispenser 100 can accept a single cartridge 208. As another example, the utensil dispenser 100 can accept three cartridges 208, e.g., one for each of a spoon, fork, and knife. In some implementations, the dispensing slot that a cartridge 208 is inserted into is not dependent upon the type of utensil that is dispensed. Accordingly, a cartridge 208 of any type of utensil can be placed into any available dispensing slot. In other implementations, each cartridge 208 and dispensing slot is unique to the utensil being dispensed. In these implementations, a cartridge 208 can be designed individually to fit the corresponding utensil. The footprint and dimensions of the cartridges can be distinct from one another in these implementations.

Figure 3A:
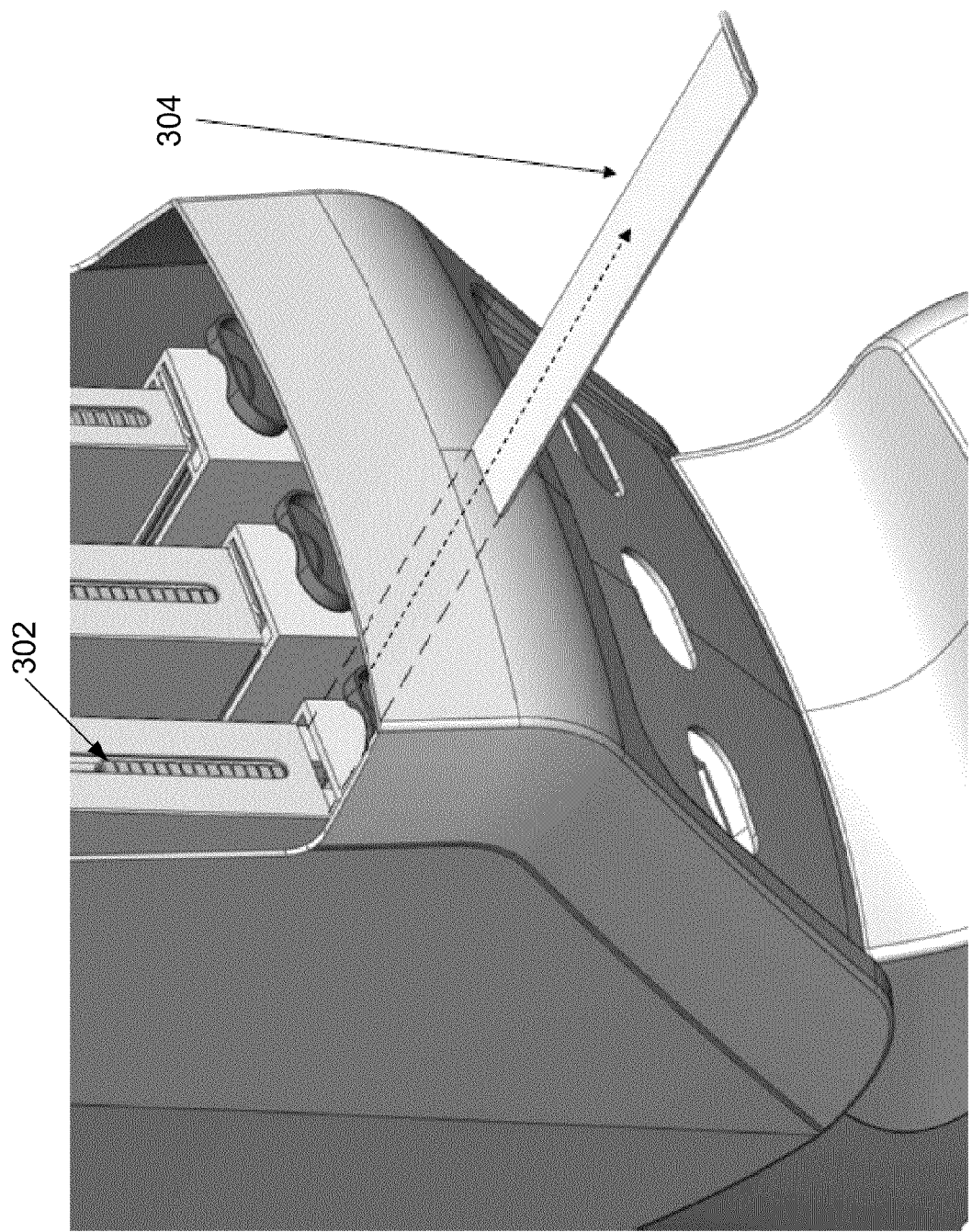
FIGS. 3A-3C are detailed portions of a utensil dispenser in accordance with another implementation.
Figure 3B:
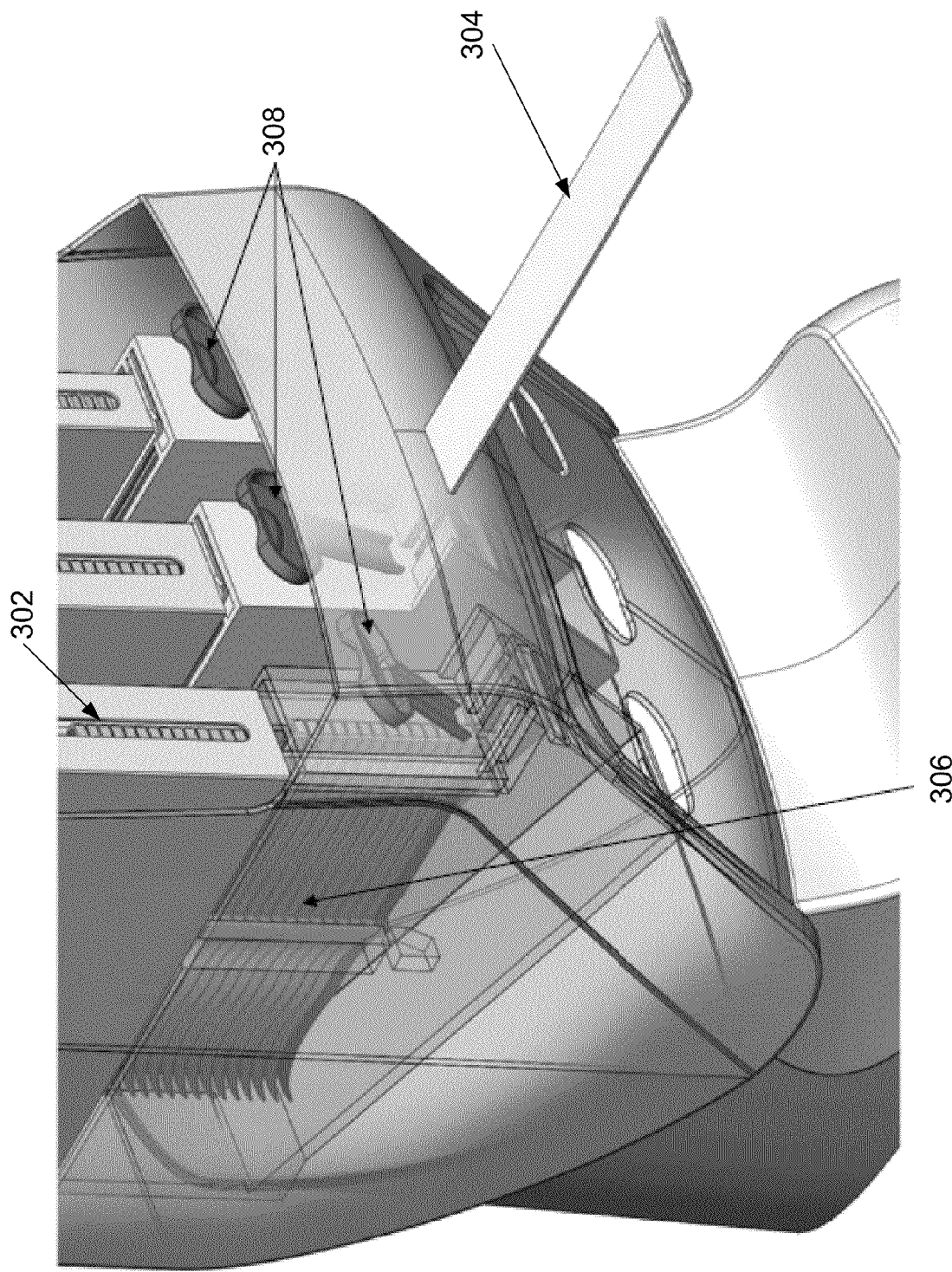
Figure 3C:
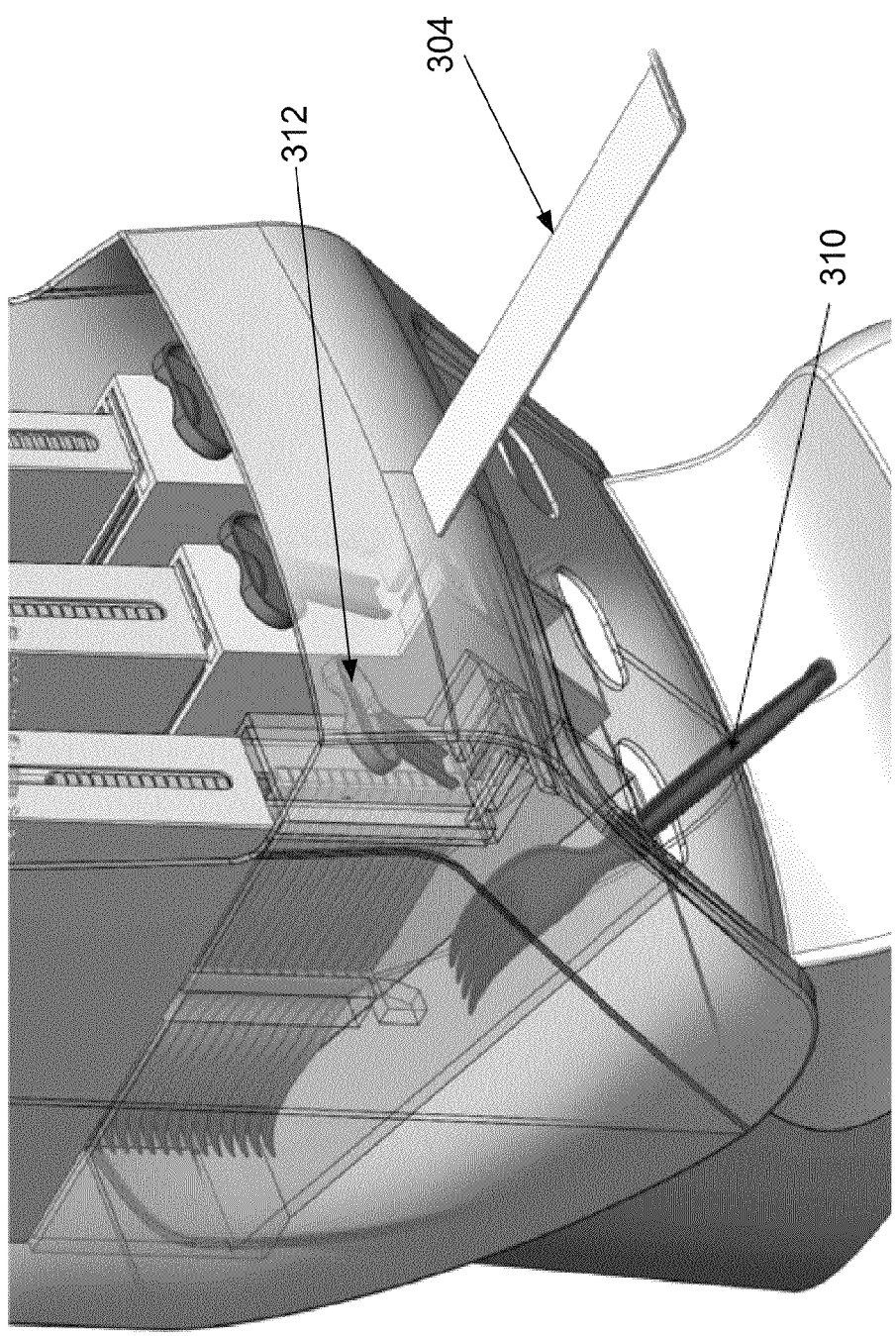

FIGS. 3A-3C are a detailed portion of a utensil dispenser in accordance with an illustrative implementation. In some implementations, a cartridge 302 can have a restraint panel 304. The restraint panel 304 prohibits the stored cutlery from falling out of place during the installation of the cartridge 302. Once the cartridge 302 is installed, the restraint panel 304 can be removed. After the restraint panel 304 is removed, cutlery can move into a utensil reservoir 306. In one implementation, gravity moves the utensils from the cartridge into the reservoir 306. In some implementations, the reservoir 306 holds between 10 and 20 pieces of cutlery. The reservoir allows the cartridge 302 to be replaced prior to the dispenser becoming completely empty. Manual activation levers 308 can be accessed when the front panel is open. Using the manual activation levers 308, a utensil can be dispensed. This is useful, for example, when loading an empty utensil dispenser. The manual activation levers 308 can be used to move a first utensil into its dispensing position, e.g., with its handle exposed through an access port. FIG. 3C illustrates a fork 310 in its ready or dispensing position based upon activation of a manual activation lever 312. Once the fork 310 is in its ready position, removing the fork 310 will cause the next fork to be moved into its ready position.

Each cartridge can include a large number of utensils. For example, a cartridge can hold 100, 120, 140, 150, 160, 250, etc., utensils. In some implementations, the utensils are stacked on top of one another. FIG. 4 is a right side plane view and expanded detailed view of stacked utensils in accordance with an illustrative implementation. A utensil 402 is stacked vertically on top of a second utensil 404. The utensils 402 and 404 are the same height, width, and length. A chamfer 406 allows for a thinner endpoint that can be used by the dispensing portion of the utensil dispenser to separate individual utensils.

To help increase stability of the stack of utensils and maximize the usage of space within a cartridge, the utensils can include nesting features. FIG. 5 is a right side plane view and expanded detailed view of stacked utensils in accordance with an illustrative implementation. Similar to the utensils illustrated in FIG. 4, a utensil 502 is stacked vertically on a second utensil 504. The utensils 502 and 504 are the same height, width, and length. A cut out 506 in a handle of the utensil 502 allows for a thinner endpoint that can be used by the dispensing portion of the utensil dispenser to separate individual utensils. A nesting feature 508 can be used to help hold the utensils 502 and 504 in place within the cartridge and the reservoir of the utensil dispenser.

Figure 6:
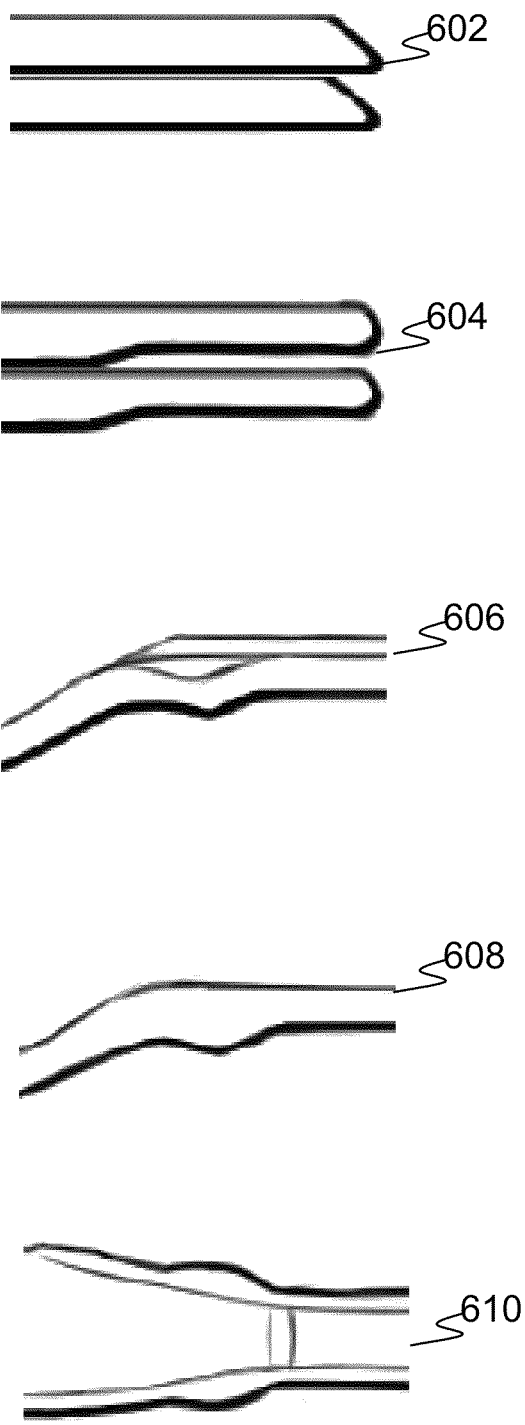
FIG. 6 is a view of various features of utensils in accordance with an additional illustrative implementation.
Figure 7A:
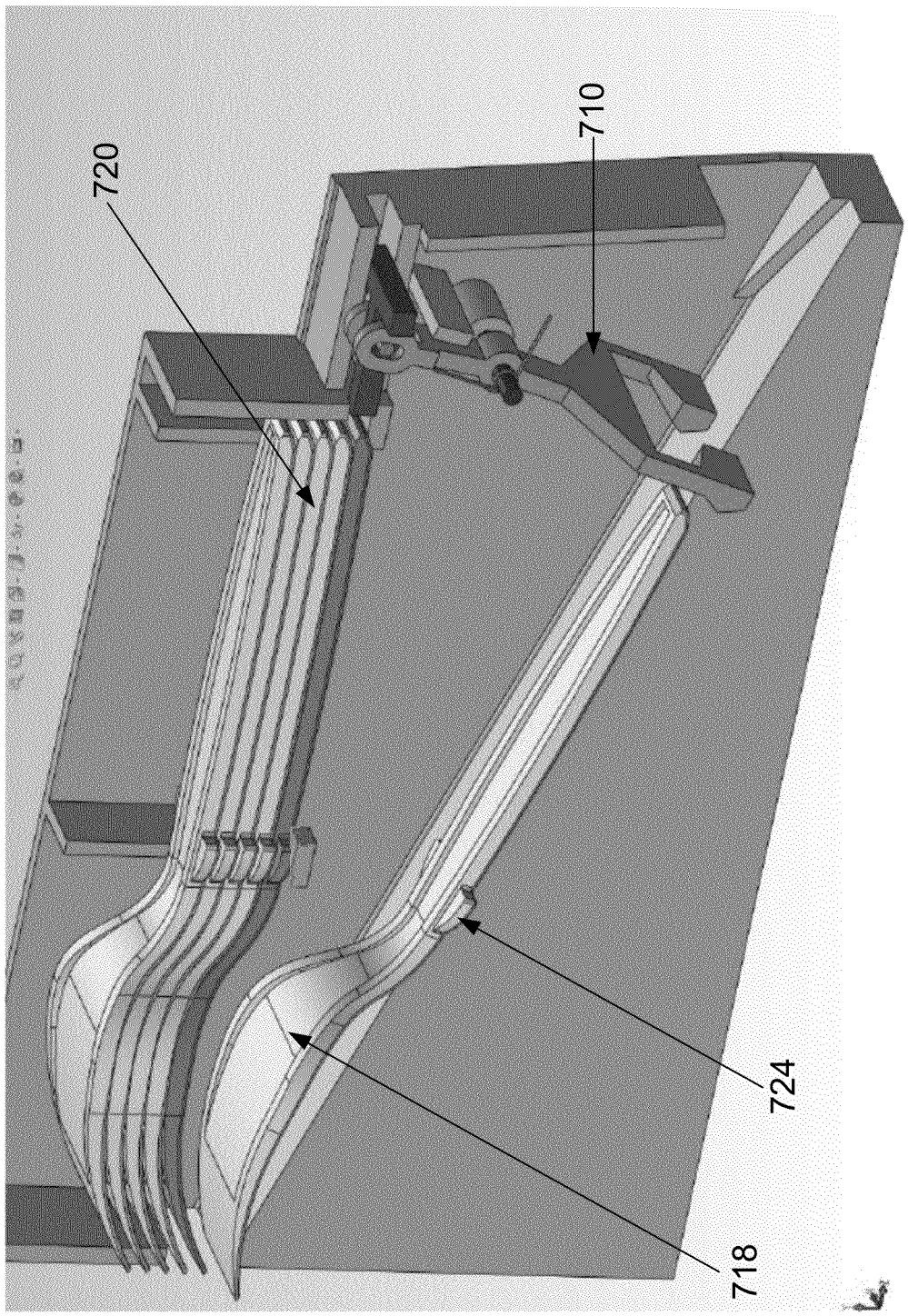
FIGS. 7A-7E are cross sectional views of a utensil dispenser in accordance with an additional illustrative implementation showing a utensil moving from a reservoir to a ready position.
Figure 7B:
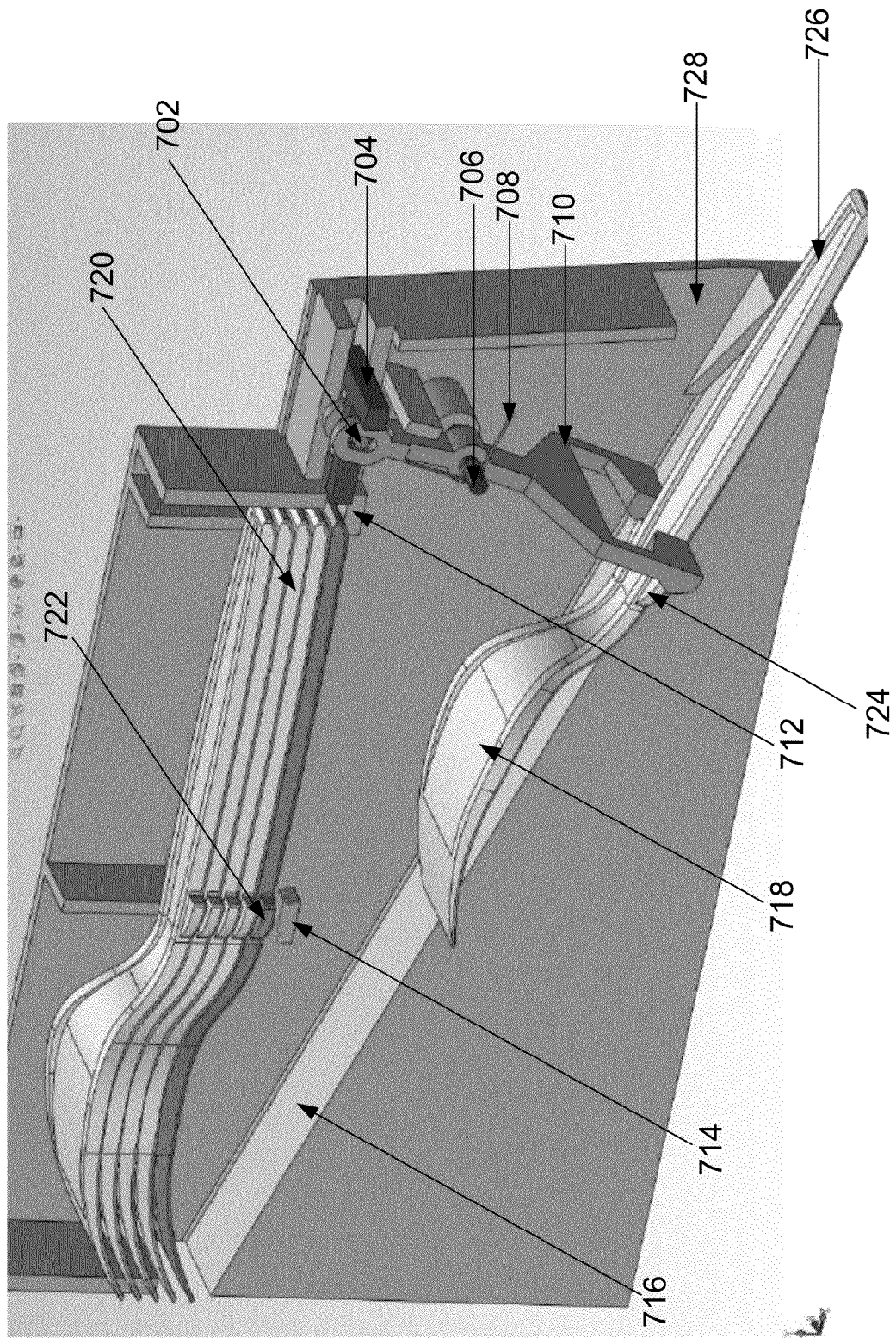
Figure 7C:
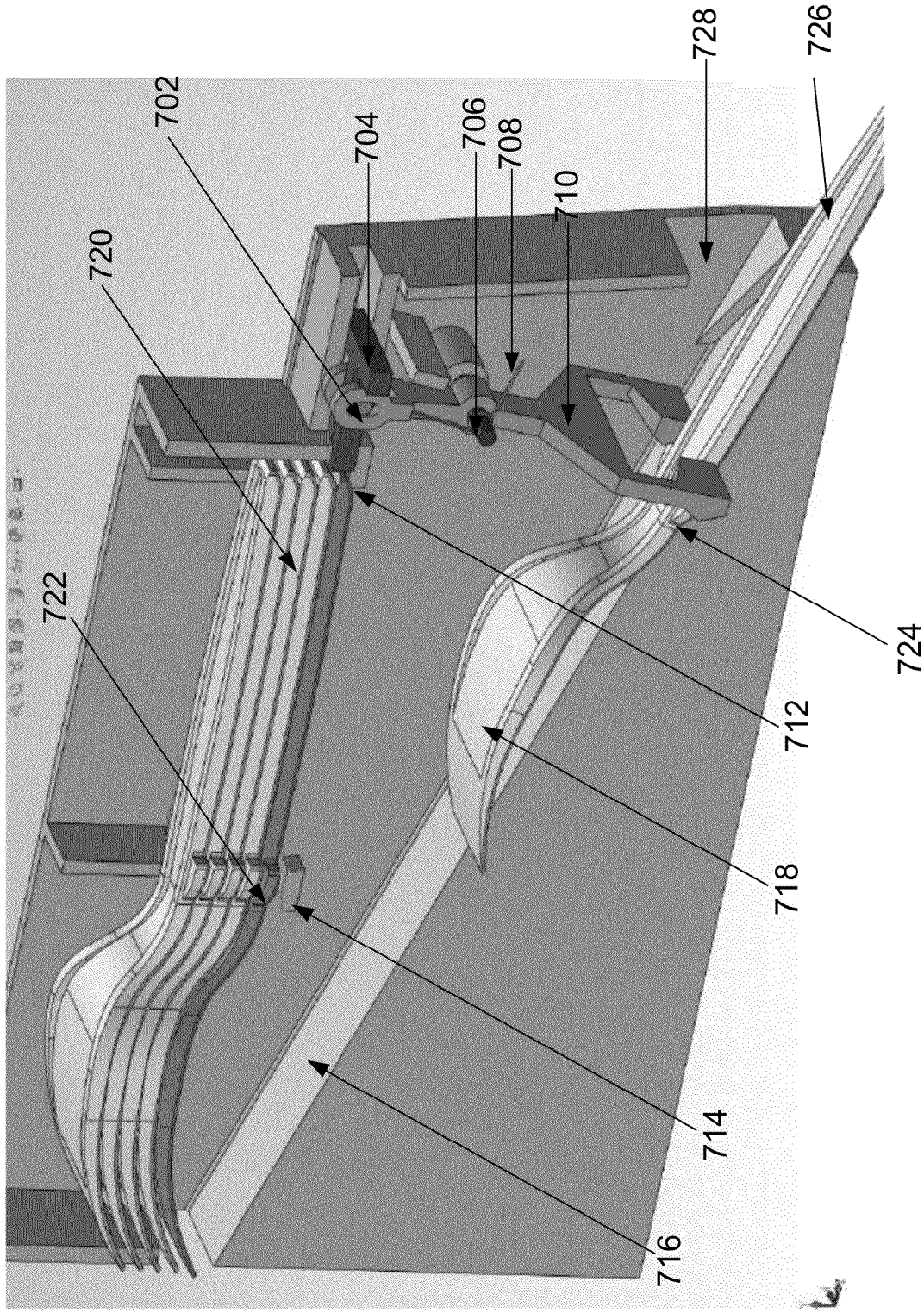
Figure 7D:
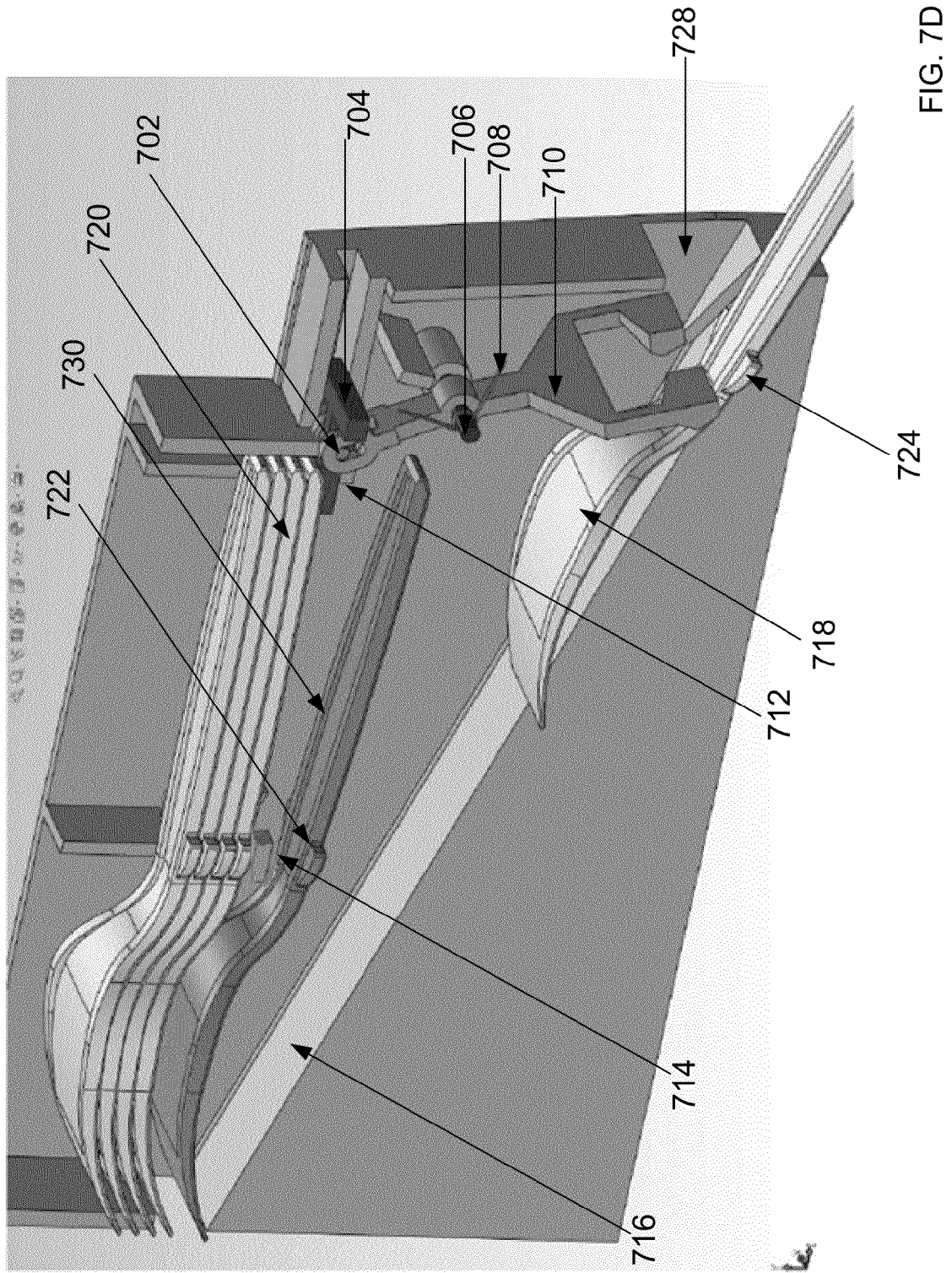
Figure 7E:
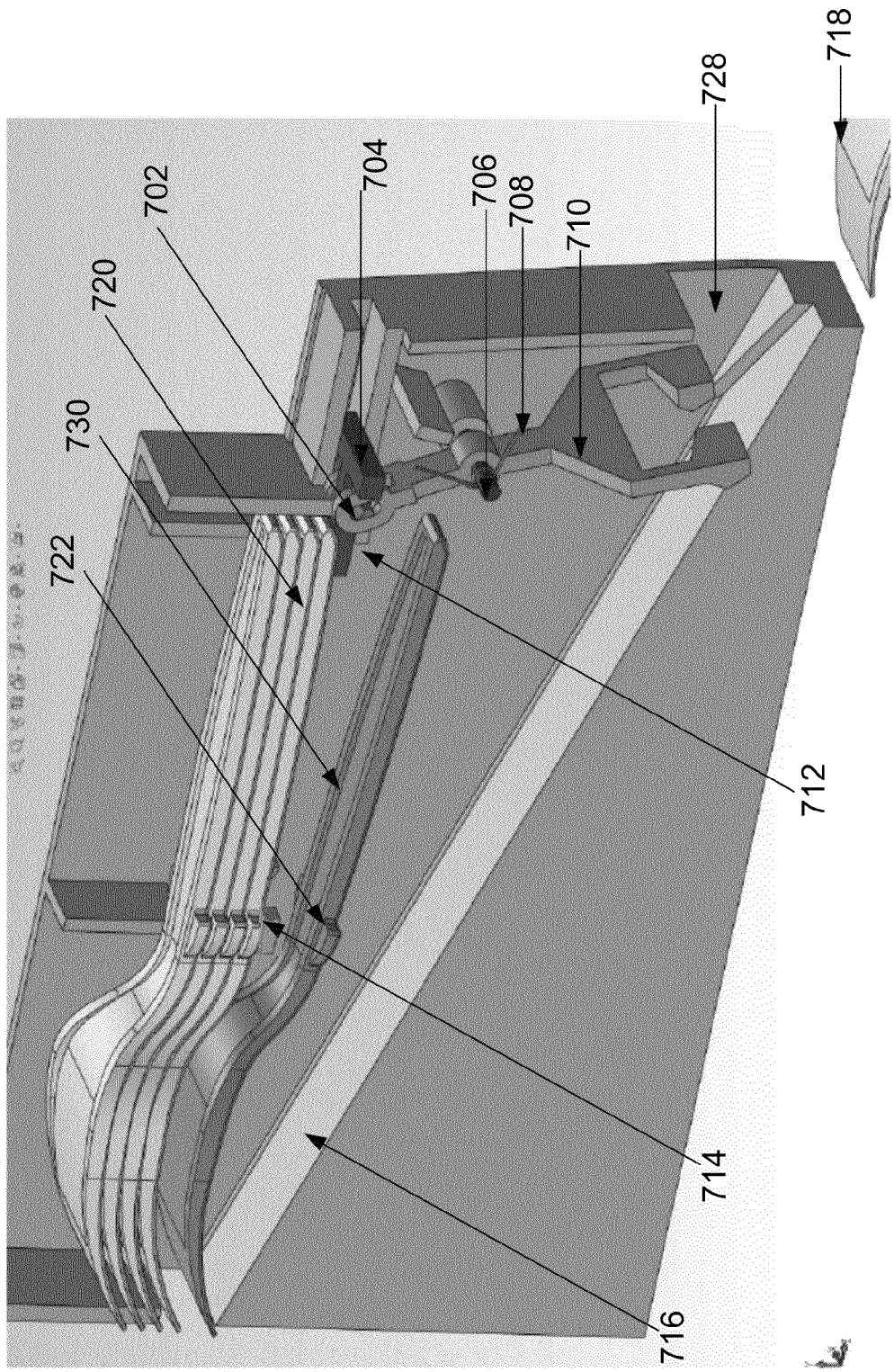
Figure 8A:
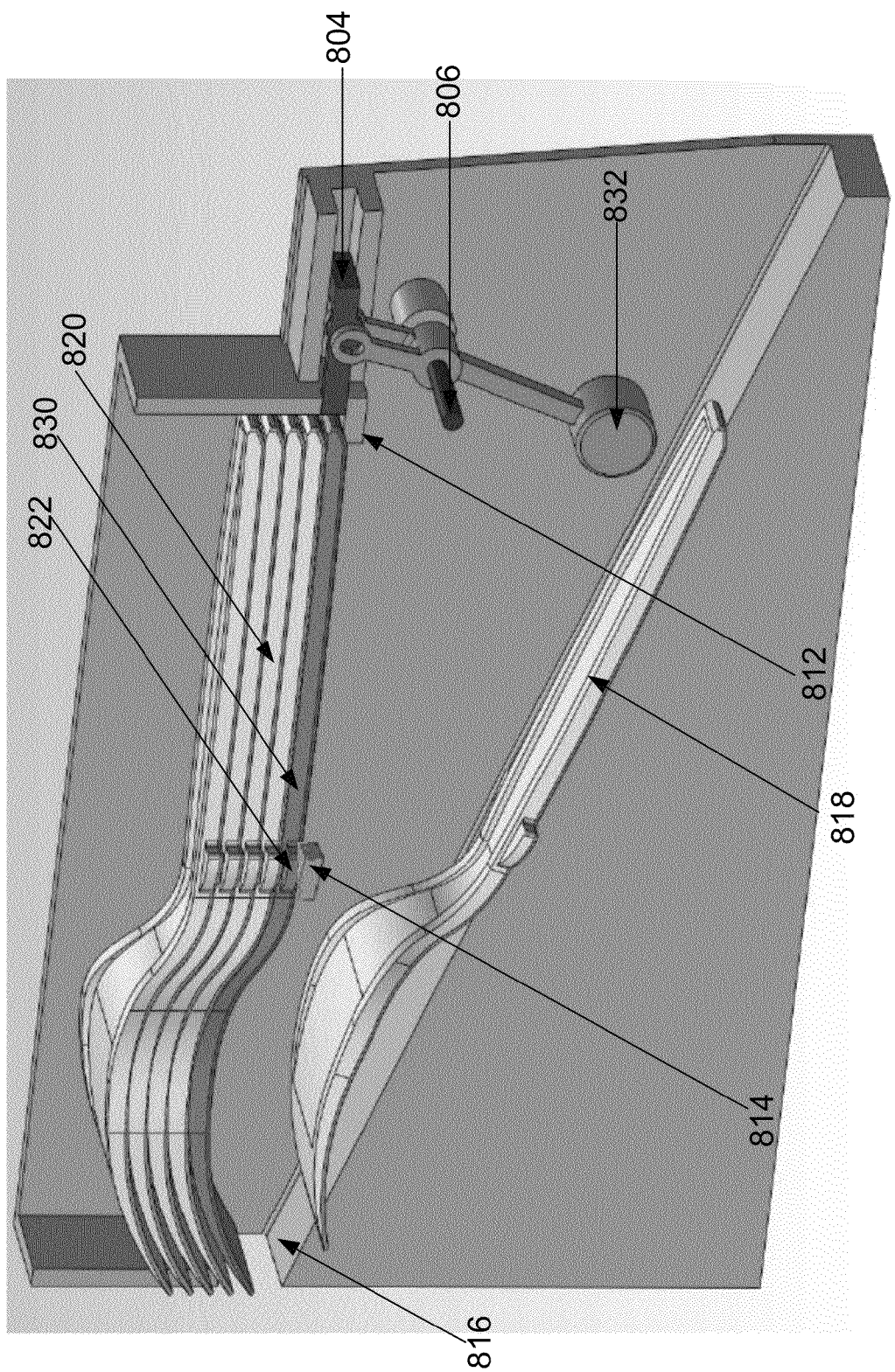
FIGS. 8A-8E are cross sectional views of a utensil dispenser in accordance with another illustrative implementation showing a utensil moving from a reservoir to a ready position.
Figure 8B:
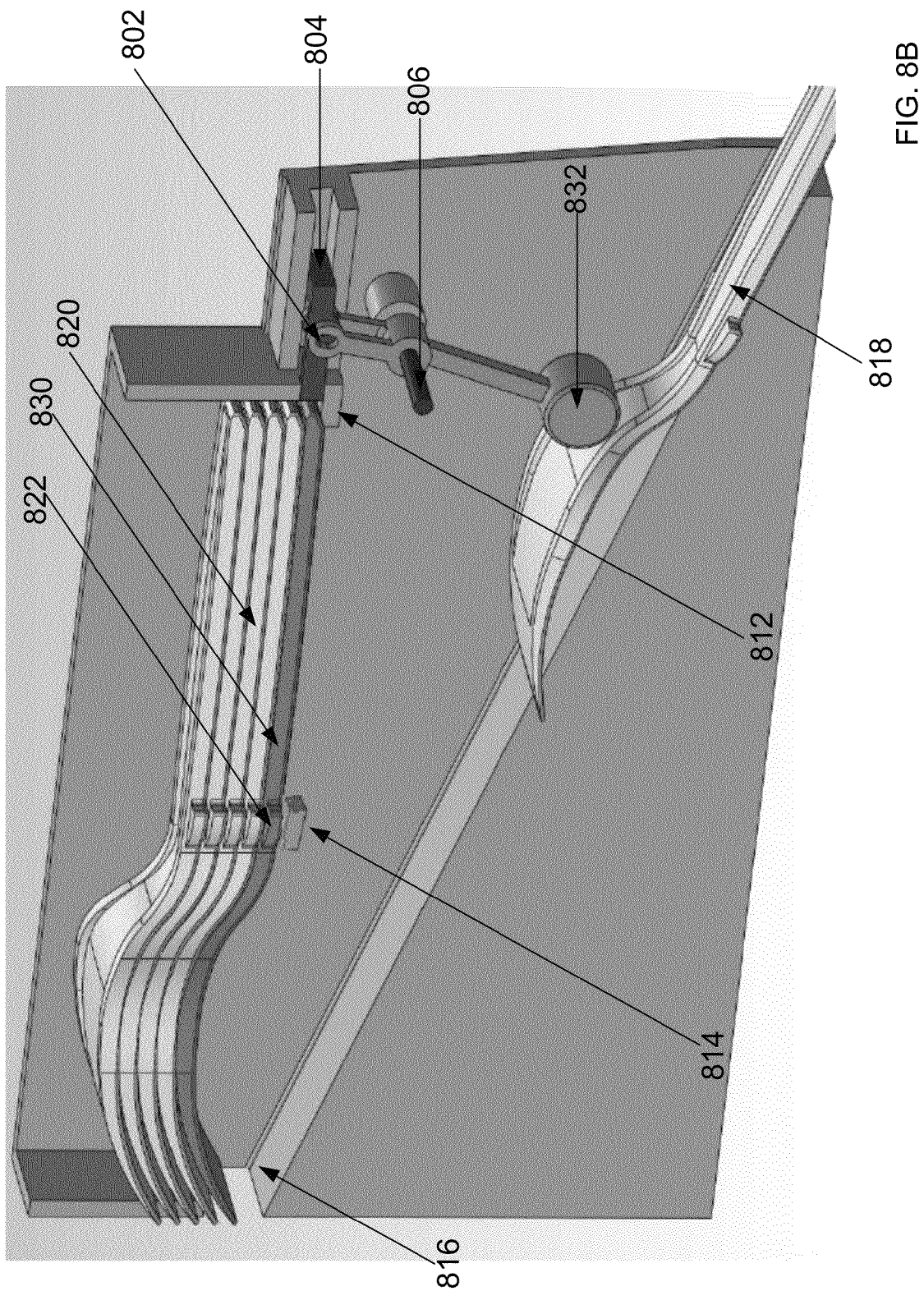
Figure 8C:
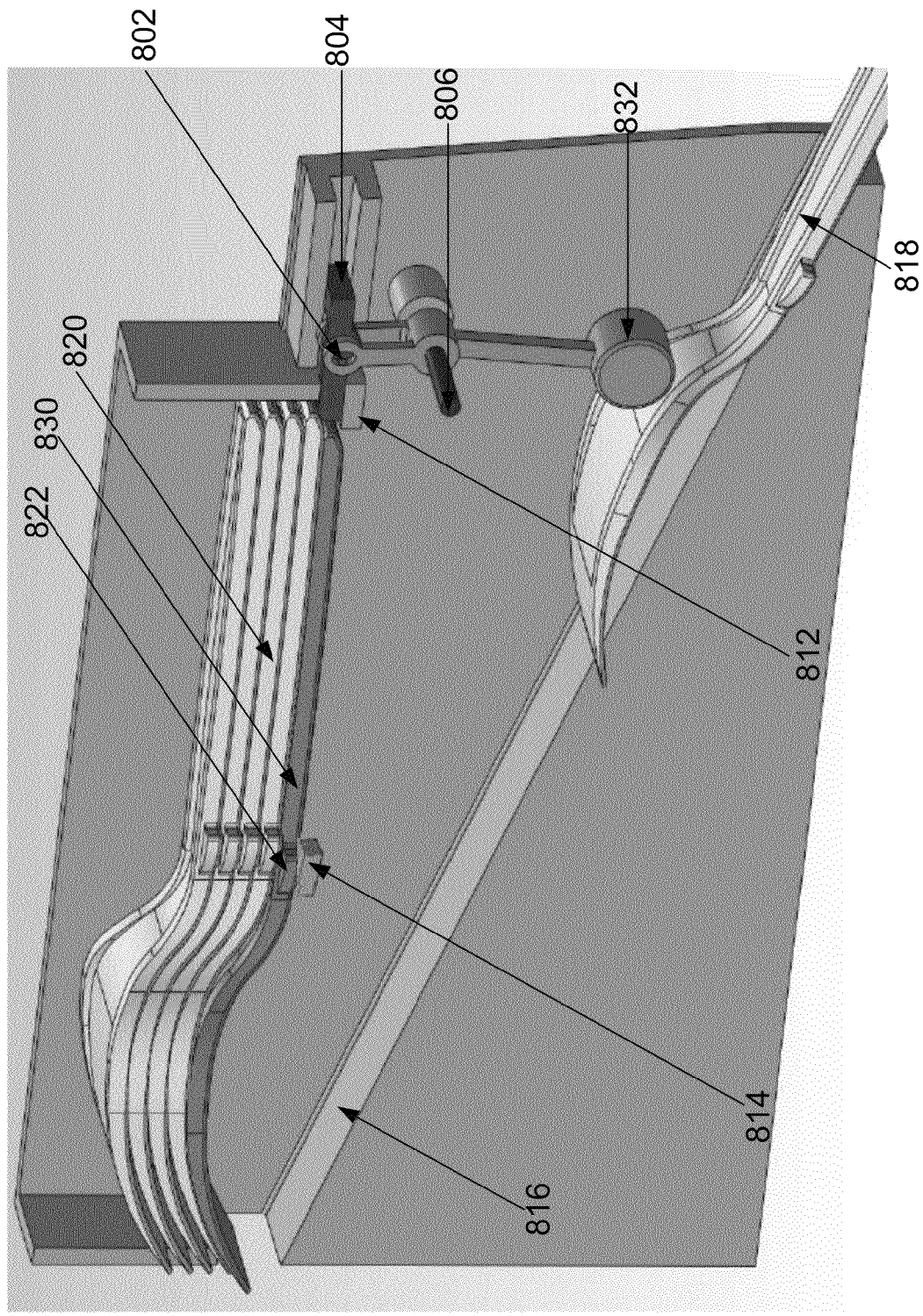
Figure 8D:
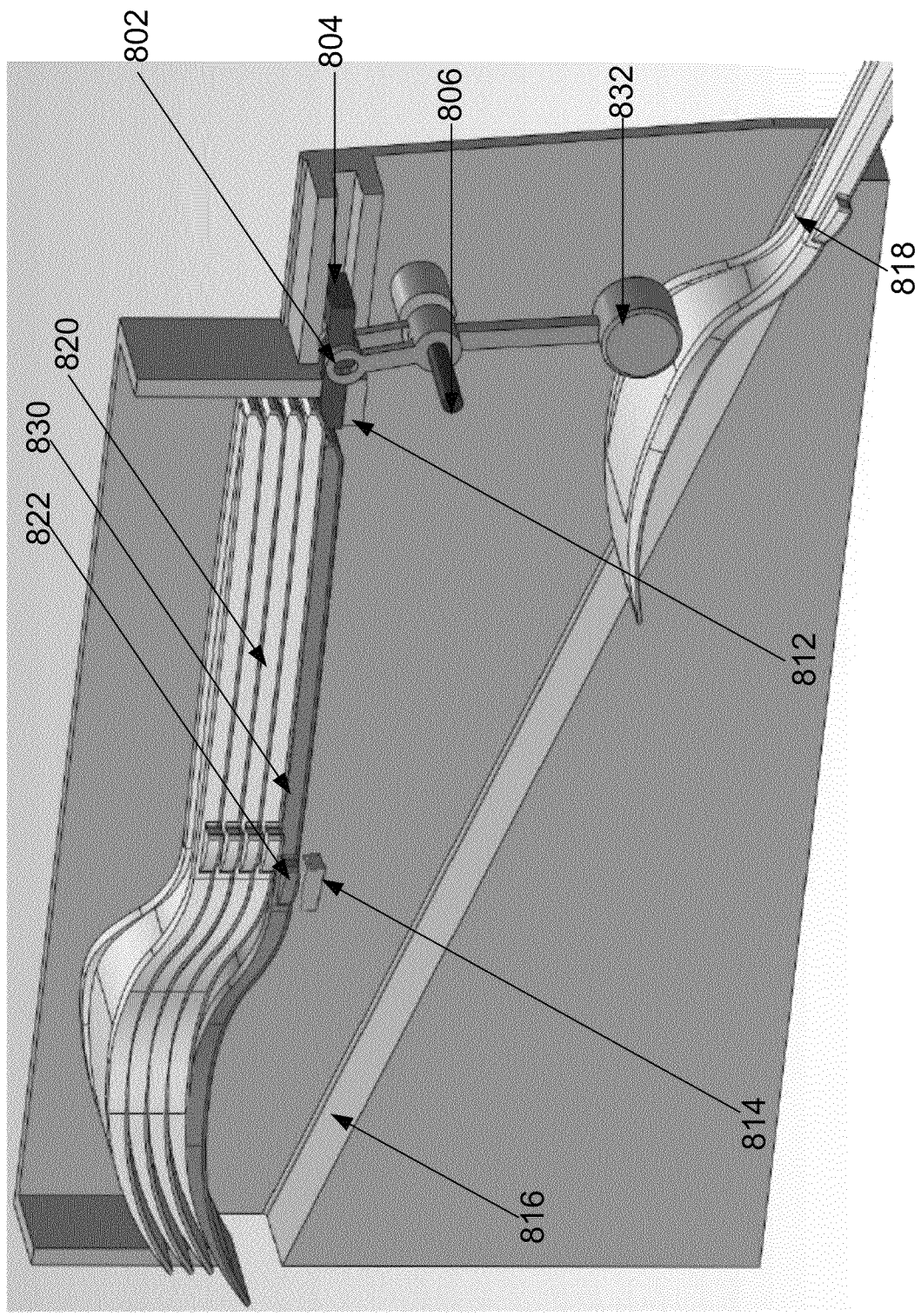
Figure 8E:
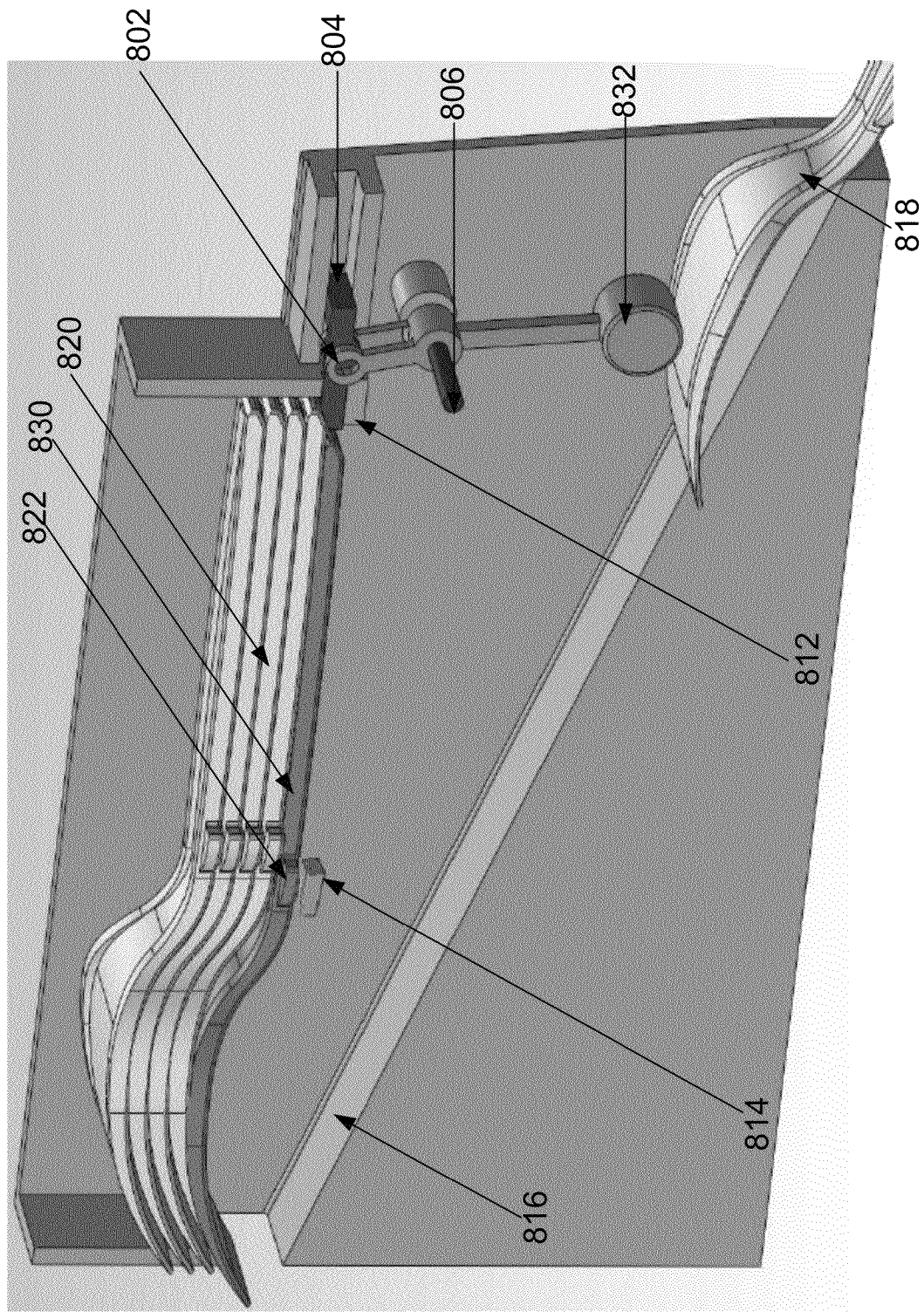
Figure 9A:
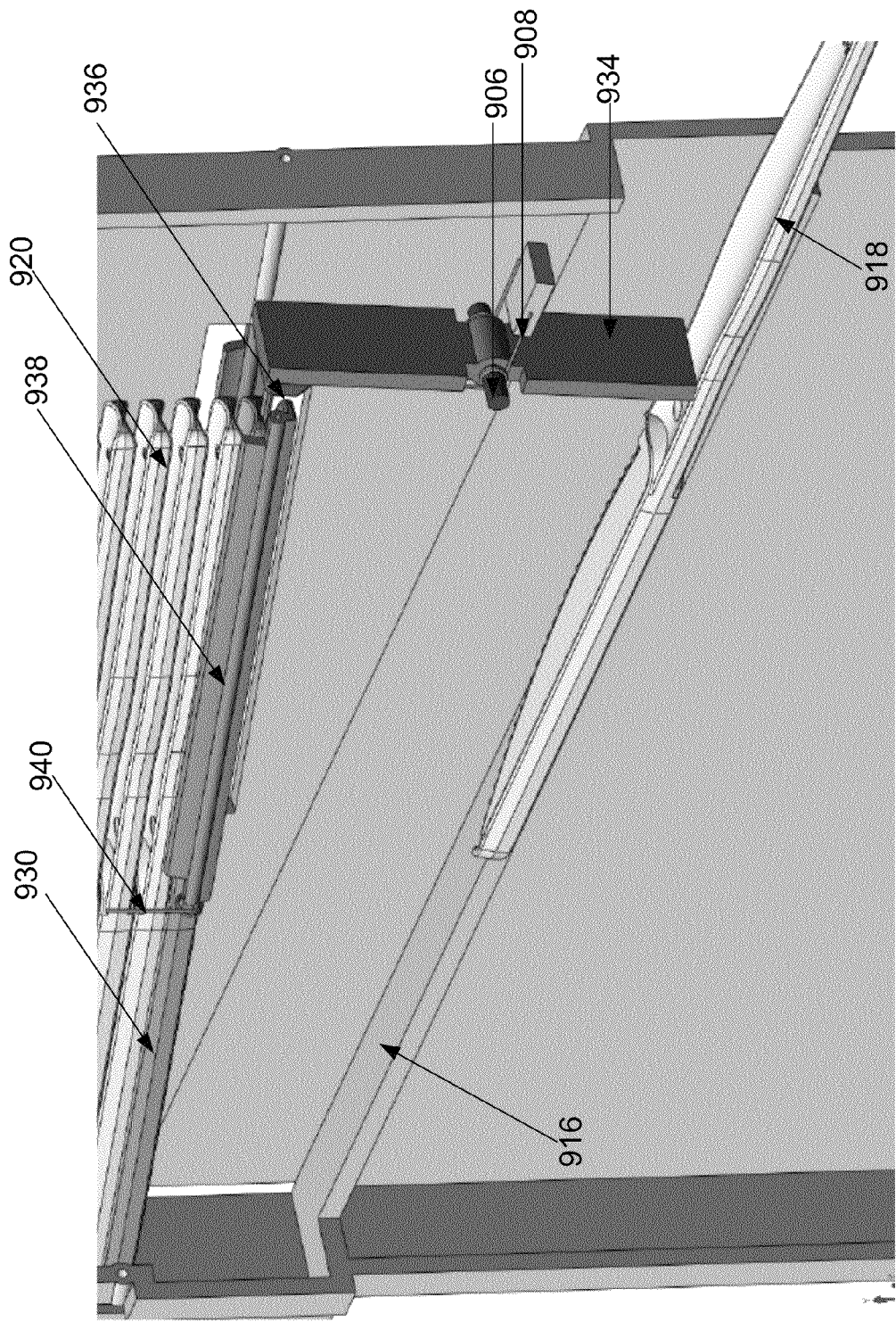
FIGS. 9A-9E are cross sectional views of a utensil dispenser in accordance with an additional illustrative implementation showing a utensil moving from a reservoir to a ready position.
Figure 9B:
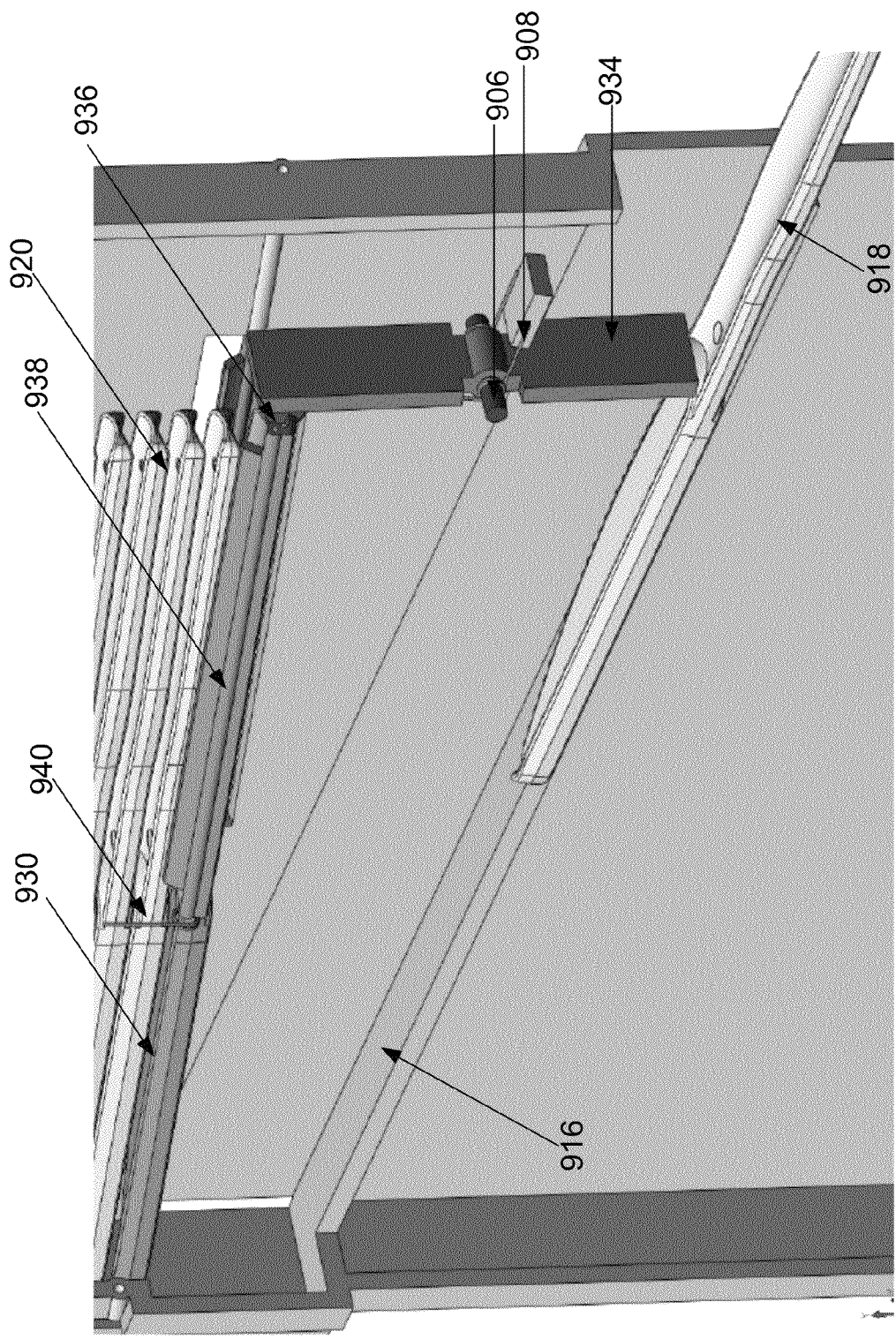
Figure 9C:
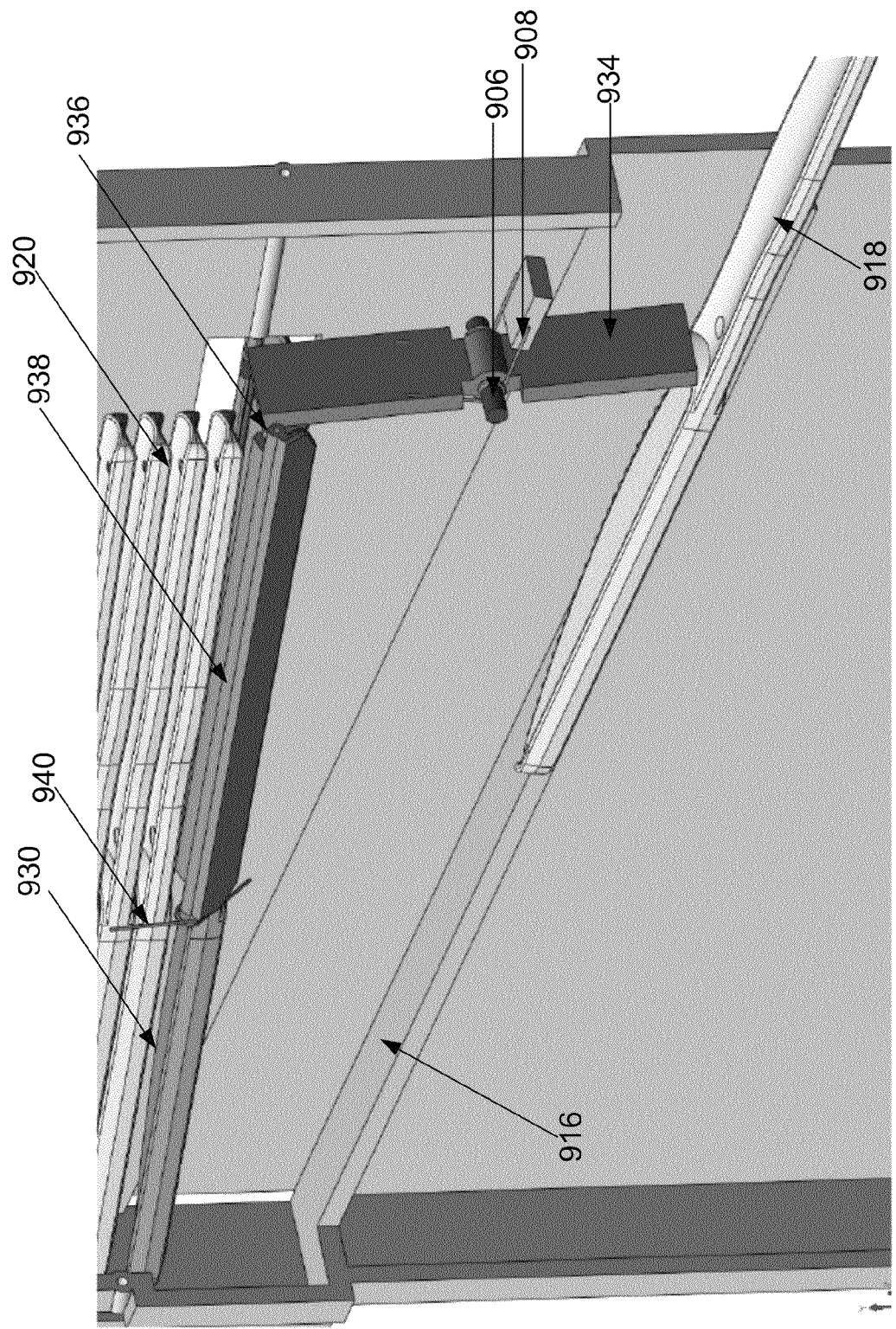
Figure 9D:
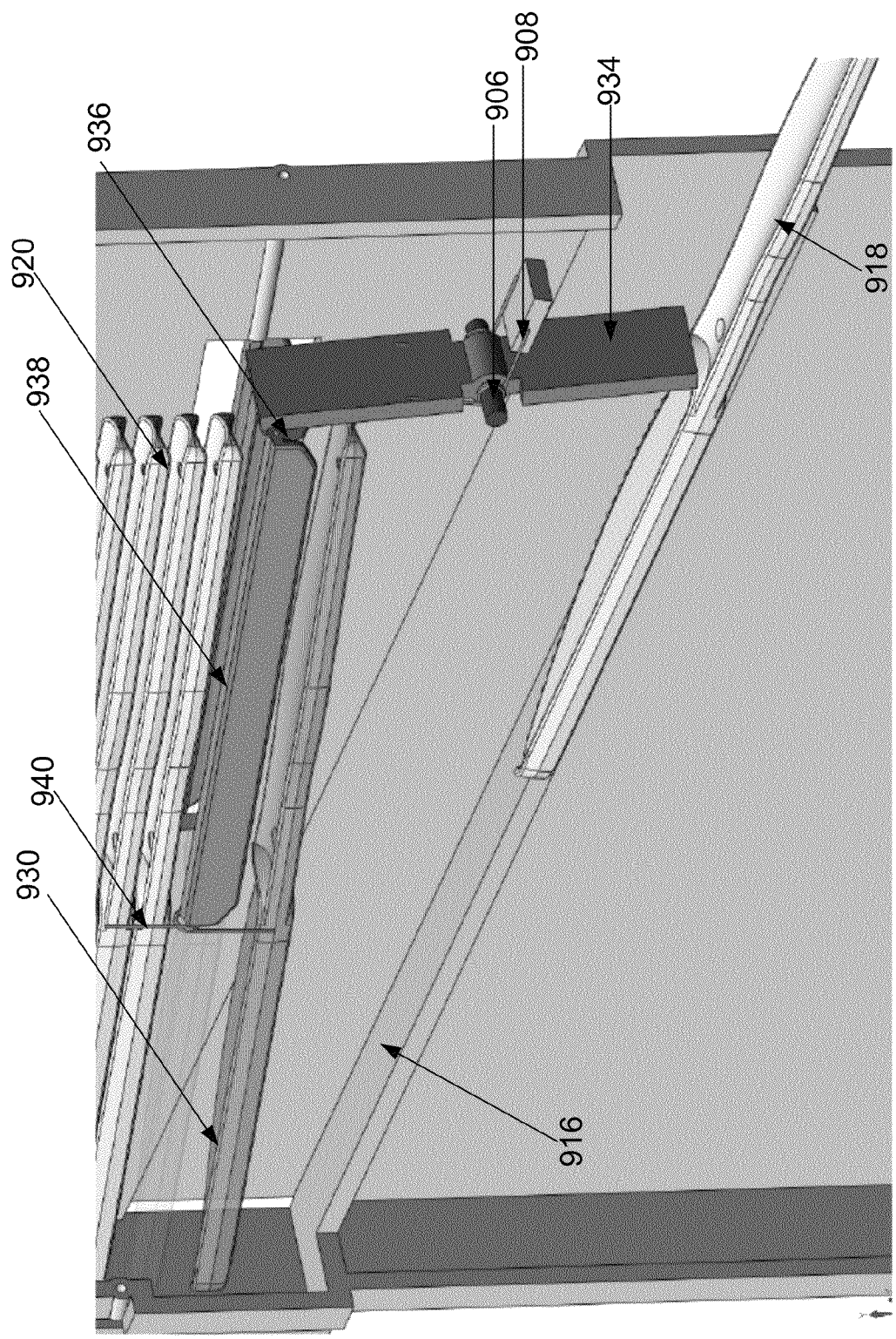
Figure 9E:
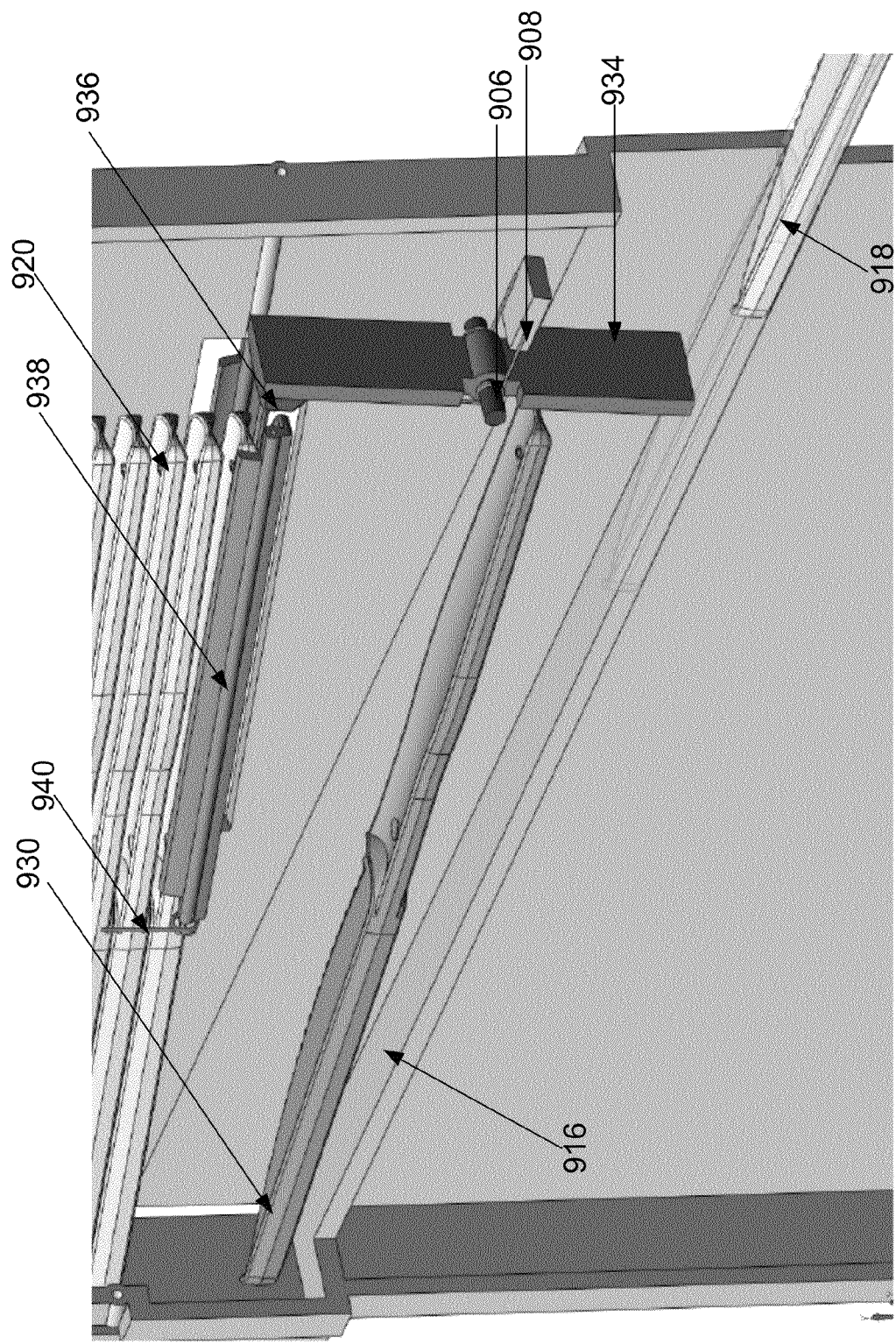

The dispensing of utensils can be enhanced based upon one or more features of the utensils themselves. FIG. 6 is a view of various features of utensils in accordance with an illustrative implementation. The handle end 602 of utensils can be chamfered. The chamfer can make it easier for the dispensing unit to pick between utensils. Similar to the chamfer, cutouts from the handle end 604 of utensils can also make it easier for the dispensing unit to pick between utensils. As the utensils can be stacked in cartridges, nesting features can be used to stabilize the utensil stack. A concave cavity 606 can be used such that one utensil can nest into another utensil. Detents 608 can be used to hold utensils in place when in the utensil dispenser. Detents 610 can be integrated into the ribbing of a utensil. One or more of these features can be used by various implementations of a utensil dispenser.

Each utensil dispenser dispenses a single piece of cutlery at a time. Various mechanisms can be used to dispense the utensils. FIGS. 7A-7E are a cross sectional view of a utensil dispenser in accordance with an illustrative implementation. A utensil 718 falls from a reservoir 720. The utensil 718 moves down a gravity feed ramp 716. The utensil 718 continues down the gravity feed ramp 716 until detents 724 on the utensil 718 come into contact with a drive pin actuation lever 710. At this point, the utensil's descent is stopped and a handle portion 726 of the utensil is exposed through an access port 728.

The drive pin actuation lever 710 is a spring loaded lever that operates a linear drive pin 704. The drive pin actuation lever 710 is connected to the linear drive pin 704 by a connection pin 702. An actuation lever return spring 708 returns the drive pin actuation lever 710 to a home position following a dispense cycle. In the home position, the drive pin actuation lever 710 stops the descent of the utensil 718 on the gravity feed ramp 716. When the handle portion 726 of the utensil 718 is pulled out from the utensil dispenser, the drive pin actuation lever 710 rotates around a pivot pin 706. Due to the rotation, the detents 724 become free of the drive pin actuation lever 710 allowing the utensil to be released from the access port 728 of the utensil dispenser.

The drive pin actuation lever 710 also operates the linear drive pin 704 to engage a next utensil 730 to fall from the reservoir 720 onto the gravity feed ramp 716. Prior to being released from the reservoir 720, the utensil 730 was held in the reservoir 720 by a front pedestal 714 and a rear pedestal 712. A handle portion of the utensil 730 rests on the rear pedestal 712 and detents 722 on either or both sides of the utensil 730 rest on the front pedestal 714. The drive pin actuation level 710 moves the linear drive pin 704 from a home position to a release position. When the drive pin actuation lever 710 engages the next utensil 730, the linear drive pin 704 is moved to a release position. In this position the linear drive pin 704 contacts a tail portion of the utensil 730, pushing the utensil in an opposite direction of the utensil 718 being removed. The next utensil 730 is pushed, causing the detents 722 and the handle portion to move past the front pedestal 714 and the rear pedestal 712. Once freed, the utensil 730 falls due to gravity to the gravity feed ramp 716. Once the utensil 718 passes the drive pin actuation lever 710, the actuation lever returns spring 708 return the drive pin actuation lever 710 to its home position. The detents 722 engage the drive pin actuation lever 710, and the next utensil is positioned to be dispensed.

In another implementation, utensils are dispensed using a barrel mechanism. FIGS. 8A-8E are a cross sectional view of a utensil dispenser in accordance with an illustrative implementation. Similar to the implementation illustrated in FIGS. 7A-7E, utensils are dispensed handle first from a dispensing unit. A utensil 818 slides down a gravity feed ramp 816 until a portion of the utensil 818 comes into contact with a drive pin actuation barrel 832. As the utensil 818 is pulled from the dispenser, the drive pin actuation barrel 832 rotates around a pivot pin 806. As the drive pin actuation barrel 832 moves, it engages the linear drive pin 804. The linear drive pin 804 is connected to the drive pin actuation barrel 832 by a connection pin 802.

A utensil 830 located initially in a reservoir 820 is freed from the reservoir by the linear drive pin 804. Wings or detents 822 on the utensil 830 are in contact with a front pedestal 814 and a tail portion of the utensil 830 rests on a rear pedestal 812. When actuated, the linear drive pin 804 pushes the utensil toward a back end of the dispenser. As the utensil 830 moves forward, the detents 822 move past the front pedestal 814 and the tail portion of the utensil 830 moves past the rear pedestal 812, causing the utensil 830 to fall to the gravity feed ramp 816. Once the utensil 818 is dispensed, the drive pin actuation barrel 832 returns to a home position. The utensil 830 continues to move down the gravity feed ramp 816 until the drive pin actuation barrel 832 stops its movement. In this position, a handle of the utensil 830 is exposed from the dispenser and is used to dispense the utensil 830.

In another implementation, utensils are dispensed using a hopper mechanism. FIGS. 9A-9E are a cross sectional view of a utensil dispenser in accordance with an illustrative implementation. Similar to the previously described dispensers, utensils are dispensed, handle first, from a utensil dispenser. Utensils waiting to be dispensed are kept in a reservoir 920. Utensils are held in the reservoir 920 by one or two doors 938. In one implementation, a single door is used to hold the utensils in the reservoir 920. In another implementation, a pair of doors is used. When a utensil 918 is pulled from the dispenser, an actuator 934 rotates around a pivot pin 906. A boss 936 at one end of the actuator 934 is in contact with the doors 938. As the boss 936 pushes against the doors 938, the doors 938 separate and a utensil 930 falls onto a gravity feed ramp 916. In one implementation, a second set of doors (not shown) are attached at an angle to a pivot point of the doors 938. As the boss 936 opens the doors 938, the second set of doors rotates inward such that the stack of utensils remain within the reservoir 920. The second set of doors open when the actuator 934 returns to a home position, allowing a utensil to move into position for being dispersed. A spring 940 causes the doors to close once the actuator 934 returns to a home position. The utensil 930 continues down the gravity feed ramp 916 until a portion of the utensil 930 comes into contact with the actuator 934. An actuator return spring 908 returns the actuator 934 to the home position. In this home position, the actuator 934 stops the utensil 918 such that the handle of the utensil 918 is accessible.

Figure 10:
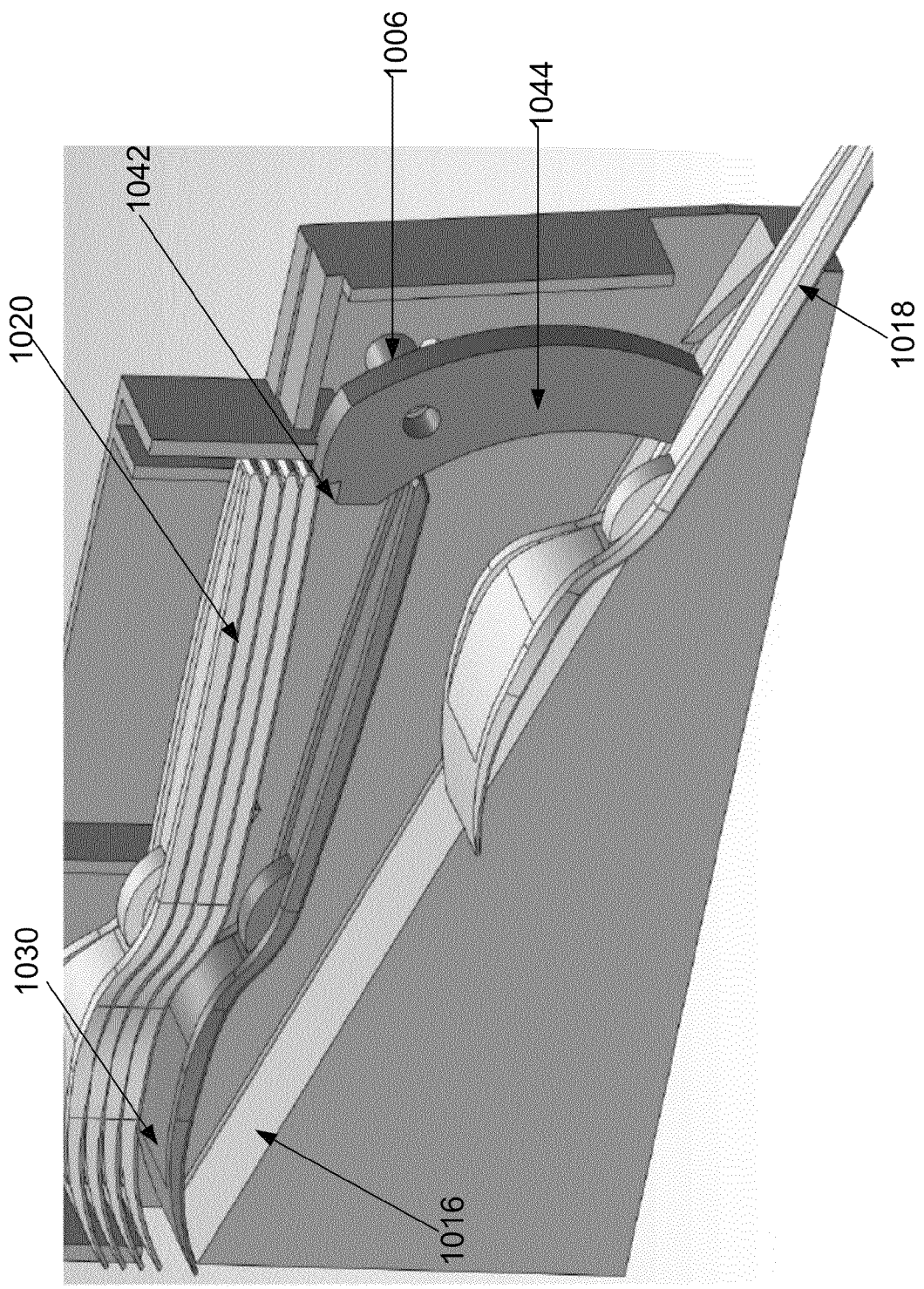
FIG. 10 is a cross sectional view of a utensil dispenser in accordance with another illustrative implementation.

In another implementation, utensils are dispensed using a picker mechanism. FIG. 10 is a cross sectional view of a utensil dispenser in accordance with an illustrative implementation. In this implementation, a utensil 1018 is held in place by an actuator 1044. When a utensil is held in place a tail portion of the utensil 1018 is located outside the dispenser while the head portion of the utensil 1018 remains within the dispenser. Utensils located in a reservoir 1020 are stored for future dispersing. A utensil 1030 remains in the reservoir 1020 based upon a notch 1042 within an actuator 1044 and a top portion of a gravity feed ramp 1016. For example, one end of the utensil 1030 rests on the top portion of the gravity feed ramp 1016, and its opposite end fits within the notch 1042. When the utensil 1018 is pulled out from the dispenser, the actuator 1044 rotates around a pivot pin 1006. The rotation causes the notch to move and release the utensil 1030. The utensil falls onto and proceeds down the gravity feed ramp 1016 until a portion of the utensil comes into contact with the actuator 1044 in a home position. In the home position, the actuator 1044 stops a utensil 1018 such that the tail portion of the utensil 1018 is exposed.

Figure 11:
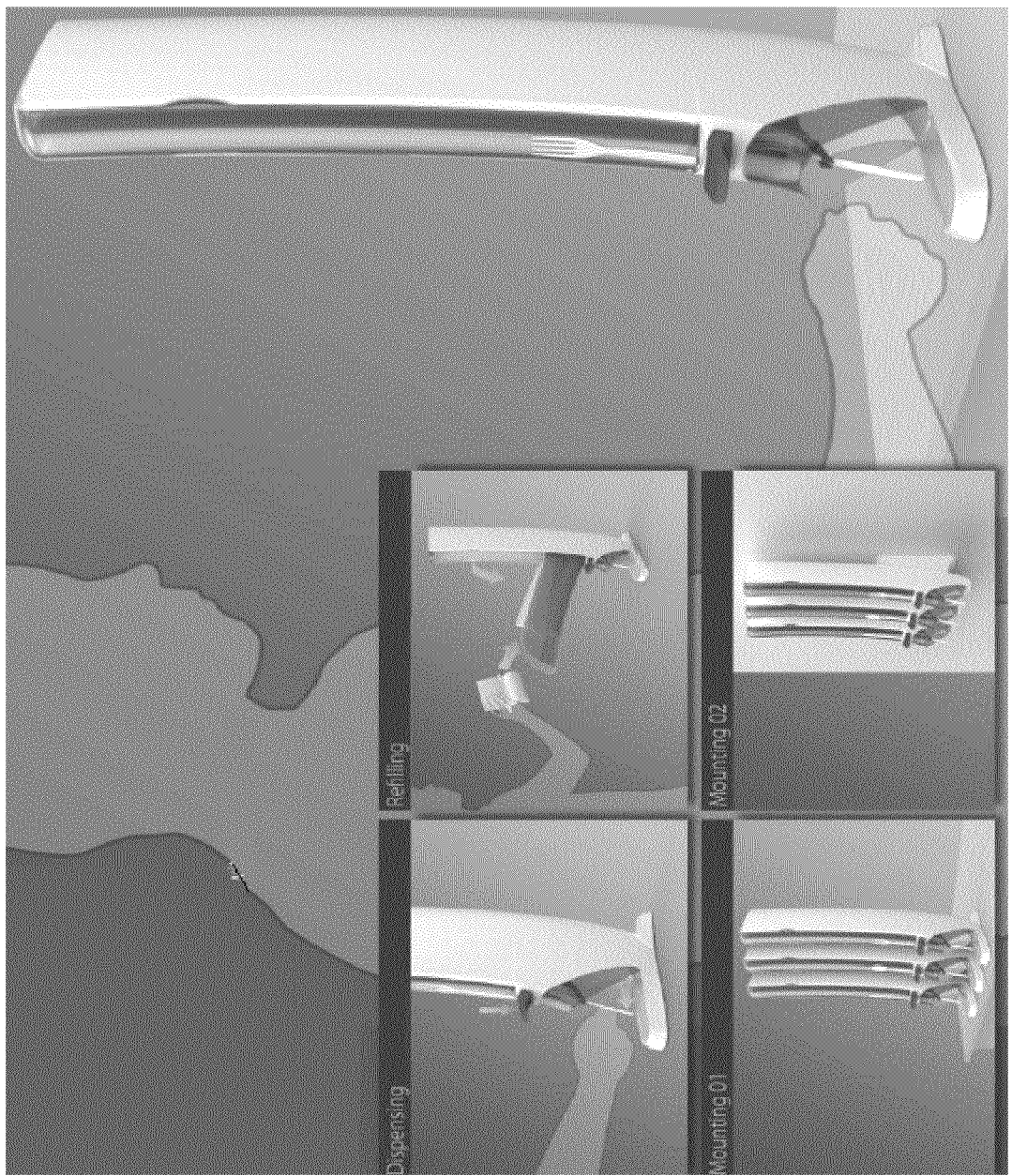
FIG. 11 is a multi-view illustration of a utensil dispenser in accordance with an additional illustrative implementation.

Various other implementations of a utensil dispenser are also possible. FIG. 11 is one such example and is a multi-view illustration of a utensil dispenser in accordance with an illustrative implementation. In this implementation, utensils are not stacked horizontally on top of one another in a storage cartridge. Rather, the utensils are stacked in a semi-vertical configuration on a guiding rail. As a piece of cutlery is removed, a switch releases the cutlery from the guiding rail. In this implementation, each utensil has a key slot molded into it that can be used to bundle the utensils for loading into the dispenser. The guiding rail can also engage the molded slot in the utensils to convey each utensil to a user. This configuration allows utensils to be presented in a vertical fashion as illustrated in FIG. 11.

Figure 12:
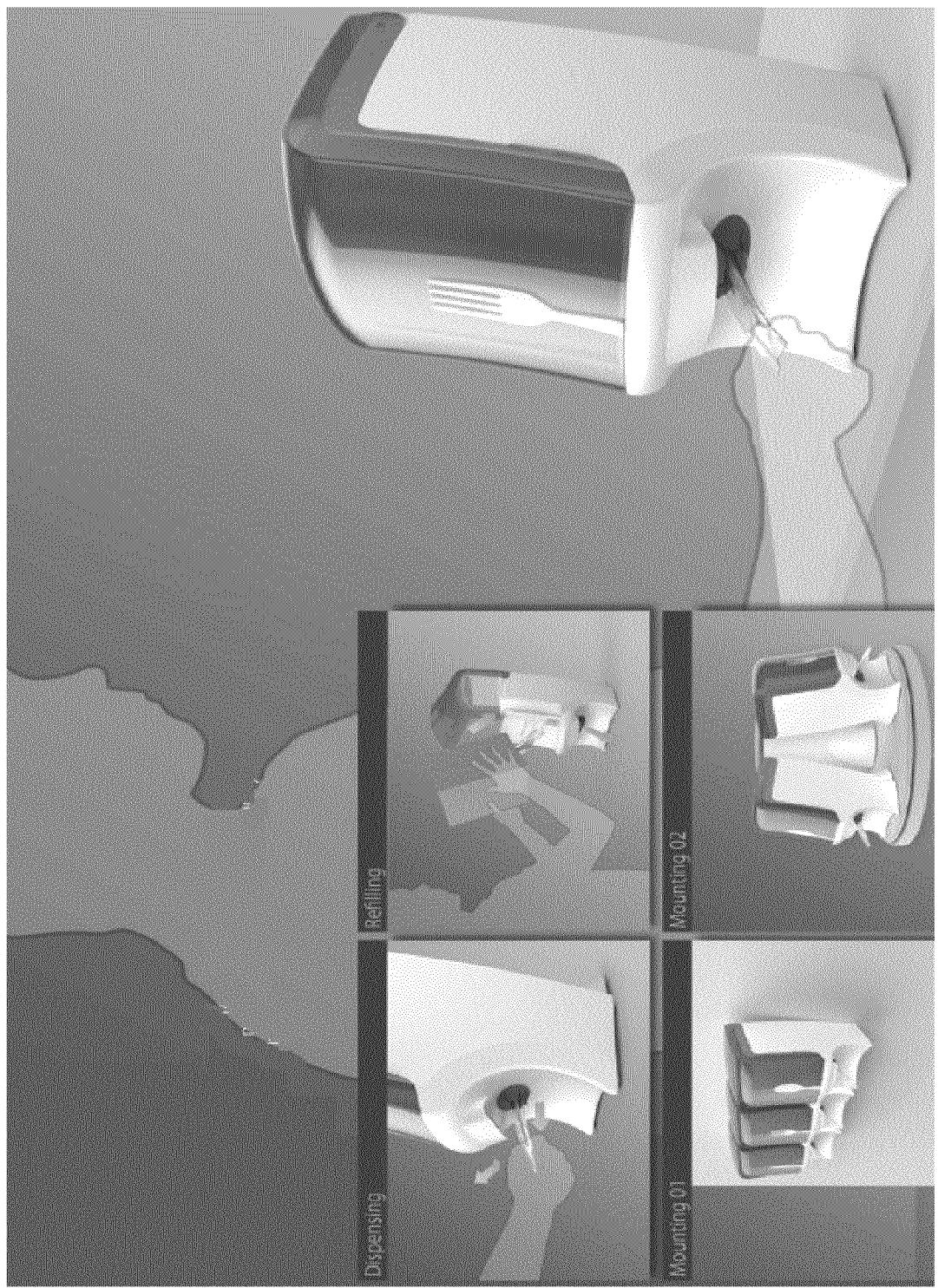
FIG. 12 is a multi-view illustration of a utensil dispenser in accordance with another illustrative implementation.
Figure 14:
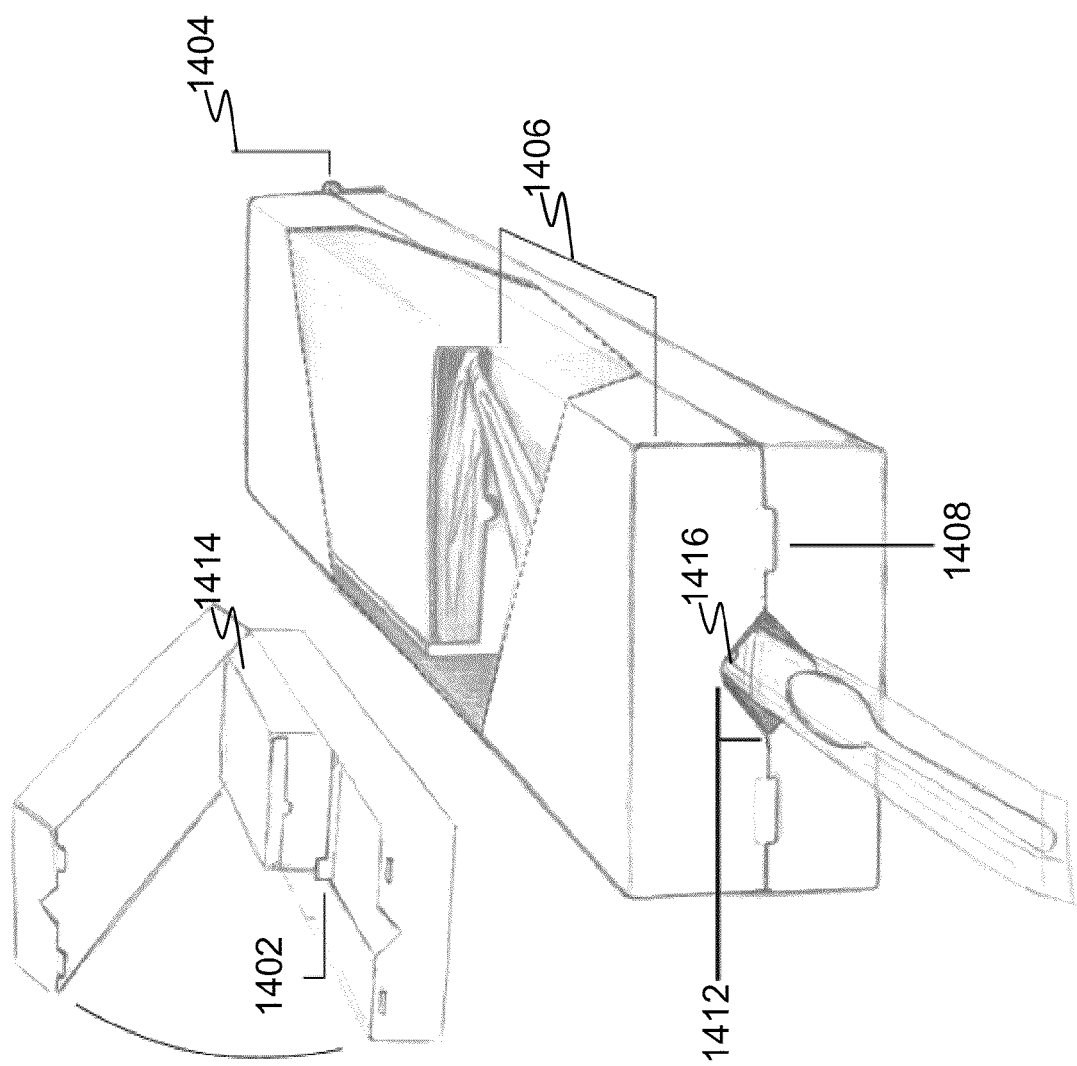
FIG. 14 is a front perspective view of a utensil dispenser in accordance with another illustrative implementation.

In another implementation, the stored utensils can be wrapped in plastic. FIG. 12 is a multi-view illustration of a utensil dispenser in accordance with an illustrative implementation. The plastic encases the utensils and each utensil is linked together with a perforation between each utensil. As a utensil is pulled away from the dispenser, the next connected utensil is brought out of the dispenser. The perforation allows the plastic wrapped utensil to be removed from the other utensils. A similar implementation is shown in FIG. 14, which is a front perspective view of a utensil dispenser in accordance with an illustrative implementation. A cartridge 1414 contains plastic wrapped utensils that are linked together. A hinge 1404 in the back of the dispenser can be used to open the dispenser for loading the cartridge 1414. A lip 1402 keeps the cartridge 1414 in place near the back of the dispenser. In other implementations one or more tabs can be used to hold the cartridge in place. The plastic wrapped utensils are threaded through an opening 1416 in the front of the dispenser. Corners 1412 of the opening can provide a mechanism to tear a perforation in the linked utensils. A space 1406 located between the cartridge 1414 and the opening 1416 allows room for the linked utensils to unfold from the cartridge 1414.

Figure 13:
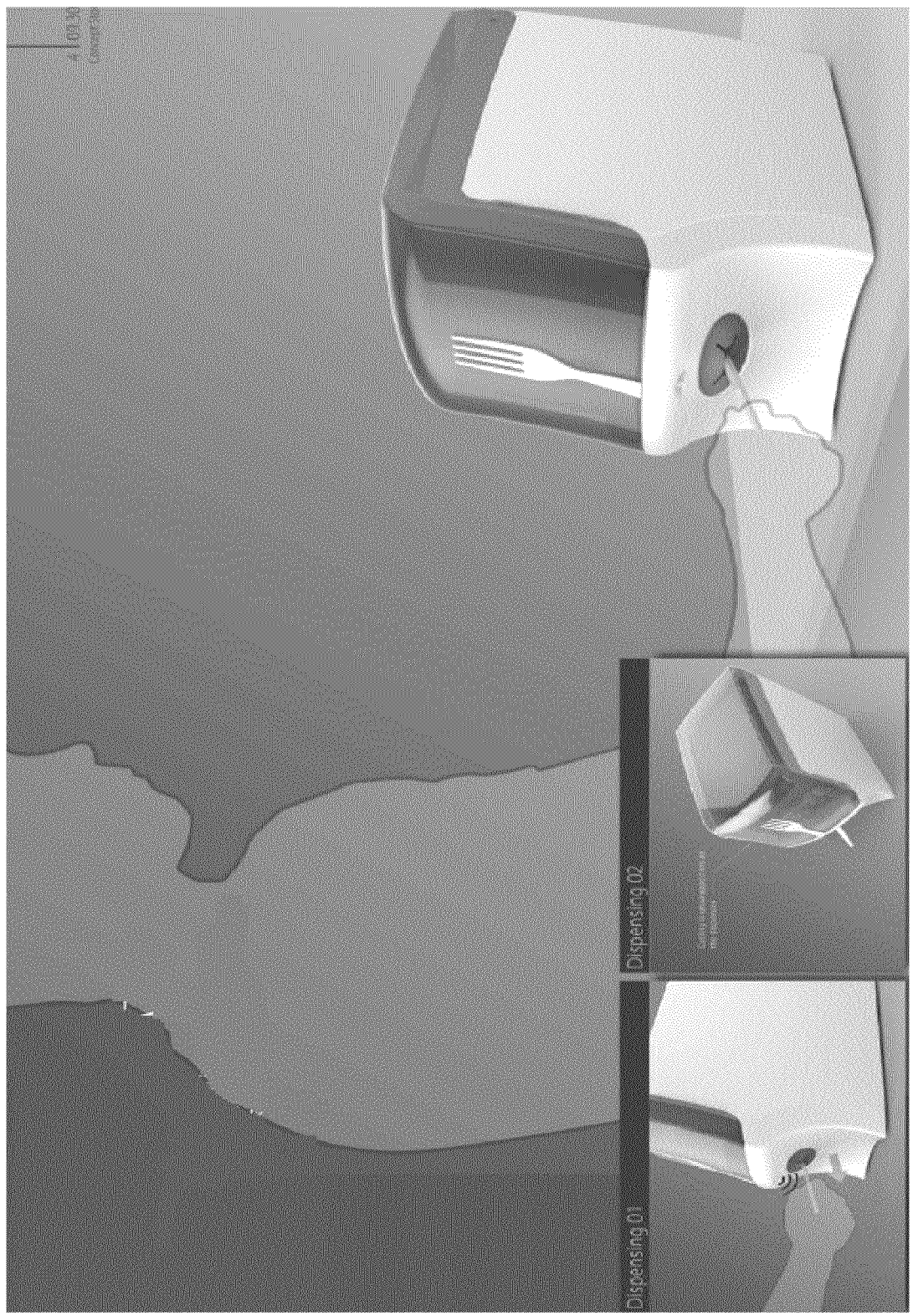
FIG. 13 is a multi-view illustration of a utensil dispenser in accordance with an additional illustrative implementation.

In another implementation, the dispenser removes the plastic wrap from the utensil as the utensil is dispensed. FIG. 13 is a multi-view illustration of a utensil dispenser in accordance with an illustrative implementation. A number of plastic wrapped utensils are linked together by the plastic wrap and stored in a cartridge. The plastic wrap has a perforation along the entire length of the linked utensils. A sensor, such as an infra-red sensor, movement sensor, light sensor, etc., can be used to detect a presence of a user. Upon such detection, the dispenser automatically dispenses one utensil. Rollers are used to push the linked utensils forward toward an opening of the dispenser. A second roller is used to pull the plastic away from the utensil, causing the perforation to open and the unwrapped utensil to be dispensed.

Figure 15:
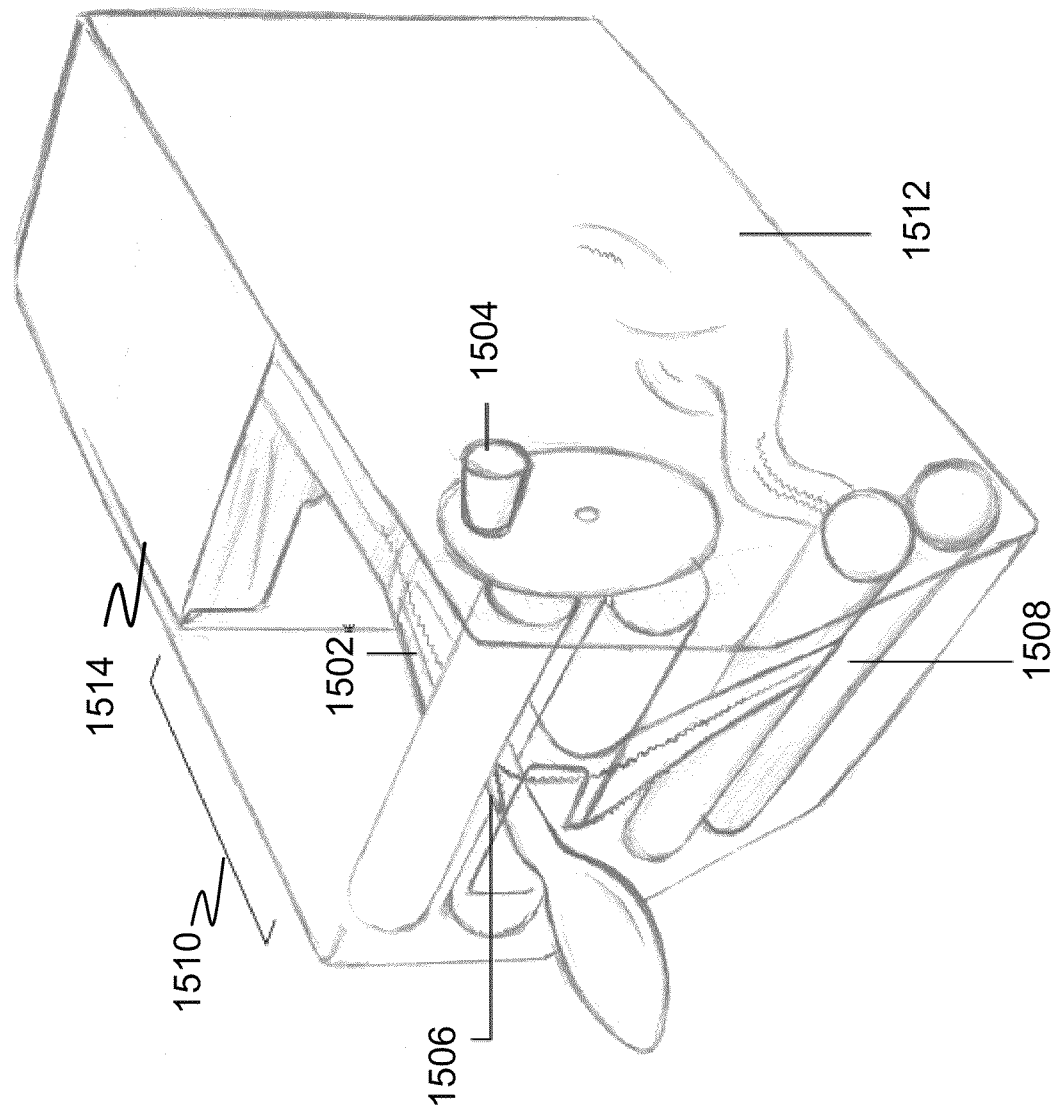
FIG. 15 is a front perspective view of a utensil dispenser in accordance with an additional illustrative implementation.

FIG. 15 is a related implementation, in that the plastic wrap is removed from the utensil as the utensil is dispensed. A cartridge 1514 holds the plastic wrapped utensils. A perforation 1502 in the plastic wrap extends along the entire length of utensils. A hand crank 1504 is used to rotate a first pair of rollers 1506. In another implementation, a single roller can be used along with an immobile body. The rollers 1506 pull the linked utensils forward. An opening 1510 within the dispenser allows the linked utensils an area to unfold. A second set of rollers 1508 is attached to the plastic wrap and pulls downward on the plastic wrap as the utensil exits the first set of rollers 1506. The second set of rollers 1508 cause the perforation 1502 to open. The unwrapped utensil then exits through an opening in the dispenser. A waste collection area can be included in the dispenser to collect the plastic wrap. In another implementation, a handle portion of the utensils exits the dispenser before the head portion.

Figure 16:
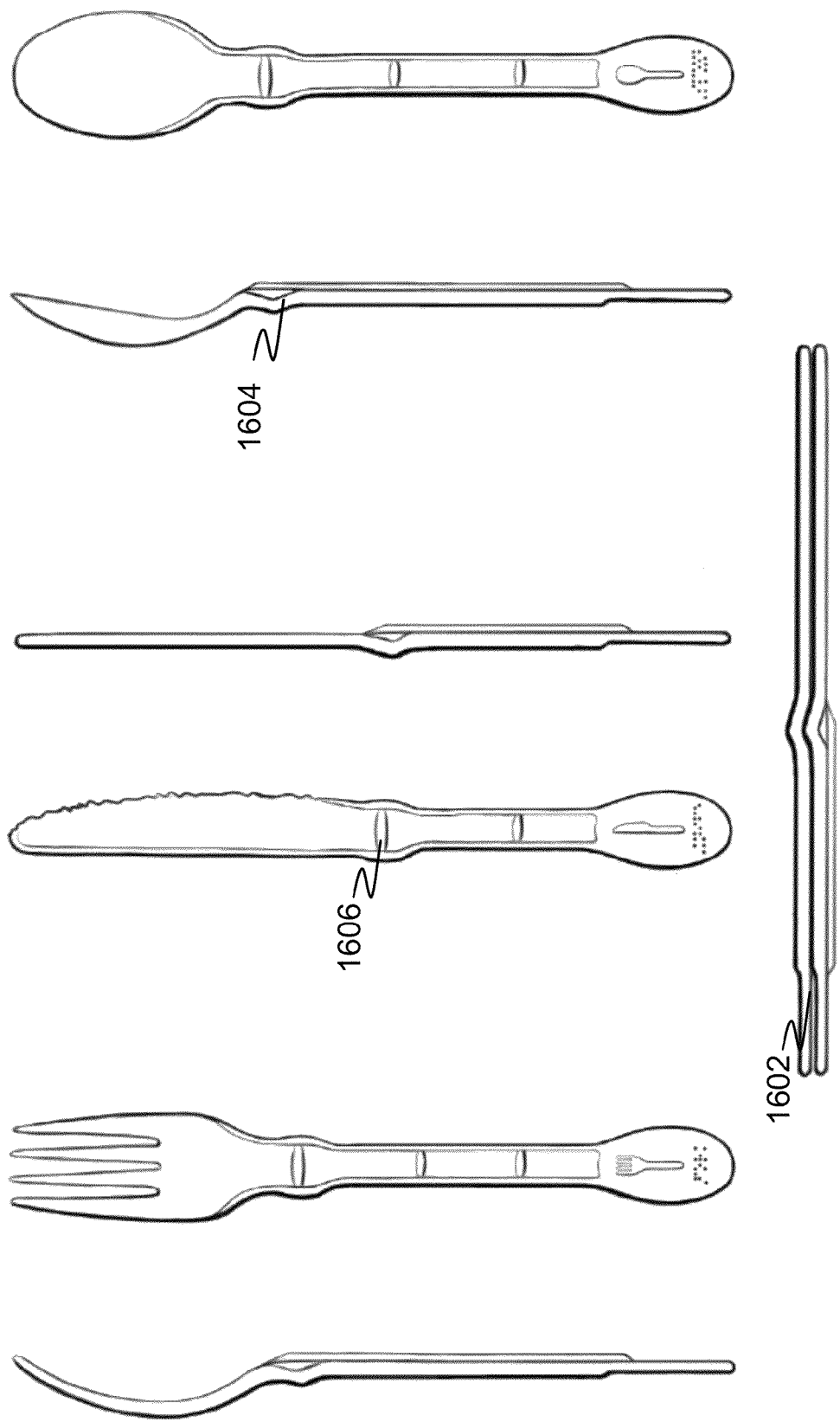
FIG. 16 is a view of utensils for use in a utensil dispenser in accordance with another illustrative implementation.

In various implementations, features of the utensils are used to help control the dispensing of the utensils. FIG. 16 is a view of utensils for use in a utensil dispenser in accordance with an illustrative implementation. Cutouts 1602 at the end of utensils can be used to help the various linear drive pins separate utensils. The utensils can include a concave cavity 1604 that can be used to help nest utensils together. Such cavities 1604 can provide stability to a vertical stack of utensils. Detents 1606 can be included in utensils and can be used to halt the movement of a utensil down a gravity feed ramp.

In addition to the above described features, various implementations of the dispensers dispense utensils handle first. In some implementations, the handle portion of utensils can be visible prior to the utensil being dispensed. The handle portion therefore provides an opportunity to provide information to users of the dispenser. FIG. 17 is a view of handles of utensils for use in a utensil dispenser in accordance with an illustrative implementation. Various textures can be used on the handles for an aesthetic feature. For example, a protrusion 1702, textures 1704, depressions 1706, lettering 1708, or icons 1710 can be used. The lettering and/or the icons can indicate the type of utensil being dispensed. In addition, Braille can be added to the handle of the utensil that identifies the utensil.

Various described implementations can use a cartridge to load the dispenser. FIG. 18 is a flow-illustration of loading a utensil dispenser in accordance with an illustrative implementation. A cartridge 1802 can indicate the type of utensils contained within the cartridge. A perforation at the bottom of the cartridge can be removed 1804. A piece of tape covers a portion or all of the utensils, such that the tape helps retain the utensils as the cartridge is being loaded into the dispenser. Prior to placing the cartridge in the dispenser, a tab connected to the tape can be folded over 1806. Once the cartridge is placed in the dispenser, the tab can be pulled to remove the tape and release the utensils into the dispenser 1808. In another implementation, a chipboard panel is used to help hold the utensils in place. Pulling the tab also pulls the chipboard off of the cartridge to complete the drop of utensils into the dispenser. FIGS. 19A-19A illustrate opening a cartridge of utensils for use in a utensil dispenser in accordance with an illustrative implementation. A cartridge 1902 includes an attached chipboard and tape 1906. A tab 1908 is connected to the tape. The tab 1908 is used to pull the tape and the chipboard 1906 to open the cartridge 1904. Once the tape and chipboard 1906 are removed from the cartridge, the utensils within the cartridge fall into the reservoir of the dispenser.

Figure 20:
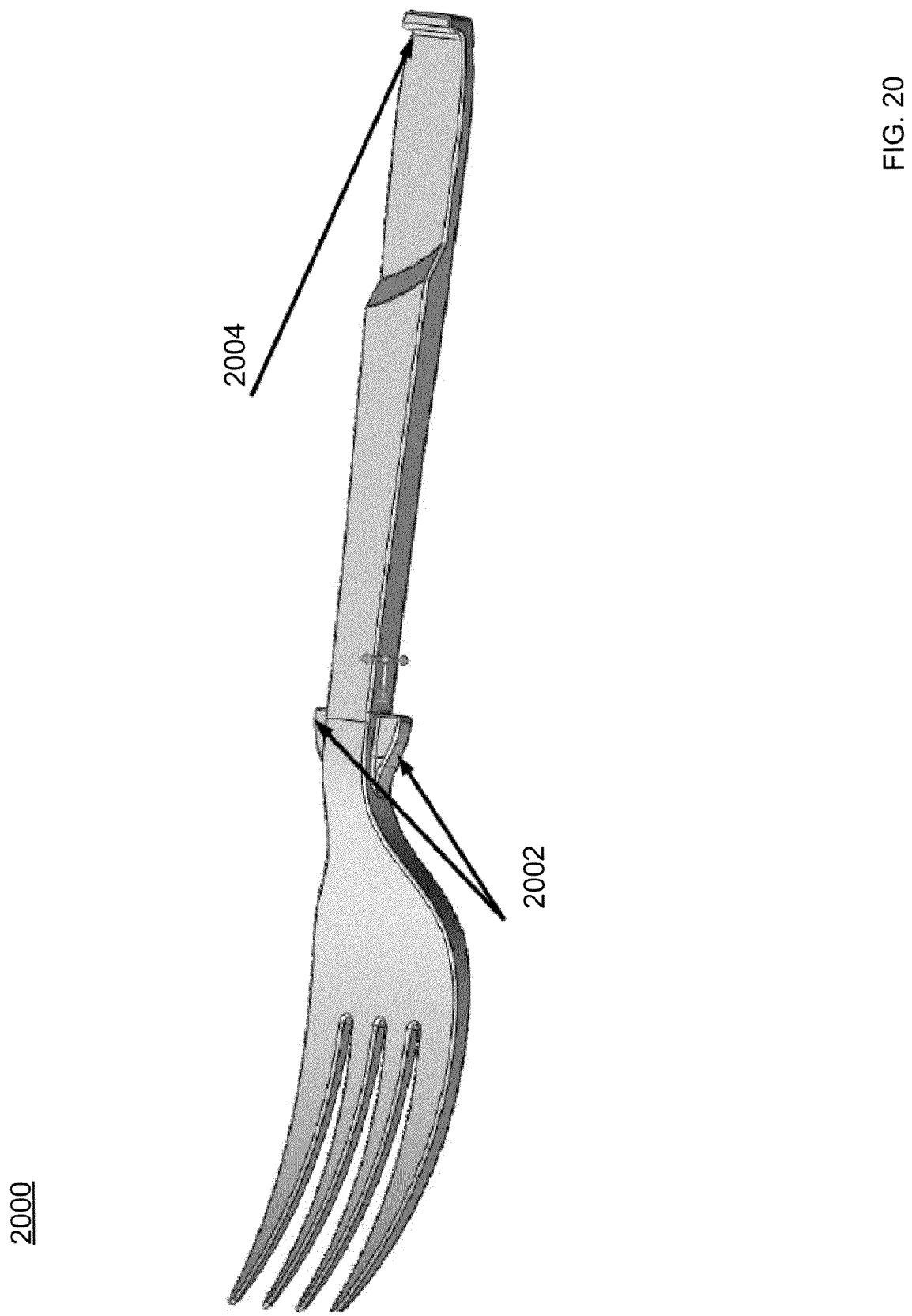
FIG. 20 illustrates a perspective view a fork for use in a utensil dispenser in accordance with another illustrative implementation.

Various utensils can be used in the numerous utensil dispensers described herein. FIG. 20 illustrates one such utensil and is a perspective view a fork for use in a utensil dispenser in accordance with an illustrative implementation. In the embodiment depicted in FIG. 20, wings or detents 2002 are on each side of the fork 2000. The wings or detents 2002 are molded into the fork and other utensils and provide a surface to rest against a front pedestal of a utensil dispenser. The front pedestal can provide support for the fork 2000 as well as any other stacked forks within the utensil dispenser. The wings or detents 2002 also contact an activation lever, for example, but not limited to, the drive pin actuation lever 710 of FIGS. 7A-7E; or a cam actuation lever of FIG. 21. When a utensil is pulled from the dispenser, the wings or detents 2002 pull the activation lever forward activating the mechanism to dispense the next piece of cutlery from the reservoir.

The fork 2000 can also includes a tail support 2004 molded into the fork 2000. The tail support 2004 can rest against a rear pedestal of the utensil dispenser. The rear pedestal, along with the front pedestal, provide support for the stack of utensils in the reservoir. The tail support 2004 also provides a surface for a drive pin to contact the fork 2000 to dispense the fork 2000 from the reservoir. A user of the fork 2000 can also use the tail support 2004 as a surface to hold onto the fork 2000 while pulling the fork 2000 from the utensil dispenser. The wings or detents 2002 and the tail support 2004 can be incorporated into other utensils such as, but not limited to, spoons, knives, sporks, etc.

Figure 21:
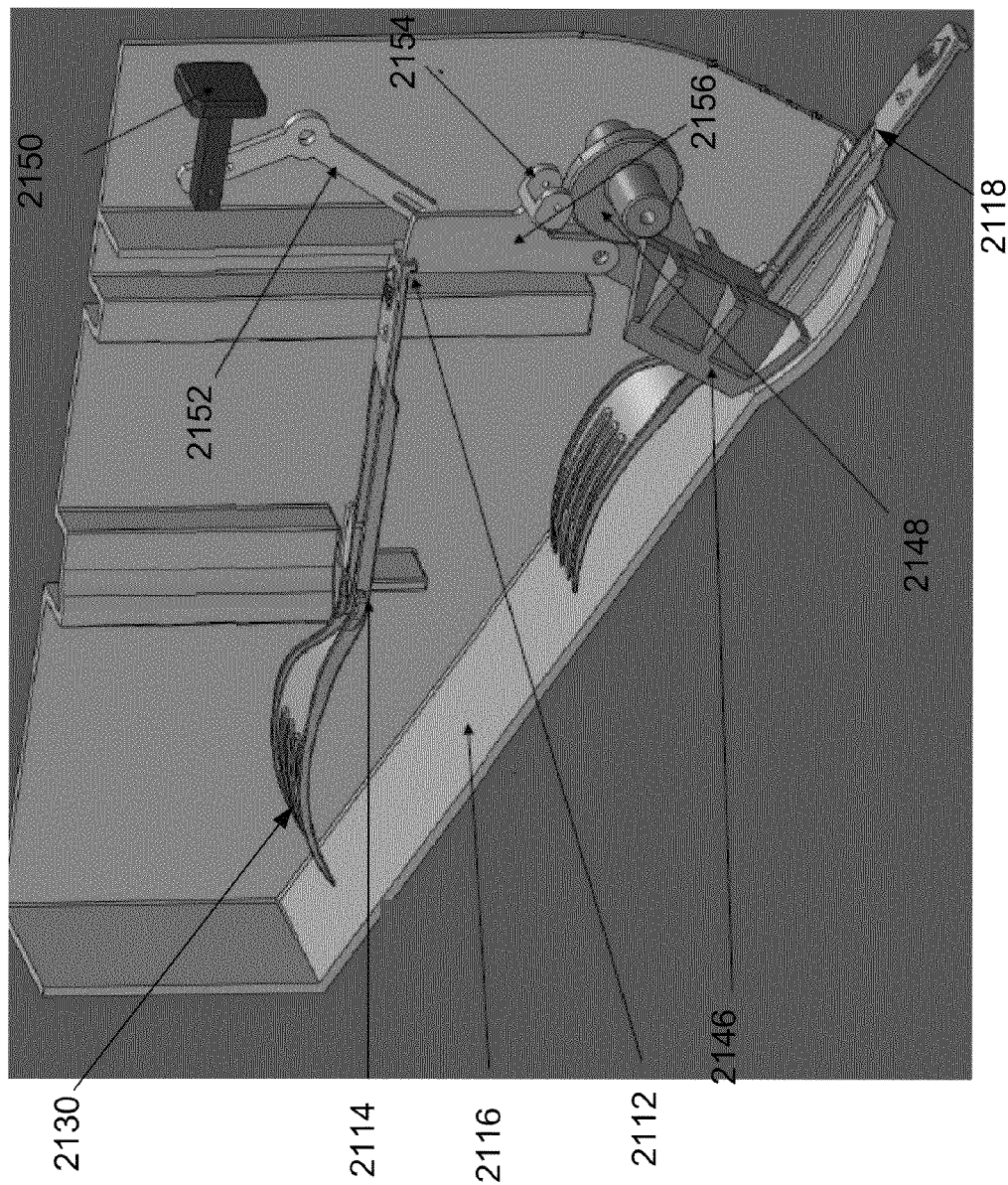
FIG. 21 illustrates a cross sectional view of a utensil dispenser in accordance with an additional illustrative implementation.

In another implementation, utensils are dispensed using a cam system. FIG. 21 illustrates a cross sectional view of a utensil dispenser in accordance with an illustrative implementation. Similar to the implementation illustrated in FIGS. 7A-7E, utensils in the embodiment depicted in FIG. 21 are dispensed handle first from a dispensing unit. A utensil 2118 slides down a gravity feed ramp 2116 until a portion of the utensil 2118 comes into contact with an actuating cam lever 2146. For example, in the embodiment depicted in FIG. 21, wings or detents on the utensil 2118 contact the actuating cam lever 2146. This contact prevents the utensil 2118 from continuing to move down the gravity feed ramp 2116. The actuating cam lever 2146 is a spring loaded lever that rotates an actuating cam 2148 against a cam follower 2154 to activate a drive hammer 2156. The actuating cam 2148 is connected to the cam actuating lever 2146. The drive hammer 2156 pushes cutlery off of one or more pedestals, for example front and rear pedestals as described above, allowing a single utensil to drop onto the gravity feed ramp 2116. The cam follower 2154 includes a roller that follows the actuating cam 2148 that activates the drive hammer 2156.

A utensil 2130 located initially in a reservoir is freed from the reservoir by the drive hammer 2156. Wings or detents on the utensil 2130 are in contact with a front pedestal 2114 and a tail portion of the utensil 2130 rests on a rear pedestal 2112. When actuated, the drive hammer 2156 pushes the utensil toward a back end of the dispenser. As the utensil 2130 moves forward, the detents move past the front pedestal 2114 and the tail portion of the utensil 2130 moves past the rear pedestal 2112, causing the utensil 2130 to fall to the gravity feed ramp 2116. Once the utensil 2118 is dispensed, the cam actuation lever 2146 returns to a home position. The utensil 2130 continues to move down the gravity feed ramp 2116 until the cam actuation lever 2146 stops its movement. In this position, a handle of the utensil 2130 is exposed from the dispenser and can be used to dispense the utensil 2130.

The utensil dispenser can include a manual activation button 2150. The manual activation button 2150 is connected to a manual activation lever 2152 that bypasses the cam activated mechanism to dispense a utensil. The manual activation level 2152 is connected to the drive hammer 2156. Pressing the manual activation button 2150, engages the drive hammer 2156 to push the utensil 2130 off of the pedestals and onto the gravity feed ramp 2116.

Figure 22:
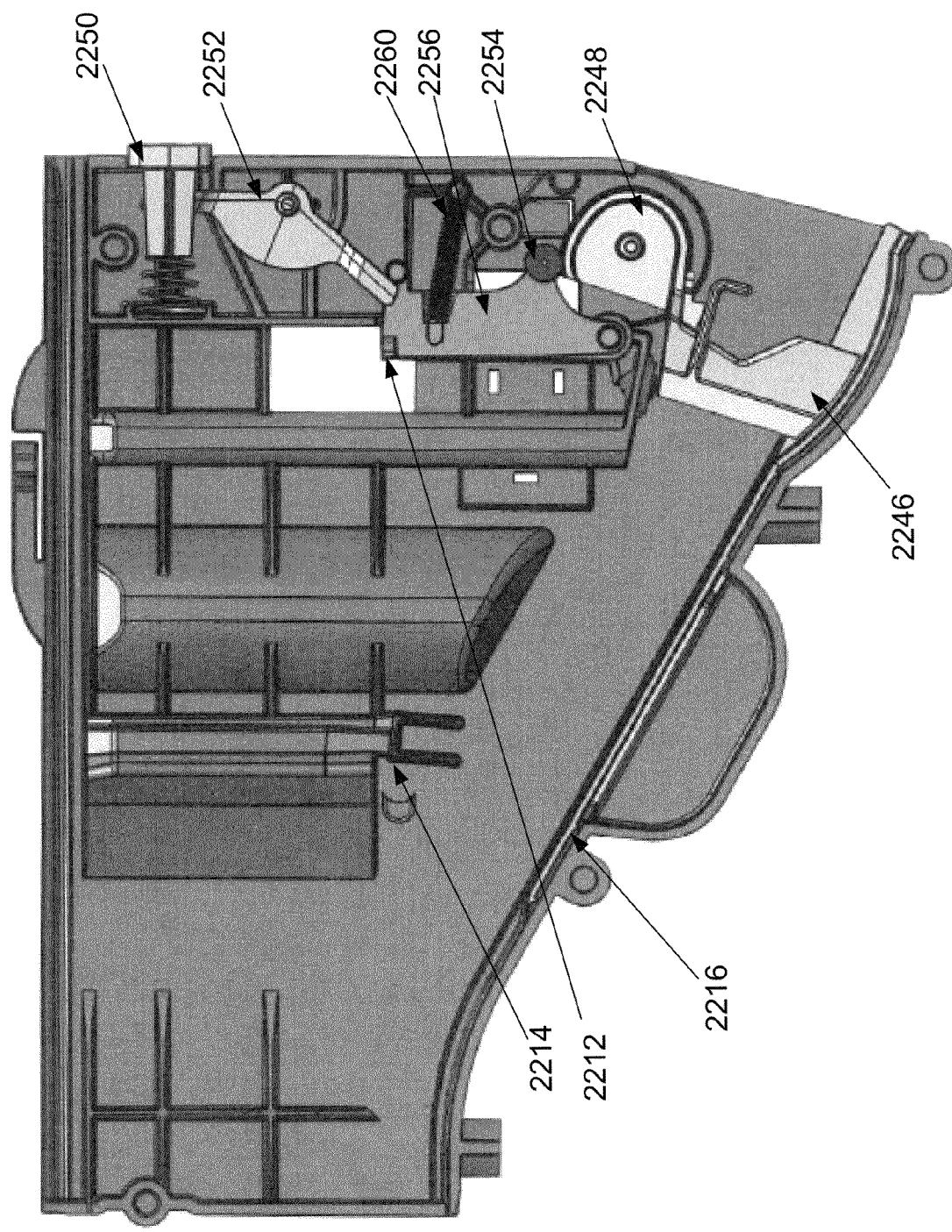
FIG. 22 illustrates a cross section view of a utensil dispenser in accordance with an additional illustrative implementation.

FIGS. 22-26, 27A-33A, and 27B-33B illustrate another implementation that uses a cam system to dispense utensils similar to the implementation shown in FIG. 21. FIG. 22 illustrates a cross section view of the utensil dispenser. Utensils to be dispensed are located in a reservoir and are supported by a front pedestal 2214 and a rear pedestal 2212. The utensils are positioned to rest on the front pedestal 2214 and the rear pedestal 2212. The next utensil to be dispensed (not shown) is positioned on a gravity feed ramp 2216, such that a tail portion of the utensil extrudes from the utensil dispenser. In this position, the utensil is in contact with an actuating cam lever 2246, which prevents the utensil from continuing to move down the gravity feed ramp 2216.

When the tail portion is pulled away from the utensil dispenser, the actuating cam lever 2246 moves to allow the utensil to be removed from the utensil dispenser. In addition, removing the utensil causes the next utensil to be freed from the reservoir and to slide down the gravity feed ramp 2216 as the next utensil to be dispensed. Freeing the next utensil can be accomplished by using the actuating cam lever 2246, which is a spring loaded lever that rotates an actuating cam 2248 against a cam follower 2254 to activate a drive hammer 2256. The rear pedestal 2212 is part of the drive hammer 2256. A spring 2260 provides tension to return the drive hammer 2256 to a resting position. In the resting position, the rear pedestal 2212 is positioned to support the utensils in the reservoir that have not been dispensed onto the gravity feed ramp 2216. The drive hammer 2256 pushes cutlery off of one or more pedestals, for example the front and rear pedestals as described above, allowing a single utensil to drop onto the gravity feed ramp 2216. The cam follower 2254 includes a roller that follows the actuating cam 2248 that activates the drive hammer 2256.

When actuated, the drive hammer 2256 pushes the utensil toward a back end of the dispenser such that the detents of the utensil move past the front pedestal 2214 and the tail portion of the utensil moves past the rear pedestal 2212, causing the utensil to fall to the gravity feed ramp 2216. Once the utensil is dispensed, the actuating cam lever 2246 returns to a home position. The utensil continues to move down the gravity feed ramp 2216 until the actuating cam lever 2246 stops its movement. In this position, a handle of the utensil is exposed from the dispenser and can be used to dispense the utensil.

The utensil dispenser can include a manual activation button 2250. The manual activation button 2250 is connected to a manual activation lever 2252 that bypasses the cam activated mechanism to dispense a utensil. The manual activation level 2252 is connected to the drive hammer 2256. Pressing the manual activation button 2250, engages the drive hammer 2256 to push the utensil off of the pedestals and onto the gravity feed ramp 2216.

Figure 23:
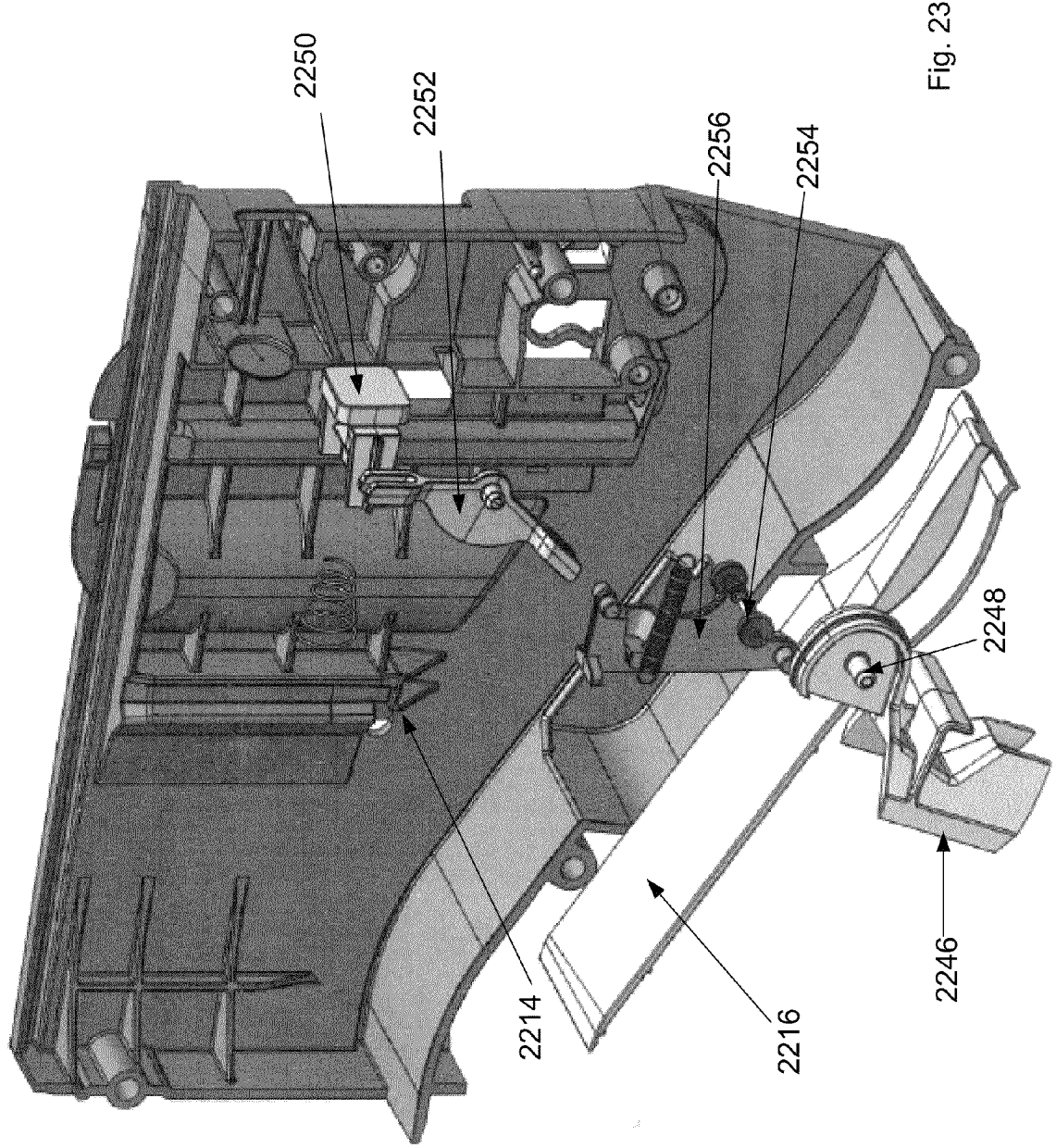
FIG. 23 illustrates an exploded view of an internal portion of a reservoir of the utensil dispenser of FIG. 22.
Figure 24:
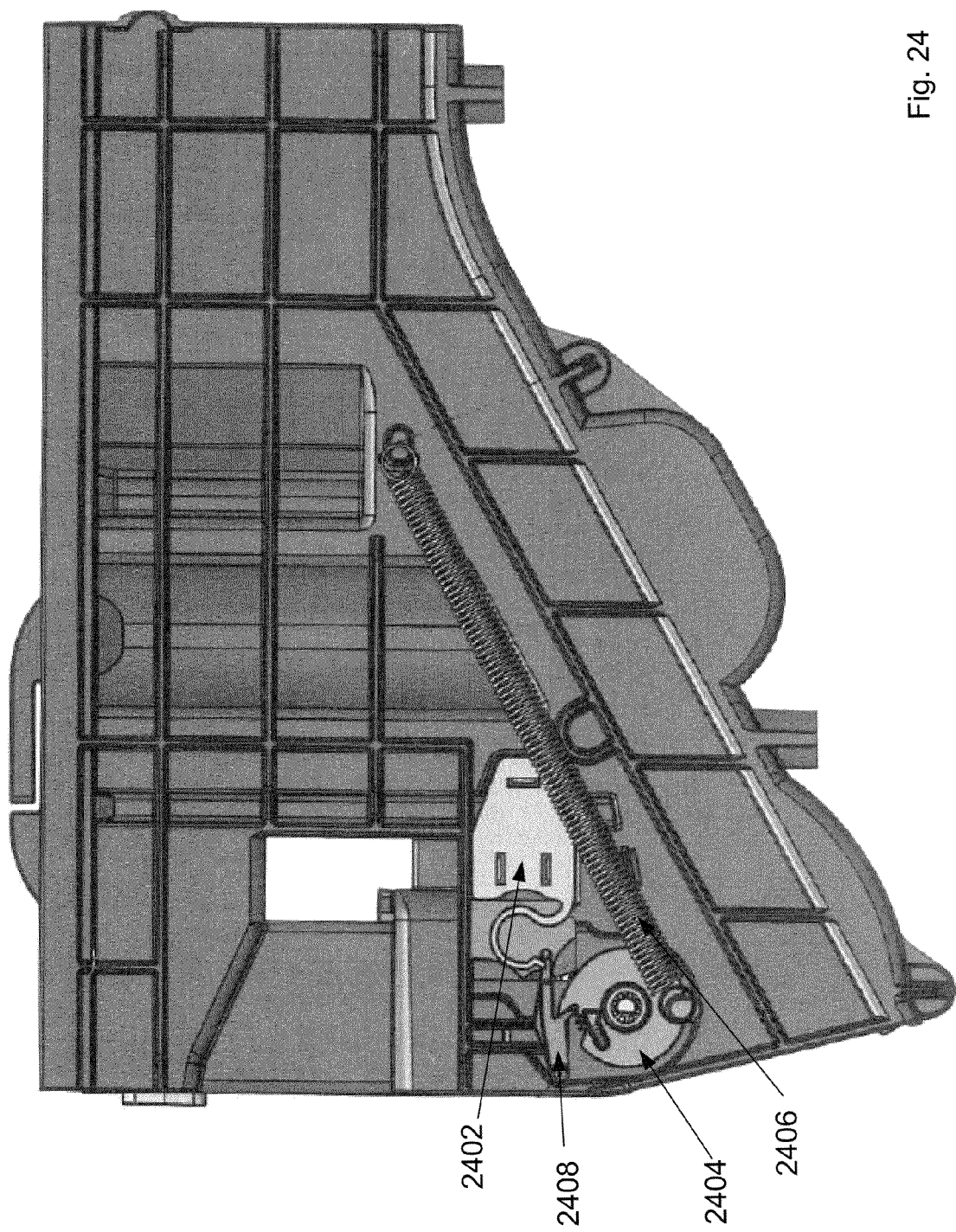
FIG. 24 illustrates a portion of a reservoir of the utensil dispenser of FIG. 22.
Figure 25:
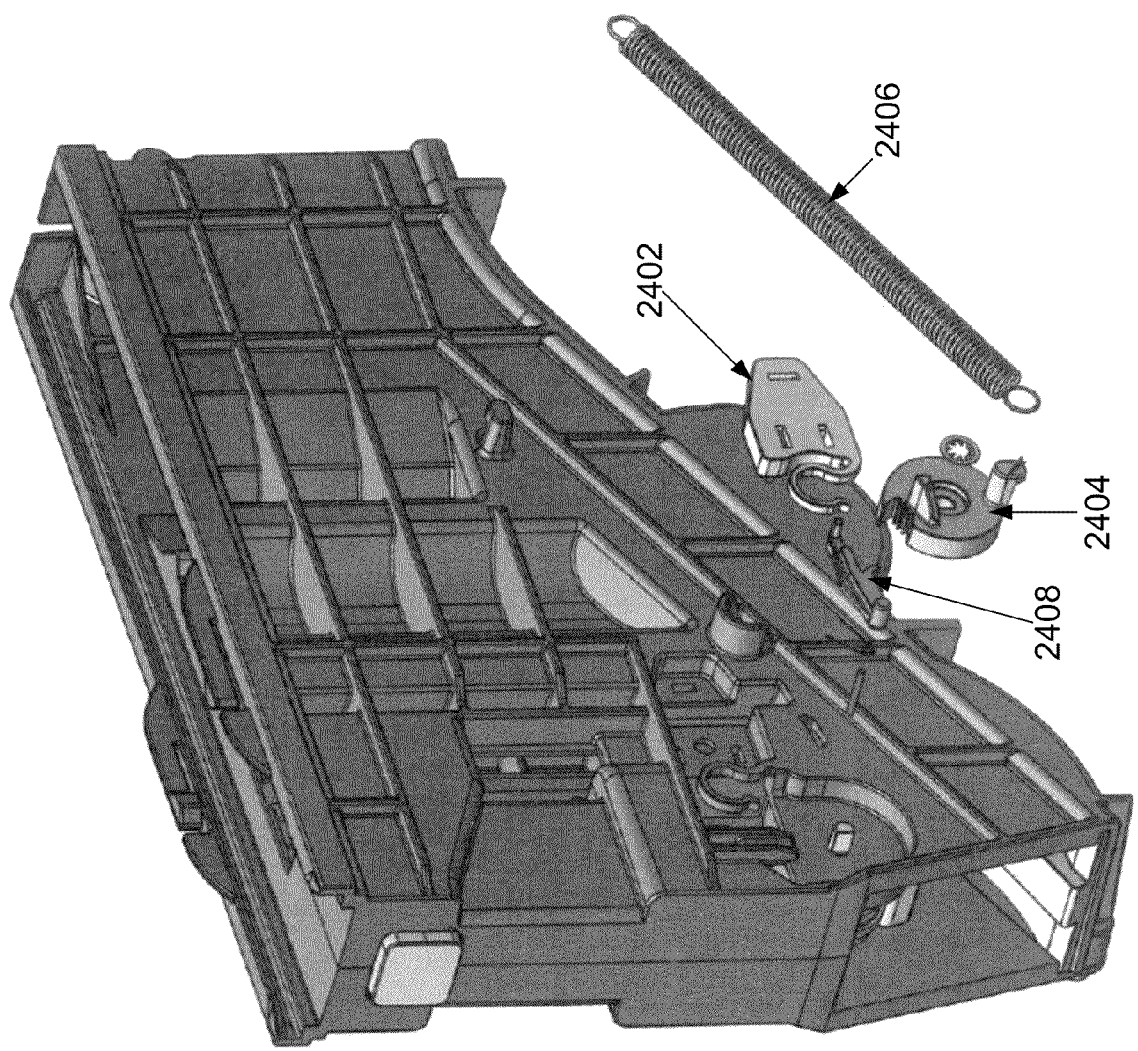
FIG. 25 illustrates an exploded view of an external portion of a reservoir of the utensil dispenser of FIG. 22.

FIG. 23 illustrates an exploded view of an internal portion of a reservoir of the utensil dispenser in accordance with the aforementioned illustrative implementation. FIGS. 24 and 25 illustrate the opposite side of the reservoir. FIG. 24 illustrates a portion of the reservoir of the utensil dispenser, and FIG. 25 illustrates an exploded view of an external portion of the reservoir of the utensil dispenser. The opposite side of the reservoir includes a ratchet gear 2404 that attaches to a portion of the actuating cam 2248 that protrudes into the opposite side of the reservoir. A snap 2402 fits into an opening of the reservoir and a ratchet paw 2408 attaches to the reservoir. For example, a dowel pin and a torsion spring (not shown) can be used to attach the ratchet paw 2408 to the reservoir. Once installed, the ratchet paw 2408 engages the snap 2402 and the ratchet gear 2404 as shown in FIG. 24.

Figure 26:
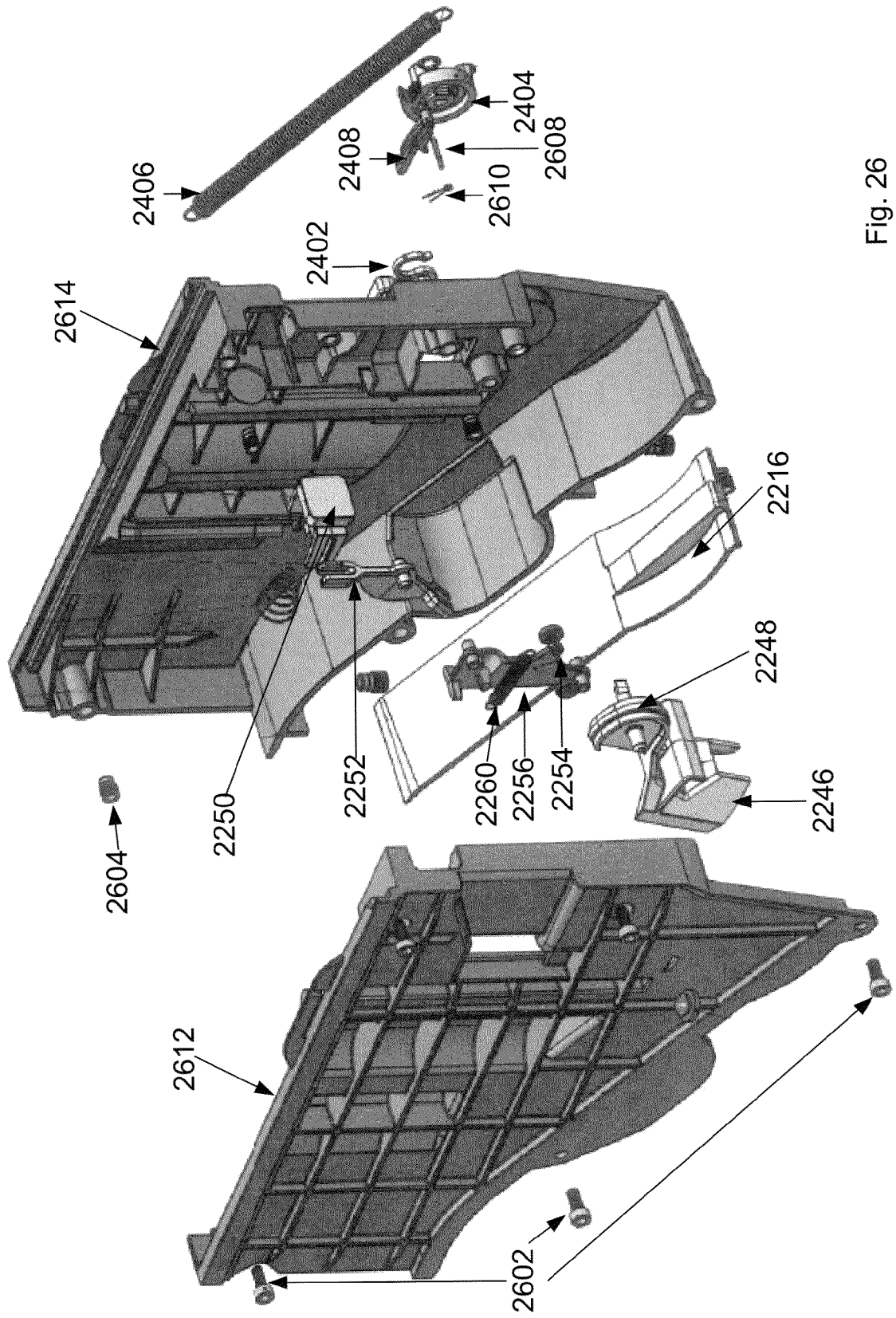
FIG. 26 illustrates an exploded view of the utensil dispenser of FIG. 22.

FIG. 26 illustrates an exploded view of the utensil dispenser, illustrating the components of both sides of the reservoir as shown in FIGS. 22-25. In addition, screws 2602, such as cap head screws, can secure a left portion 2612 and a right portion 2614 of the reservoir together using screw inserts 2604. A torsion spring 2610 and a dowel pin 2608 can be used to connect the ratchet paw 2408 to the reservoir such that the ratchet paw 2408 engages the ratchet gear 2404 and the snap 2402. The extension spring 2406 provides tension to return the ratchet gear 2404 into a resting position.

Figure 27A:
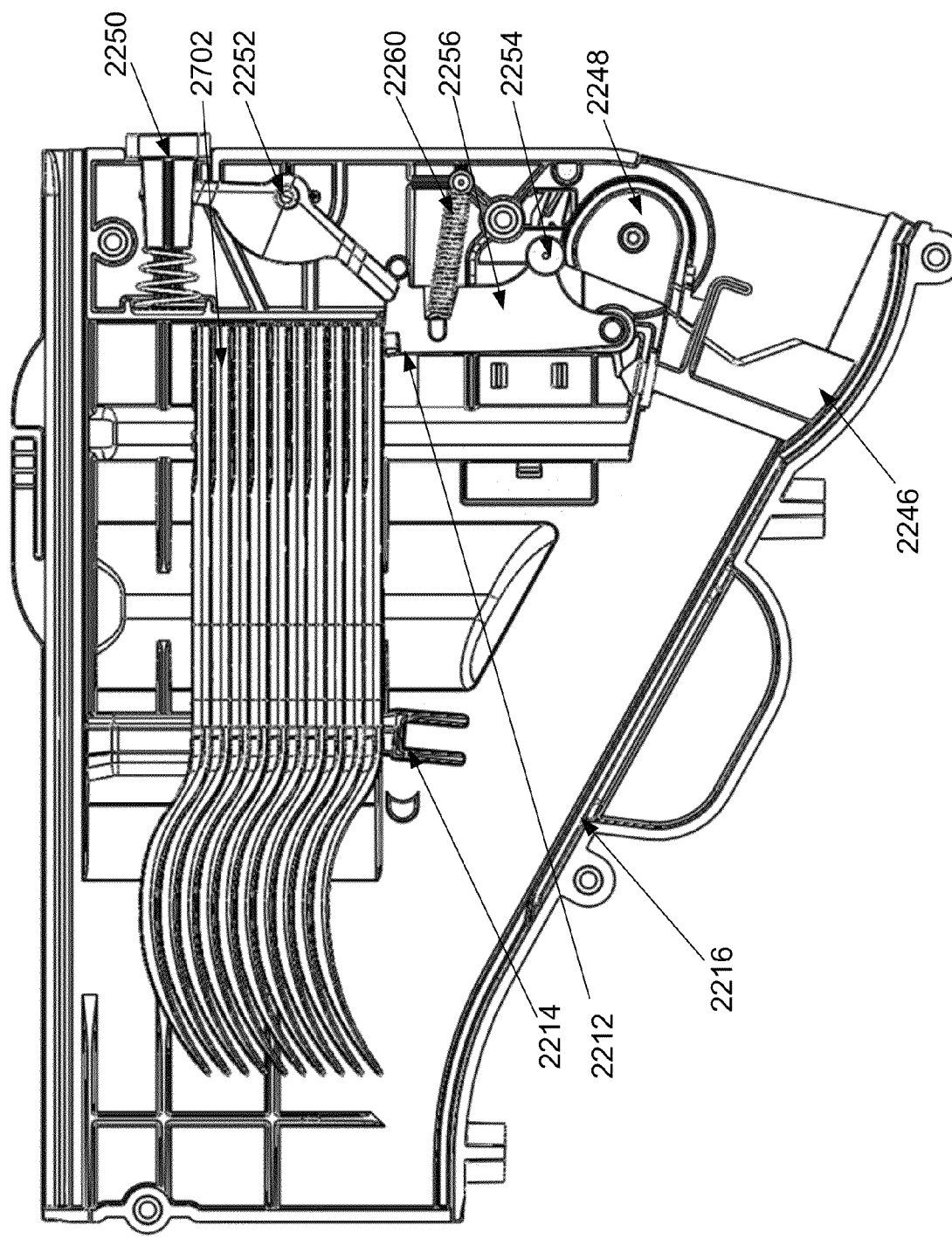
Figure 27B:
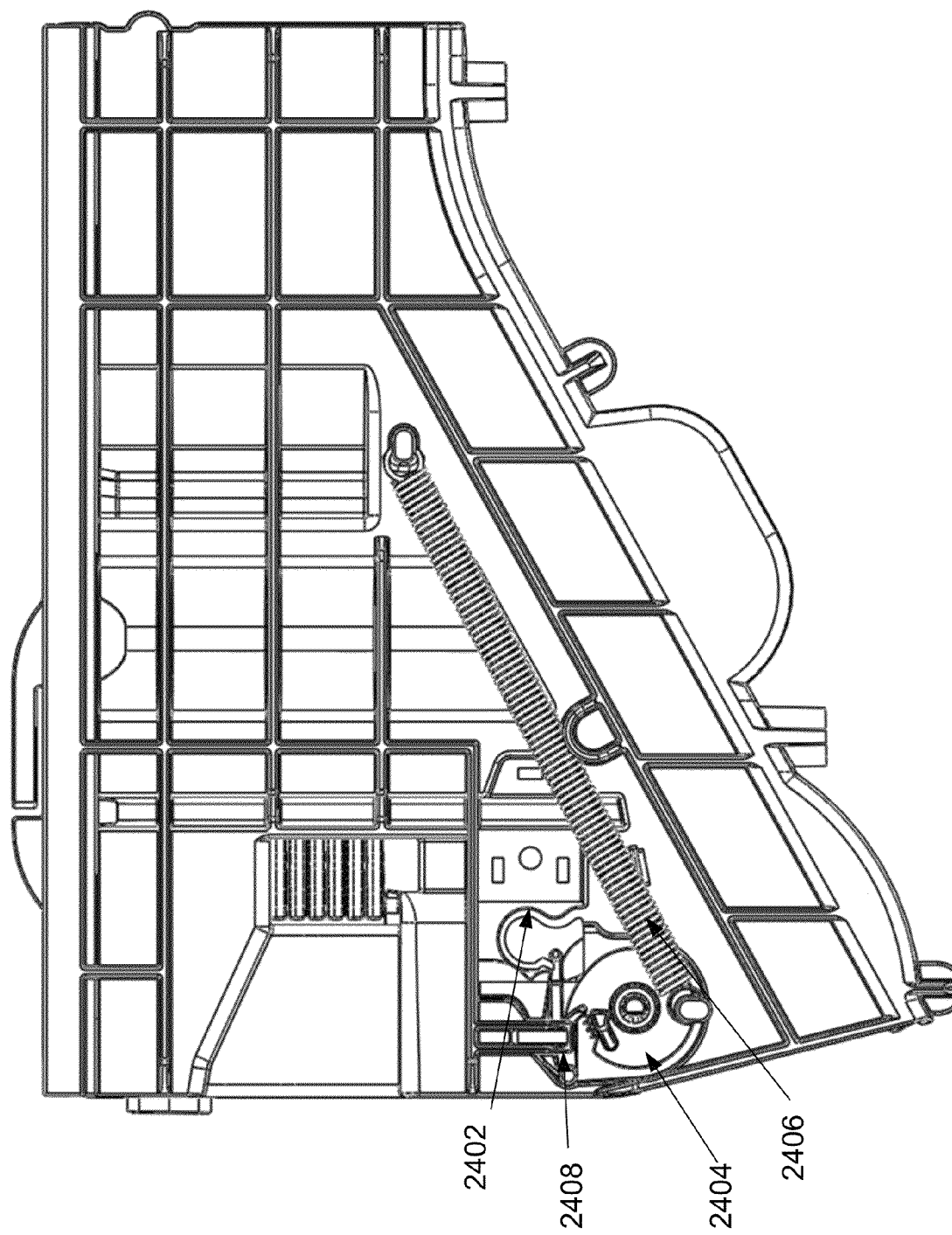

FIGS. 27A-37A and 27B-27B illustrate the operation of the utensil dispenser from both a front perspective view and a corresponding rear perspective view. FIGS. 27A and 27B show the utensil dispenser loaded with utensils 2702. There is no utensil, however, in the ready to be dispensed position. This can occur, for example, when the utensil dispenser is first loaded with utensils. In one implementation, the utensil dispenser can be loaded using a cartridge, such as the cartridge 302 shown in FIG. 3A, that contains utensils and can connect to the utensil dispenser. To load utensils, a restraint panel can be removed. Upon removal of the restraint panel, the utensils can fall into the utensil dispenser.

Figure 28A:
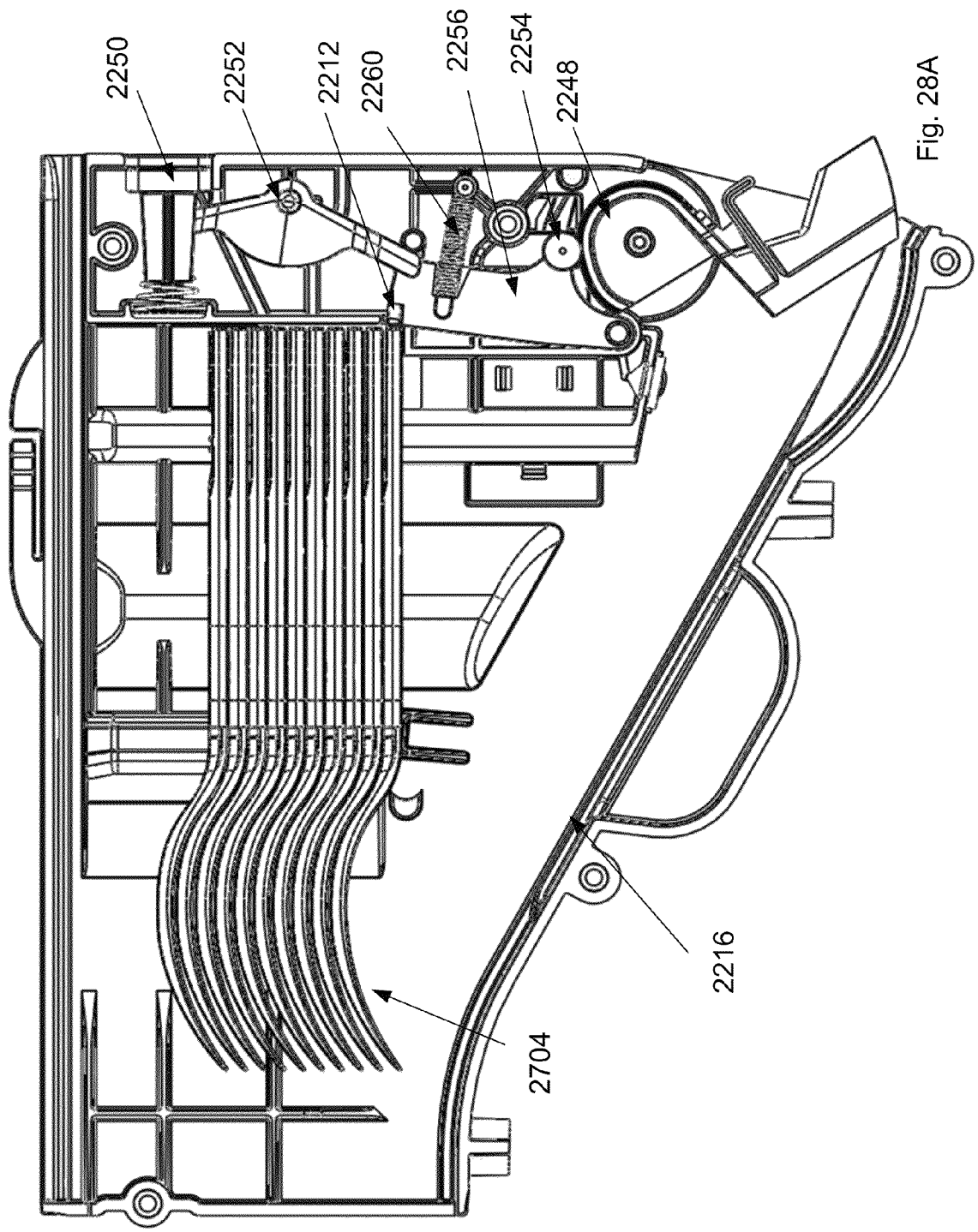
Figure 28B:
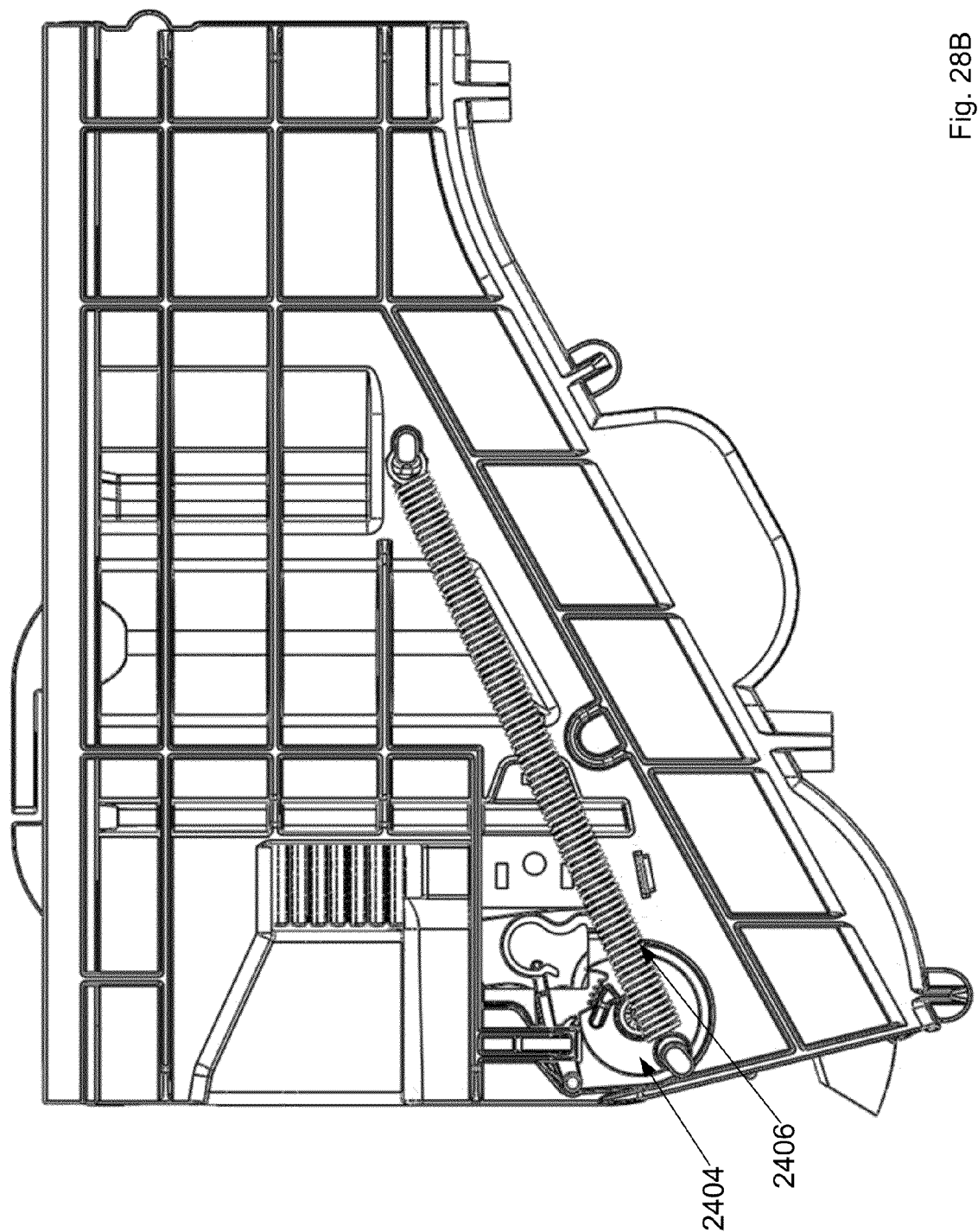
Figure 29A:
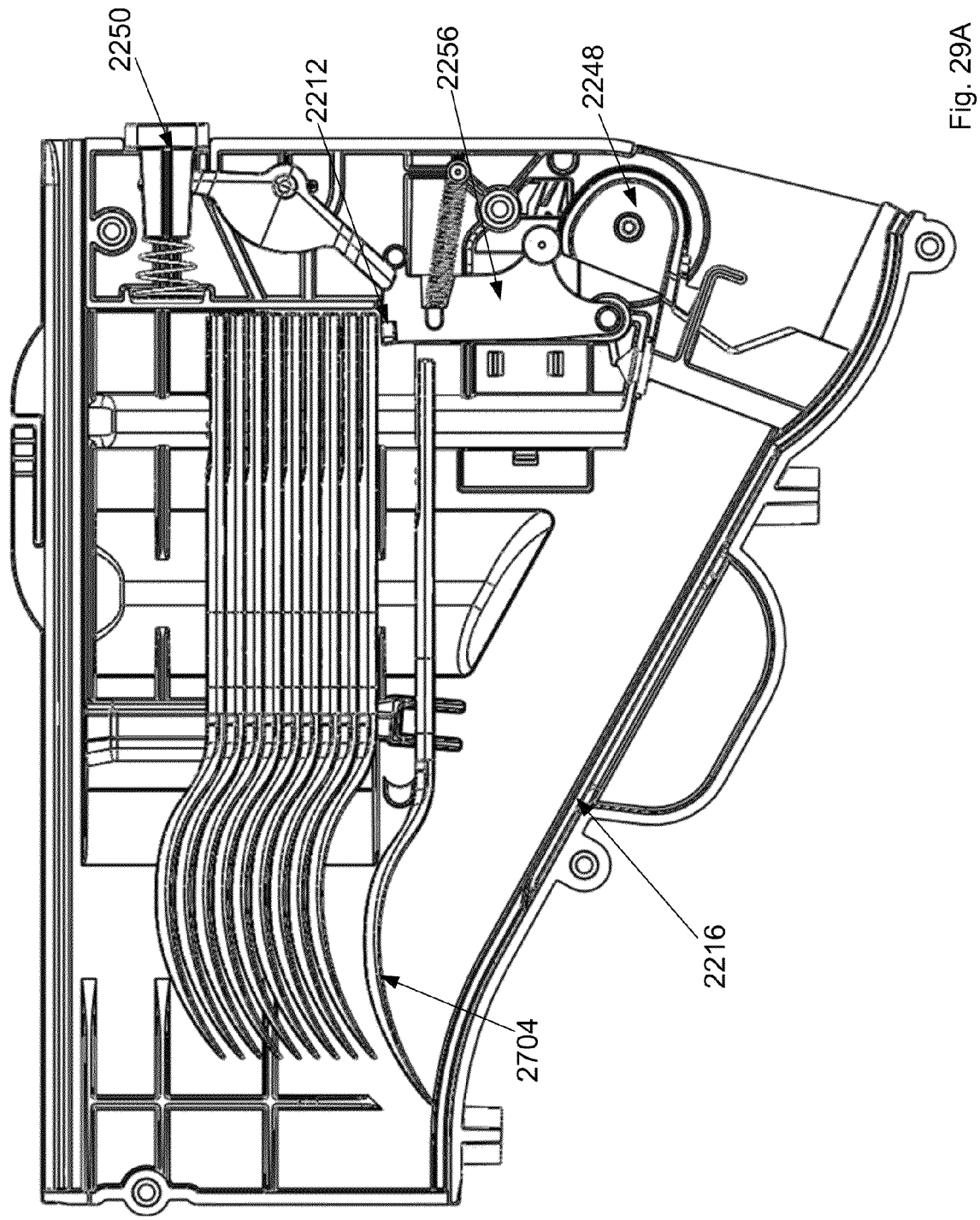
Figure 29B:
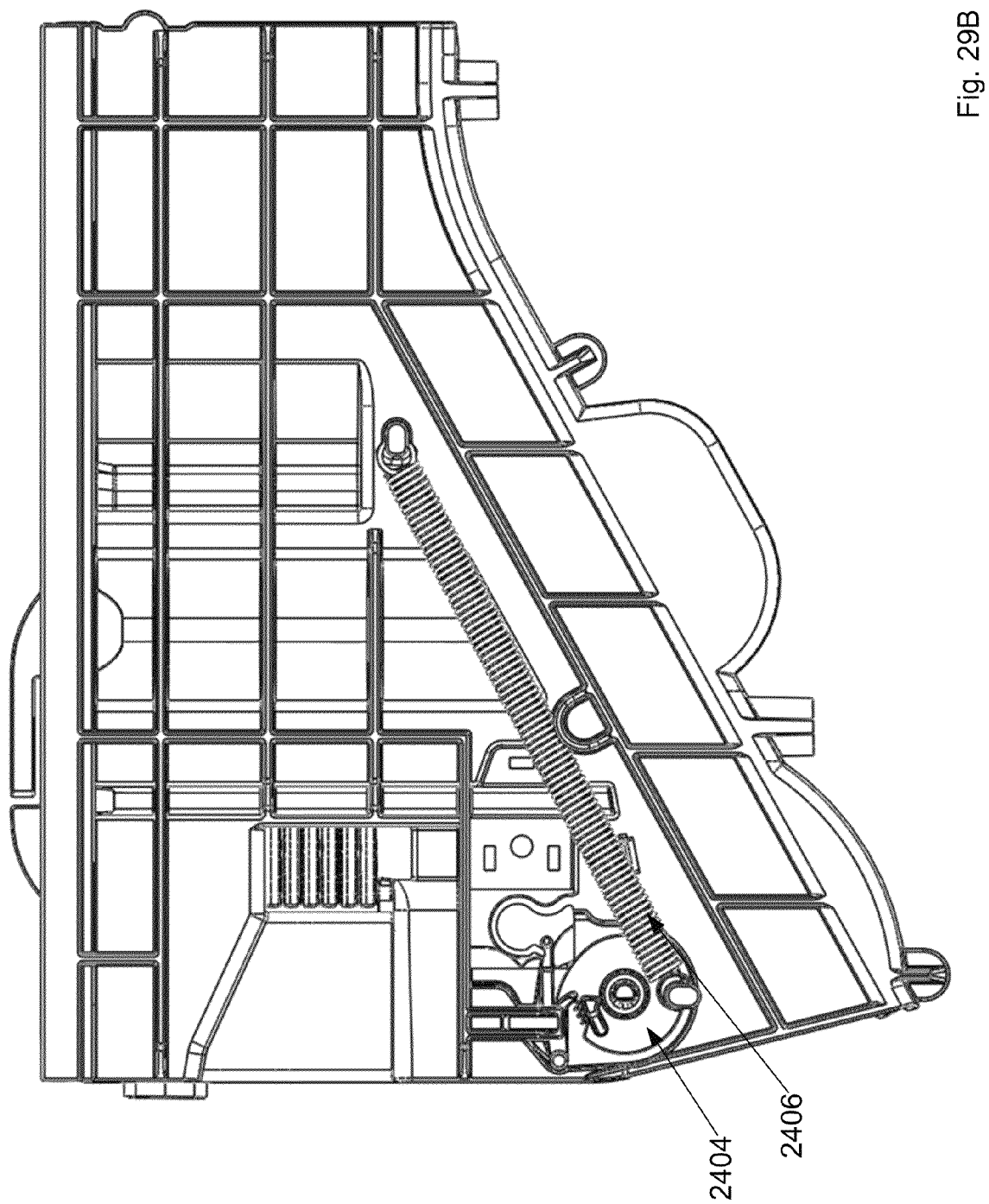
Figure 30A:
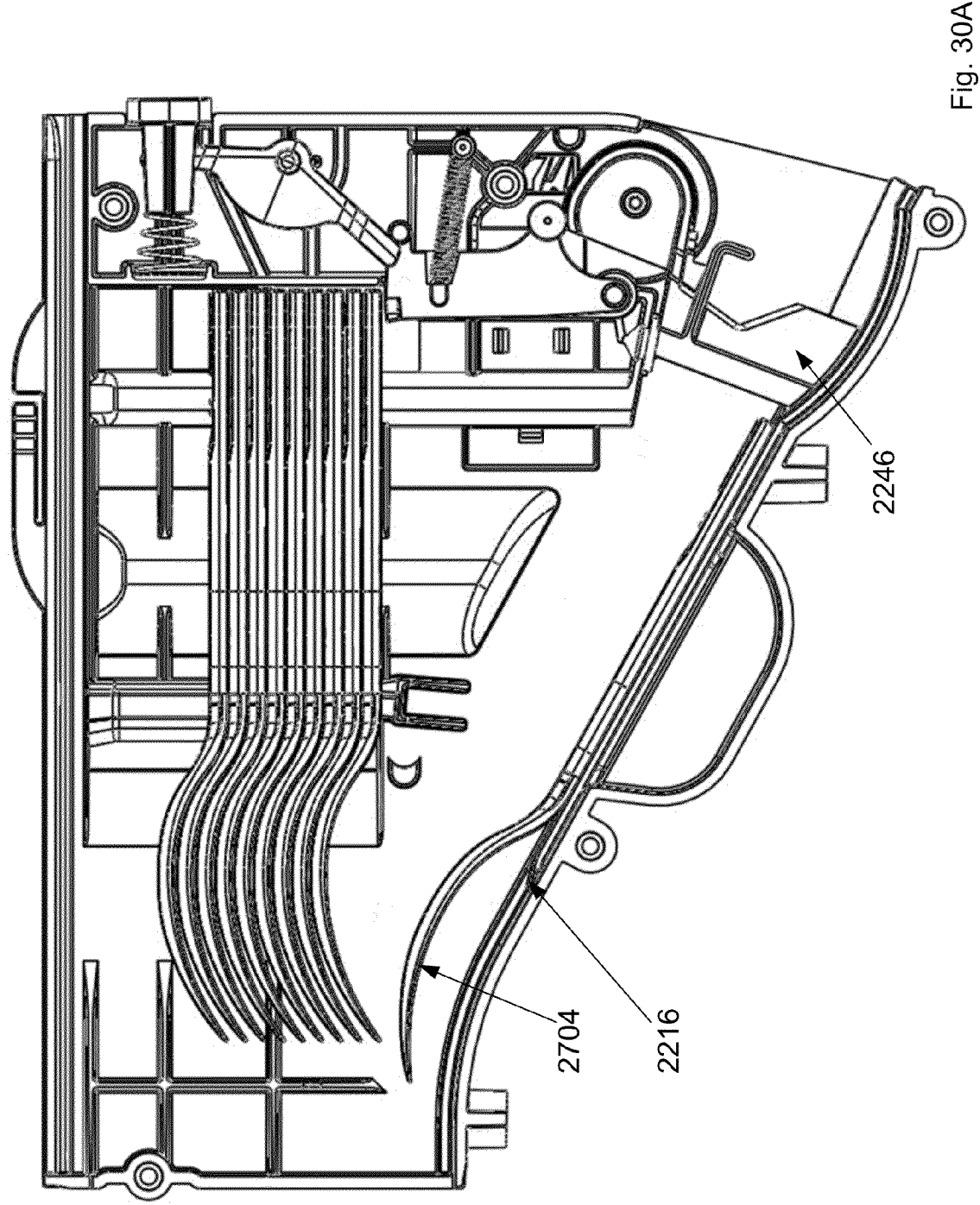
Figure 30B:
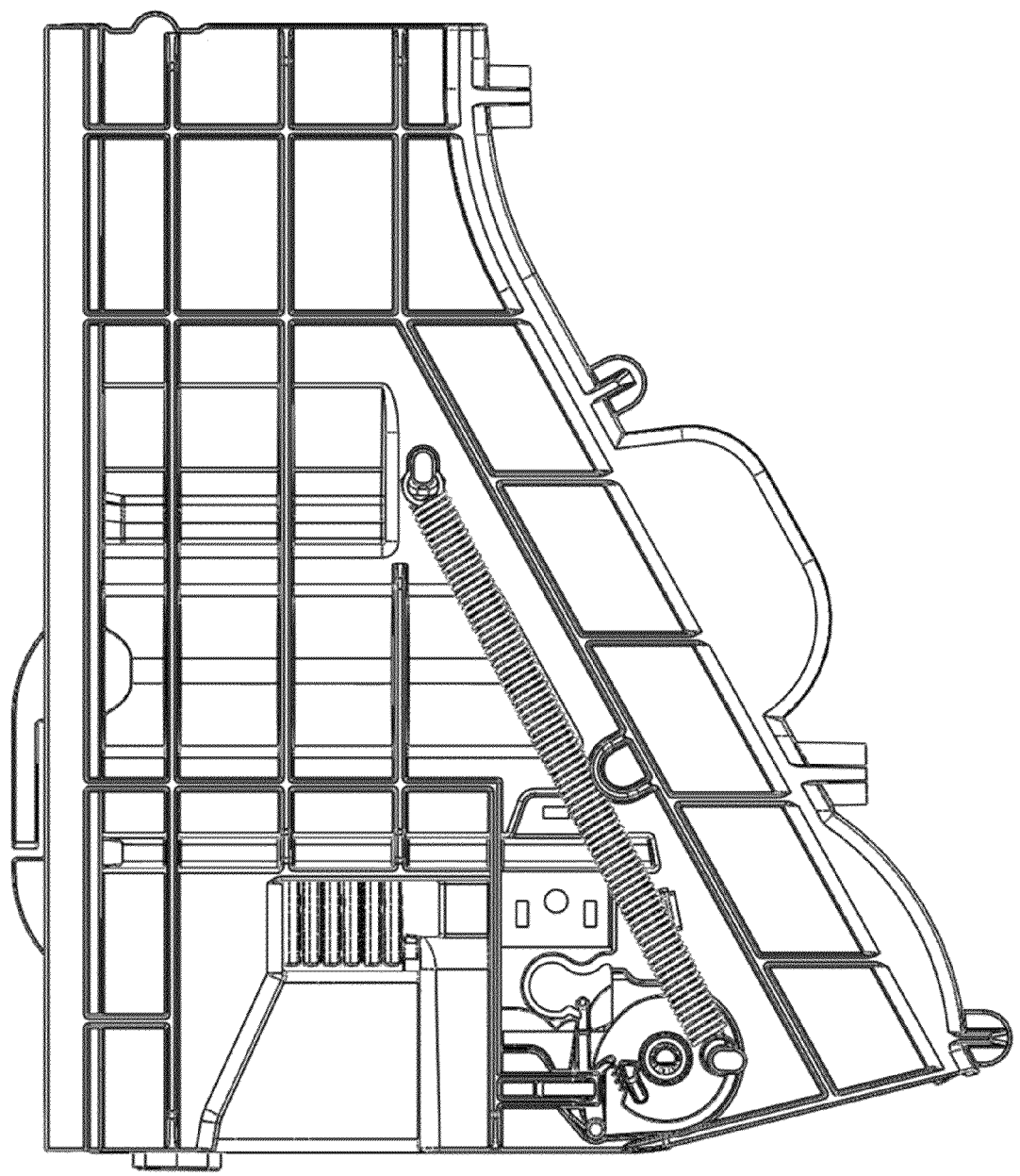
Figure 31B:
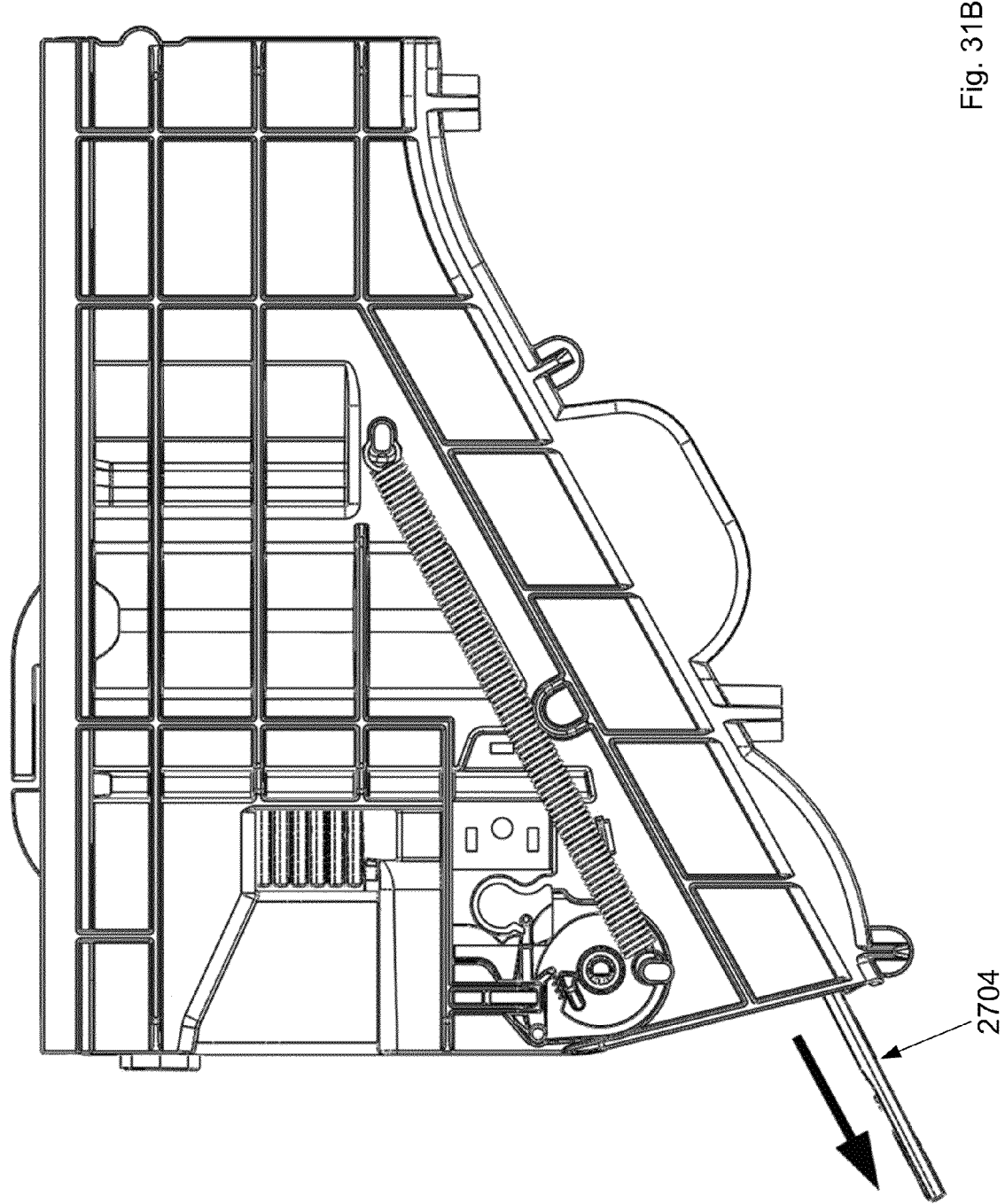
Figure 33A:
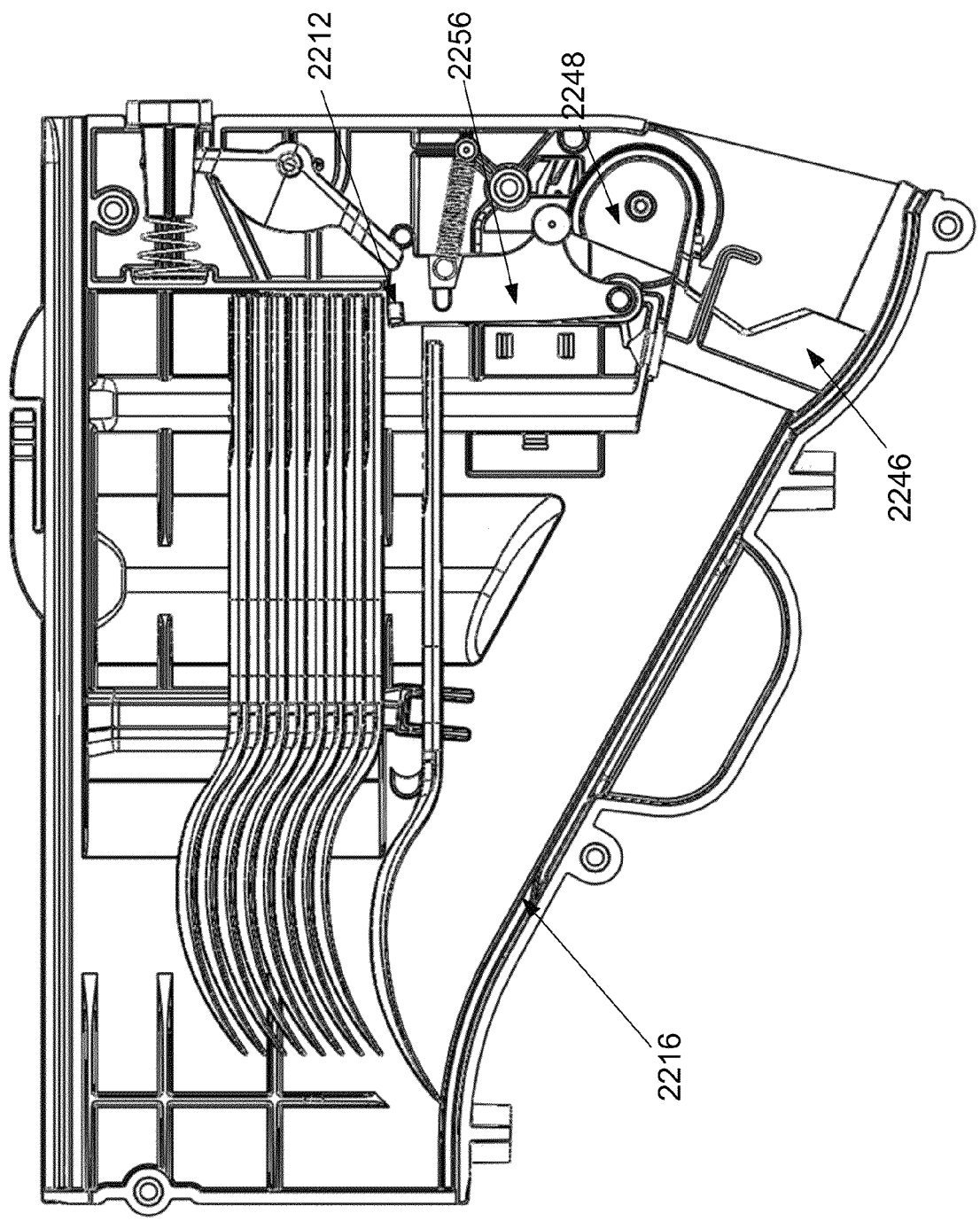
Figure 33B:
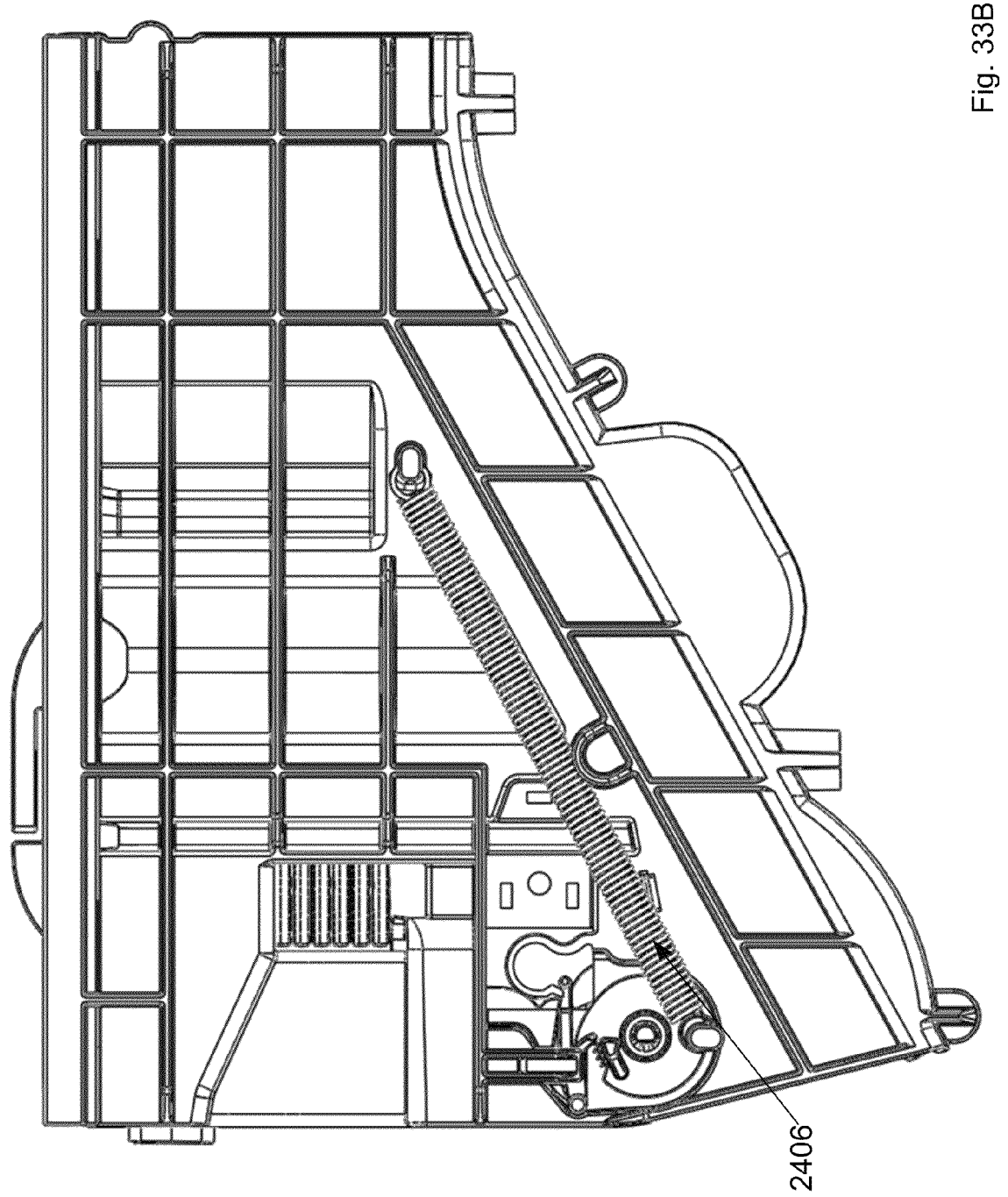

To prime the utensil dispenser for use, a manual activation button 2250 can be used to move a first utensil 2704 into the dispensing position. As shown in FIGS. 28A and 28B, when the manual activation button 2250 is engaged, the manual activation lever 2252 retracts the drive hammer 2256, which causes the rear pedestal 2212 to move such that the rear pedestal 2212 no longer supports the first utensil 2704. Without support of the rear pedestal 2212, the first utensil 2704 drops in preparation for being moved to the gravity feed ramp 2216. In addition, the movement of the drive hammer 2256 also causes the cam follower 2254 and the actuating cam 2248 to move. The movement of the actuating cam 2248 causes the ratchet gear 2404 to move in a clockwise fashion, thereby stretching the extension spring 2406. When the manual activation button 2250 is released, the extension spring 2406 pulls the ratchet gear 2404 back into its initial position. The ratchet gear 2404 causes the actuating cam 2248 and the drive hammer 2256 to also return to their original position, as shown in FIGS. 29A and 29B. As the drive hammer 2256 moves to its supporting position, the rear pedestal pushes the first utensil off of the front pedestal 2214 to eject the first utensil from the utensil stack. Once the first utensil 2704 is pushed off of the front pedestal 2214, the first utensil 2704 falls to the gravity feed ramp 2216. The first utensil 2704 then slides down the gravity feed ramp 2216 as shown in FIGS. 30A and 30B. Eventually, the first utensil 2704 is stopped by the actuating cam lever 2246. Once stopped by and in contact with the actuating cam lever 2246, the utensil is in a dispensing position. The first utensil 2704 is shown in its dispensing position in FIGS. 31A and 31B. In the dispensing position, a portion of the first utensil 2704 extrudes from the utensil dispenser. FIGS. 32A and 32B illustrate the utility dispenser when the first utensil is pulled and is partially dispensed. Pulling the first utensil 2704, causes the actuating cam lever 2246 to turn the actuating cam 2248 in a counter-clockwise motion, which in turn, cocks the drive hammer 2256. Cocking the drive hammer 2256, moves the rear pedestal 2212 from under the utensil stack causing the next utensil to drop into place for ejection. The ratchet gear 2404 prevents kick-back while the first utensil 2704 is being pulled from the utensil dispenser. FIGS. 33A and 33B illustrate the utensil dispenser after the first utensil 2704 is completely removed. Once the first utensil 2704 is removed, the drive hammer 2256 returns to its initial position due to the extension spring 2406 and ejects the next utensil on the gravity feed ramp 2216. In addition, the actuating cam lever 2246 has returned to its initial position such that it will stop the next utensil's progress down the gravity feed ramp 2216, at which point, the next utensil will be in its dispensing position. This process can continue, allowing each of the utensils 2702 to be dispensed. Further, as described above, a cartridge can be used to replenish the utility dispenser.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A utensil dispenser comprising:
   a reservoir configured to store a plurality of utensils;
   a rear pedestal configured to contact a rear portion of a next utensil to be dispensed of the plurality of utensils;
   a front pedestal configured to contact one or more detents in the next utensil, wherein the front pedestal and the rear pedestal are configured to contain the plurality of utensils within the reservoir;
   a gravity feed ramp configured to move the next utensil to an access port of the utensil dispenser;
   an actuator operably connected to a drive mechanism, the actuator configured to halt a dispensing utensil at a ready position based upon contact between the dispensing utensil and the actuator such that, in the ready position, a handle portion of the dispensing utensil is accessible via the access port;
   wherein the drive mechanism is configured to contact the next utensil, and wherein the actuator is further configured to move the drive mechanism into a release position such that the drive mechanism contacts the next utensil to push the next utensil to clear the front pedestal to release the next utensil from the reservoir onto the gravity feed ramp when the dispensing utensil is dispensed.

2. The utensil dispenser of claim 1, wherein the drive mechanism comprises a drive pin.

3. The utensil dispenser of claim 1, wherein the drive mechanism comprises a drive hammer.

4. The utensil dispenser of claim 1, wherein the drive mechanism is further configured to move the next utensil to clear the rear pedestal to release the next utensil from the reservoir onto the gravity feed ramp when the dispensing utensil is dispensed.

5. The utensil dispenser of claim 1, wherein the drive mechanism includes the rear pedestal.

6. The utensil dispenser of claim 5, wherein the actuator is further configured to return to a home position to clear the next utensil from the rear pedestal.

7. The utensil dispenser of claim 1, further comprising a manual activation button configured to move the drive mechanism into the release position when activated.

8. A utensil comprising:
   a utensil body having a utensil body front portion and a utensil body rear portion;
   a winged portion operatively connected to the utensil body front portion, the winged portion configured to rest on a front pedestal of a utensil dispenser when the utensil is stored in a reservoir of the utensil dispenser; and a tail portion operatively connected to the utensil body rear portion, the tail portion configured to:

rest on a rear pedestal of the utensil dispenser when the utensil is stored in the reservoir of the utensil dispenser, the utensil remaining within the reservoir when the winged portion is resting on the front pedestal and the tail portion rests on the rear pedestal; and contact a drive mechanism of the utensil dispenser, the drive mechanism configured to selectively push the utensil via the tail portion such that the winged portion clears the front pedestal and the tail portion clears the rear pedestal, permitting the utensil to fall from the reservoir.

9. The utensil of claim 8, wherein the drive mechanism comprises a drive pin.

10. The utensil of claim 8, wherein the drive mechanism comprises a drive hammer.

11. The utensil of claim 8, wherein the drive mechanism moves the utensil to clear the rear pedestal to release the utensil from the reservoir onto a gravity feed ramp when a dispensing utensil is dispensed.

12. The utensil of claim 8, wherein the drive mechanism includes the rear pedestal.

13. The utensil of claim 12, wherein the utensil is configured to clear the rear pedestal based upon an actuator returning to a home position.

14. A method comprising:

removing a utensil from a utensil dispenser;

moving an actuation component based upon the utensil being removed, wherein the utensil is in contact with the actuation component while being removed;

engaging a drive mechanism based upon the moving of the actuation component;

freeing a next utensil from a reservoir onto a gravity feed ramp based upon the drive mechanism, wherein the drive mechanism pushes the next utensil to free the next utensil; and halting the next utensil on the gravity feed ramp such that a tail portion of the utensil extrudes from the utensil dispenser.

15. The method of claim 14, wherein the drive mechanism comprises a drive pin.

16. The method of claim 14, wherein the drive mechanism comprises a drive hammer.

17. The method of claim 14, wherein the drive mechanism moves the utensil to clear the rear pedestal to release the utensil from the reservoir onto the gravity feed ramp when the dispensing utensil is dispensed.

18. The method of claim 14, wherein the drive mechanism includes the rear pedestal.

19. The method of claim 18, wherein the utensil is configured to clear the rear pedestal based upon an actuator returning to a home position.

* * * * *